United States Patent
Sisk

(10) Patent No.: US 11,257,161 B2
(45) Date of Patent: Feb. 22, 2022

(54) METHODS AND SYSTEMS FOR PREDICTING MARKET BEHAVIOR BASED ON NEWS AND SENTIMENT ANALYSIS

(75) Inventor: Jacob Sisk, Brooklyn, NY (US)

(73) Assignee: Refinitiv US Organization LLC, New York, NY (US)

(*) Notice: Subject to any disclaimer, the term of this patent is extended or adjusted under 35 U.S.C. 154(b) by 0 days.

(21) Appl. No.: 13/308,496

(22) Filed: Nov. 30, 2011

(65) Prior Publication Data

US 2013/0138577 A1 May 30, 2013

(51) Int. Cl.
| | |
|---|---|
| G06Q 40/00 | (2012.01) |
| G06Q 40/06 | (2012.01) |
| G06Q 40/04 | (2012.01) |
| G06Q 30/02 | (2012.01) |

(52) U.S. Cl.
CPC ............ *G06Q 40/06* (2013.01); *G06Q 30/02* (2013.01); *G06Q 40/04* (2013.01)

(58) Field of Classification Search
CPC ........ G06Q 40/06; G06Q 40/04; G06Q 50/01; G06Q 30/02; G06Q 30/0201; G06Q 40/00; G06Q 10/10; G06Q 10/06; G06Q 40/025; G06Q 10/00; G06Q 10/0637; G06Q 10/06393; G06Q 30/0203; G06Q 30/0267
See application file for complete search history.

(56) References Cited

U.S. PATENT DOCUMENTS

| | | | |
|---|---|---|---|
| 5,761,442 A | 6/1998 | Barr et al. | |
| 6,125,355 A | 9/2000 | Bekeart et al. | |
| 6,236,980 B1 | 5/2001 | Reese | |
| 6,622,140 B1 | 9/2003 | Kantrowitz | |
| 7,467,102 B2 | 12/2008 | Papka | |
| 7,467,108 B2 | 12/2008 | Papka | |
| 7,685,084 B2 | 3/2010 | Sisk et al. | |
| 8,027,893 B1 | 9/2011 | Burrows et al. | |

(Continued)

OTHER PUBLICATIONS

A Sentiment Analysis Approach to the Prediction of Market Volatility, arXiv:2012.05906v1 [q-fin.ST], Dec. 10, 2020, Justina Deveikyte, Helyette Geman, Carlo Piccari, Alessandro Provetti. (Year: 2020).*

(Continued)

*Primary Examiner* — Rajesh Khattar
(74) *Attorney, Agent, or Firm* — Duncan Galloway Greenwald PLLC; Kevin T. Duncan

(57) ABSTRACT

The present invention provides a method, system and software that provide a predictive model responsive to the correlation of news articles to stock price movement. The invention analyzes the derivative or ratio of events to drive predictions in a responsive manner. The invention considers derivatives or ratios of news meta-data within a small window in the past relative to a larger window of news items in the past. The invention may use a sentiment engine and apply the derivative of sentiment to predict volatility and/or trend direction of price of a security. The invention may look to the content, context, and derivative of sentiment to weigh news stories according to a predetermined taxonomy factoring in recency, criticality, repeatedness, trustworthiness, etc. to predict stock price behavior. Also, the invention may be used to forecast events given stock price movement and news to predict an impending story or release of significance.

26 Claims, 40 Drawing Sheets

(56) References Cited

U.S. PATENT DOCUMENTS

| | | | |
|---|---|---|---|
| 8,069,101 | B1 | 11/2011 | von Groll et al. |
| 2003/0135445 | A1 | 7/2003 | Herz et al. |
| 2003/0187772 | A1 | 10/2003 | Papka |
| 2010/0131398 | A1* | 5/2010 | Molloy et al. .................. 705/35 |
| 2010/0257117 | A1* | 10/2010 | Shvadron et al. .......... 705/36 R |
| 2011/0131076 | A1 | 6/2011 | Leidner et al. |
| 2012/0059771 | A1* | 3/2012 | von Groll et al. .......... 705/36 R |

OTHER PUBLICATIONS

Predictive Financial Markets: Comparing Survey, News, Twitter and Search Engine Data, arXiv:1112.1051v1 [q-fin.ST], Dec. 5, 2011; Huina Mao, Scott Counts, and Johan Bollen (Year: 2011).*
Sanjiv R. Das & Jacob Sisk, "Financial Communities", Journal of Portolio Managment, 2005, 31(4), pp. 112-123.
Sanjiv R. Das, "News Analytics: Framework, Techniques and Metrics",Working Paper, http://ssrn.com/abstract=1814258.
Nitish R.Sinha, "Underreaction to News in the US Stock Market", Working Paper, last Updated Jul. 13, 2011.
Groß-Klußmann&Hautsch,"When Machines Read the News:Using Automated Text Analytics to Quantify High Freq. News Implied Mkt. Reactions",J. of Empirical Finance,2011,v.18,321-340.
Sprenger &Welp, "Tweets and Peers:Defining Indus. Grps & Strategic Peers Based on Investor Perceptions of Stocks on Twitter" Forthcoming in Algorithmic Finance, pp. 1-32.
Lecture 4: Conditional Probability, Total Probability, Bayes's Rule, Sep. 12, 2005.
Cambria, Hussain&Eckl,"Bridging the Gap btwn Structured and Unstructured Health-Care Data thru Semantics and Sentics" Web Science Conf. 2011(Jun. 14-17, 2011), Koblenz,Germany.
Cambria et al., "SenticNet:A Publically Available Semantic Resource for Opinion Mining" AAAI, papers from AAAI Fall Symposium— Oct. 2, 2011, pp. 14-18.
Cambria et al. "AffectiveSpace:Blending Common Sense &Affective Knowledge to PErform Emotive Reasoning," WOMSA 2009, pp. 32-41.
Kyle et al., "News Arrival and Trading Game Invariance" Prelim. Version, Mar. 14, 2011, http://ssrn.com/abstract=1786124.
Akbas et al, "Mispricing Following Public News: Overreaction for Losers, Underreaction for Winners" Mar. 17, 2008, http://ssrn.com/abstract=1107690, p. 1-44.
Hong et al., "A Unified Theory of Underraction, Momentum Trading &Overreaction in Asset Markets" Nov. 1998.
Amihud, Yakov, "Illiquidity and Stock Returns: Cross-Section & Time-Series Effects" Aug. 2000, pp. 1-48.
Chan, Wesley, "Stock Price Reaction to News and No-News:Drift and Reversal After Headlines" Apr. 24, 2001, pp. 1-54.
Antweiler&Frank, "Is all that Talk just Noise?The Information Content of Internet Stock Msg. Boards" Journal of Finance, 2004, v. 59(3), pp. 1259-1295.
Antweiler&Frank, "The Market Impact of Corporate News Stories", 2005, Working Paper, University of British Columbia.
Das&Chen,"Yahoo for Amazon!Sentiment Extraction from Small Talk on the Web," Managment Science, 2007, v. 53, 1375-1388.
Das et al. "eInformation: A Clinical Study of Investor Discussion and Sentiment" Financial Management, 2005, V. 34(5), pp. 103-137.
Tetlock et al. "More than Words: Quantifying Language to Measure Firm's Fundamentals", 2008, Journal of Finance, V. 63(3), pp. 1437-1467.
Li, F.,"Do Stock Market Investors Understand the RiskSentiment of Corporate Annual Reports?" 2006, Working Paper, University of MI.
Mitra et al., "Equity Portfolio Risk (Volatility) Estimation using Market Information and Sentiment", 2008, Working Paper, Brunel University.
Tetlock, Giving Content to Investor Sentiment, The Role of Media in the Stock Market, 2007. Journal of Finance, V. 62(3), pp. 1139-1168.
Ramon Lawrence, "Using Neural Networks to Forecast Stock Market Prices", University of Manitoba, Dec. 12, 1997.

* cited by examiner

METHODS AND SYSTEMS FOR PREDICTING MARKET BEHAVIOR BASED ON NEWS AND SENTIMENT ANALYSIS

FIELD OF THE INVENTION

The present invention relates generally to financial services and to the mining of information from news articles and other sources of content to discern sentiment. The present invention provides a dynamic tool that leverages machine learning capabilities, news sentiment expertise, and intelligent analytics that enable measuring and/or scoring of sentiment and predictive firm valuation behavior of companies as perceived by conventional and new media.

BACKGROUND OF THE INVENTION

With the advents of the printing press, typeset, typewriting machines, computer-implemented word processing and mass data storage, the amount of information generated by mankind has risen dramatically and with an ever quickening pace. As a result there is a continuing and growing need to collect and store, identify, track, classify and catalogue for retrieval and distribution this growing sea of information/content. In addition, with the development and widespread deployment of and accessibility to high speed networks, e.g., Internet, there exists a growing need to adequately and efficiently process the growing volume of content available on such networks to assist in decision making. In particular the need exists to quickly process information pertaining to current events to enable informed decision making in light of the effect of current events or related sentiment and in consideration of the effect such events and sentiment may have on the price of traded securities or other offerings.

In many areas and industries, including financial services sector, for example, there are content and enhanced experience providers, such as. The Thomson Reuters Corporation, Wall Street Journal, Dow Jones News Service, Bloomberg, Financial News, Financial Times, News Corporation, Zawya, New York Times. Such providers identify, collect, analyze and process key data for use in generating content, such as reports and articles, for consumption by professionals and others involved in the respective industries, e.g., financial consultants and investors. In one manner of content delivery, these financial news services provide financial news feeds, both in real-time and archive, that include articles and other reports that address the occurrence of recent events that are of interest to investors. Many of these articles and reports, and of course the underlying events, may have a measureable impact on the trading stock price associated with publicly traded companies. Although often discussed herein in terms of publicly traded stocks (e.g., traded on markets such as the NASDAQ and New York Stock Exchange), the invention is not limited to stocks and includes application to other forms of investment and instruments for investment. Professionals and providers in the various sectors and industries continue to look for ways to enhance content, data and services provided to subscribers, clients and other customers and for ways to distinguish over the competition. Such providers strive to create and provide enhance tools, including search and ranking tools, to enable clients to more efficiently and effectively process information and make informed decisions.

Advancements in technology, including database mining and management, search engines, linguistic recognition and modeling, provide increasingly sophisticated approaches to searching and processing vast amounts of data and documents, e.g., database of news articles, financial reports, blogs, SEC and other required corporate disclosures, legal decisions, statutes, laws, and regulations, that may affect business performance and, therefore, prices related to the stock, security or fund comprised of such equities. Investment and other financial professionals and other users increasingly rely on mathematical models and algorithms in making professional and business determinations. Especially in the area of investing, systems that provide faster access to and processing of (accurate) news and other information related to corporate performance will be a highly valued tool of the professional and will lead to more informed, and more successful, decision making.

In addition to traditional media sources and delivery means, recently "social media" has become increasingly popular and viewed. The power of social media has added a new layer of information sharing and gathering that far exceeds conventional forms of media. Not bound by traditional models and workflow, blogs and other forms of social media have become a tremendously accessible and far reaching source of real-time news and situational updates. On the investment front, start-ups like Seeking Alpha and the traditional financial news providers are heading into the blogosphere and social media at an exponential rate. A recent survey conducted by ING shows that blogs have become a top source of investment advice for their Sharebuilder customers, surpassing traditional sources. "Social Media" is defined as crowd-sourced data and content. Examples of social media include: news websites (reuters.com, bloomberg.com etc); online forums (livegreenforum.com); website of governmental agencies (epa.gov); websites of academic institutes, political parties (mcgill.ca/mse, www.democrats.org etc); online magazine websites (emagazine.com/); blogging websites (Blogger, ExpressionEngine, LiveJournal, Open Diary, TypePad, Vox, WordPress, Xanga etc); microblogging websites (Twitter, FMyLife, Foursquare, Jaiku, Plurk, Posterous, Tumblr, Qaiku, Google Buzz, Identi.ca Nasza-Klasa.pl etc); social and professional networking sites (facebook, myspace, ASmallWorld, Bebo, Cyworld, Diaspora, Hi5, Hyves, LinkedIn, MySpace, Ning, Orkut, Plaxo, Tagged, XING, IRC, Yammer etc); online advocacy and fundraising websites (Greenpeace, Causes, Kickstarter); information aggregators (Netvibes, Twine etc); and Twitter.

"News analysis" or "news analytics" refers to a broad field encompassing and related to information retrieval, machine learning, statistical learning theory, network theory, and collaborative filtering. News analytics includes the set of techniques, formulas, and statistics and related tools and metrics used to digest, summarize, classify and otherwise analyze sources of information, often public "news" information. An exemplary use of news analytics is a system that digests, i.e., reads and classifies, financial information to determine market impact related to such information while normalizing the data for other effects. News analysis refers to measuring and analyzing various qualitative and quantitative attributes of textual news stories, such as that appear in formal text-based articles and in less formal delivery such as blogs and other online vehicles. More particularly, the present invention concerns analysis in the context of electronic content. Attributes include: sentiment, relevance, and novelty. Expressing, or representing, news stories as "numbers" or other data points enables systems to transform traditional information expressions into more readily analyzable mathematical and statistical expressions. News analysis techniques and metrics may be used in the context of finance and more particularly in the context of investment performance—past and predictive.

News analytics systems may be used to measure and predict volatility as in Antweiler and Frank (2004); reversals of news impact, Antweiler and Frank (2005); the relation of news and message-board information, Das, Martinez-Jerez and Tufano (2005); the relevance of risk-related words in annual reports for predicting negative returns, Li (2006); for sentiment extraction, see Das and Chen (2007); the impact of news stories on stock returns, Tetlock (2007); determining the impact of optimism and pessimism in news on earnings, Tetlock, Saar-Tsechansky and Macskassay (2008); predicting volatility, Mitra, Mitra and diBartolomeo (2008), and predicting markets, Leinweber and Sisk (2010).

News analytics may be viewed at three levels or layers: text, content, and context. Most prior efforts have focused on and are grounded in the first layer—text, i.e., text-based engines/applications process the raw text components of news, i.e., words, phrases, document titles, etc. News analytics techniques may be used to convert text into more useful information, such as by signing, classifying, summarizing and/or reducing text it to core elements. Analytics may discard irrelevant text, thereby condensing it into information with higher relevance/usefulness and indication of content.

The second layer, content, expands the domain of text to images, time, form of text (email, blog, page), format (html, xml, etc.), source, etc. Content represents the enrichment of text with higher meaning and significance embossed with, e.g., quality and veracity characteristics capable of being further exploited by analytics. For example, financial information has more value or perceived veracity and accuracy when streamed from Dow Jones, versus a blog, which might be of higher quality or perceived veracity and accuracy than a stock message-board post. The profile and understood or historical bias or track record of the source may also be a factor when assigning a measure of "trustworthiness." The text may be divided into "fact" or factual statements or representations and "opinion" expressions. Again, depending on the source, a news analytics system may attribute varying degrees of significance, relevance or trustworthiness.

The third layer of news analytics—context, refers to connectedness or relatedness between information items. For example, the Das, Martinez-Jerez and Tufano (2005) paper examines the relationship of news to message-board postings related to four companies. Context may also refer to the network relationships of news. The Das and Sisk (2005) paper examined the social networks of message-board postings to determine if portfolio rules might be formed based on the network connections between stocks. Google's PageRank™ algorithm is an example of an analytic that functions at all three levels, which algorithm has features related to text and/or content, and the kernel of the algorithm is based on context, i.e., the importance of a page in a search set depends on how many other highly-ranked pages point to it.

After processing news stories based on text, content and context, investors and those involved in financial services desire an understanding of how such vast amounts of information, even processed information, relates to the likely movement of a company's stock price. A commonly used term and form of measurement related to risk of a company is "Alpha." As used in the present application, "Alpha" represents a measure of performance on a risk-adjusted basis. For instance, Alpha considers the volatility (i.e., price risk) of an instrument, stock, bond, mutual fund, etc. and compares risk-adjusted performance to another performance measurement, e.g., a benchmark or other index. The return of the investment vehicle, e.g., mutual fund, as compared to the return of the benchmark, e.g., index, is the investment vehicle's Alpha. In addition, Alpha may refer to the abnormal rate of return on a security or portfolio in excess of what would be predicted by an equilibrium model like the capital asset pricing model. Alpha is one of five widely considered technical risk ratios. In addition to Alpha, other technical risk factor statistical measurements used in modern portfolio theory include: beta, standard deviation, R-squared, and the Sharpe ratio. These statistical risk indicators are used by investment firms to determine a risk-reward profile of a stock, bond or other instrument-based investment vehicle such as a mutual fund. In the case of a mutual fund, for example, a positive or negative Alpha of 1.0 means that the mutual fund has outperformed its benchmark index, respectively, by positive or negative 1%. Accordingly, if a capital asset pricing model analysis estimates that a portfolio should earn 10% based on the risk of the portfolio and the portfolio actually earns 15%, then the portfolio's alpha would be positive 5% and represents the excess return over what was predicted in the model analysis.

What is needed is a system capable of automatically processing or "reading" news stories and other content available to it and quickly interpreting the content to arrive at a higher understanding of the information and to apply predictive models to anticipate behavior of stock price and other investment vehicles prior to the actual movement of such stocks and other investments. Presently, there exists a need to utilize and leverage traditional and new media resources and trends and satisfy customer's need for advanced analytics relevant to corporate performance, price behavior, investing, and reputational awareness to provide a sentiment-based solution that expands the scope of conventional tools to include social media and online news.

SUMMARY OF THE INVENTION

The present invention is directed to a News Analytics System (NAS), and related methods, adapted to automatically process and "read" news stories and other content in as close to real-time (relative to release) as possible. More particularly, the invention employs quantitative analysis, techniques or mathematics in conjunction with computer science to model the value of financial securities. The sooner relevant information is identified and processed and a predictive behavior announced, the quicker the recipient of such information and prediction may act on the analysis before the anticipated behavior actually occurs. While "event" information of significance may quickly result in stock price movement, news stories typically have a more gradual effect and often include content that takes time to process and react to. Recently, systems have been designed to process news information and to assign a "sentiment score" to the news item. Sentiment and sentiment score are typically derived from computational linguistics and define a tone of an article, usually as positive, negative or neutral, with respective scores of +1, −1, and 0. The score is derived from the text (words, phrases) included in the article that qualitatively describes the firm. For example, a text processing engine may be used to process text and metadata (existing or newly assigned by the engine) from news articles and apply a predefined or learned lexicon-based and/or sentiment pattern to the processed text. Once the sentiment direction and value are determined, the sentiment score may be output with scores of 0, 1, or −1 and may be further divided into fractions or may be any compatible system. Where multiple firms are mentioned in an article then the particular sentence(s) that relates to each firm will be analyzed in arriving at a sentiment score for each firm related to that article. Analyzing past news and the resulting response of the stock price can help build a model to predict stock behavior when examining short, recent spans of news stories.

The invention relates to methods and systems adapted to use traditional and new media sources of content as sources of "Alpha." For example, internal textual sources available to service providers may be applied against predictive models to arrive at anticipated market-related behavior, e.g., Thomson Reuters sources include legal (Westlaw), regulatory (SEC in particular, controversy data, sector specific, Etc.), social media (application of special meta-data to make it useful), and news and news-like sources, including financial news and reporting. In addition, internal sources may be supplemented with external sources, freely available or subscription-based, as additional data points considered by the predictive model. The invention may access new media sources of information, e.g., Machine Readable News (MRN) and StarMine, for use by "quants", i.e., quantitative analysts and investment professionals, in forming predictive models related to valuing financial securities in light of "new" information and/or sentiment. In addition to hard facts, e.g., explosion on an oil rig results in direct financial losses (loss of revenue, damages liability, etc.), and to sentiment, e.g., quantifying the effect of fear, uncertainty, greed, etc, and how that drives security valuation. The results may be used to enhance investment and trading strategies (e.g., stocks and other equities, bonds and commodities) and enable users to track and spot new opportunities and generate Alpha. The NAS includes a news sentiment analysis to provide further meaningful insight to drive informed trading and investment decisions.

The present invention may be used in conjunction with, e.g., Thomson Reuters News Analytics, a system that tracks news sentiment over time, provides a comprehensive understanding of company-related news coverage, and guides trading and investment decisions. Powered by natural language processing system linguistics technology, Thomson Reuters News Analytics automatically analyzes news content and provides improved trade (e.g., buy/hold/sell) signals in close to real-time, for example within milliseconds. The system can scan and analyze stories on thousands of companies in closed to real-time and feed the results into quantitative strategies. The system's output can be used to power quantitative strategies across markets, asset classes, and all trading frequencies, support human decision making, and assist with risk management and asset allocation decisions.

The linguistics technology, for example, scores text across the following exemplary, primary dimensions: "Author sentiment"—metrics for how positive, negative or neutral the tone of the item is, specific to each company in the article; "Relevance"—how relevant or substantive the story is for a particular item; "Volume analysis"—how much news is happening on a particular company; "Uniqueness"—how new or repetitive the item is over various time periods; and Headline analysis—denotes special features such as broker actions, pricing commentary, interviews, exclusives, and wrap-ups, among many others. In addition, the system's rich metadata may include, for example: company identifiers; topic codes—identifying subject matter; stage of the story—alert, article, update, etc.; and business sector and geographic classification codes; index references to similar articles. Combined, the system's robust metadata across multiple fields provides differentiated content for use by quantitative analysts and sophisticated algorithmic engines.

The NAS may utilize a variety and variations of text scoring and metadata types. Uses of the inventive techniques include quantitative investment and trading strategies. The trading and investment signals from news analytics are applicable across all trading frequencies and provide an incremental source of alpha over traditional quantitative factors. The invention may be used to enhance algorithmic trading strategies with automated circuit breakers or develop news algorithms which take advantage of the ability to better predict trading volumes, price volatility, and directional movements. The invention may be used in market making, e.g., to widen spreads or pull quotes when there is significant negative news impacting your activity in a particular stock. The invention may be used in portfolio management to improve asset allocation decisions by benchmarking portfolio sentiment and calculating sector weightings. The invention may be used in fundamental analysis to forecast stock, sector, and market outlooks. The invention may be used in risk management to better understand abnormal risks to portfolios and to develop potential sentiment hedges. In addition, the invention may be used for corporations to track and benchmark media coverage as well as that of competitors.

The NAS may be implemented in a variety of deployments and architectures. NAS data can be delivered as a deployed solution at a customer site, via a hosting solution(s), or through a dedicated service, e.g., Thomson Reuters Quantitative Analytics. By deploying the NAS via an established service provider platform, the invention may be more easily integrated within an existing framework and database structure. For example, a company, such as Thomson Reuters, may utilize standard APIs, symbology, and robustness of an enterprise platform that more closely delivers real time performance. In the context of a complete quantitative analytics solution, quant and event driven trading provides unique content, technology and data management capabilities designed to give firms an edge in quantitative research and analysis. Market data, news and analytics enable clients to more effectively develop and back-test event-based investment and quantitative trading strategies. The solution also allows seamless deployment of such strategies in a real time (or close to real time) environment for the generation of Alpha and the management of event risk.

Rather than focus on the slow moving changes to sentiment (as done in past efforts) or the average movement of sentiment over time (or even a rolling average), the present invention more powerfully considers and factors into a predictive model the response correlation of more recent "shock" events. In this manner, the invention analyzes the derivative or ratio of events (news and sentiment) to drive predictions in a more responsive manner. As used herein, "derivative" or "differential" represents a measure of how a function changes with respect to a changing input variable or how one variable changes with respect to another variable. The derivative of a function at a chosen input value represents a linear expression or transformation of the function at or near that input value. The term covers both real derivatives as well as complex derivatives. For example, the NAS may consider derivatives or ratios of kinds of news metadata within a small window in the past relative to a larger window of news items in the past. The invention may use a sentiment engine and then apply the derivative of sentiment to predict volatility and/or trend direction of price of a security. The invention may use the derivative of sentiment or other consistent process, e.g., ratio, by looking at the most recent, e.g., 10, stories and weighing them more heavily, as more relevant, for predicting stock price behavior (short-term or longer term). In this manner the invention focuses on or gives heightened importance to events occurring in a much shorter timeframe than prior systems to the advantage of traders, including algorithmic traders, day traders, any investor. The invention may look to the content and context of the news stories and weigh them in accordance with a predetermined taxonomy. The weighting may factor in recency, criticality, repeatedness, trustworthiness, etc. Also, the invention may be used to forecast events given stock price movement and news leading up to the announcement to predict an impending news story or release of significance.

In a first embodiment, the invention provides a computer-implemented method for predicting price behavior, the method comprising: receiving news content comprising a first news story; processing the first news story and identifying information pertaining to a first company; using sentiment analysis, determining a first sentiment score associated with the first news story as it relates to the first company; and determining a derivative sentiment value related to the first company. Further, the sentiment score may be based at least in part on type of news story, wherein the type is one from the group consisting of alert, article, update, correction, and headline. The method may further comprise one or more of: processing the first news story to identify embedded metadata or other descriptors, process text, words, phrases and attribute relevance to the first company; processing the first news story to identify information pertaining to a second company distinguishable from the first company; using sentiment analysis to determine a second sentiment score associated with the first news story as it relates to the second company; determining a second derivative sentiment value related to the second company; providing a predictive model using the derivative sentiment value and the sentiment score to arrive at a predicted price behavior associated with the first company; generating an expression of the predicted behavior, including at least one of trade volume, price direction and price volatility; generating a suggested action to take in light of the predicted behavior (the suggested action relates to a trade decision concerning an investment and is one of a group consisting of buy, sell or hold); and determining a derivative sentiment value related to the first company by comparing a sentiment value associated with a first set of news stories concerning the first company with a sentiment value associated with a second set of new stories concerning the first company. Also, the second set of news stories may comprise fewer news stories as included in the first set of news stories and the second set of news stories are selected based on a temporal value.

In a second embodiment, the present invention provides a computer-based system for predicting price behavior, the system comprising: a processor adapted to execute code; a memory for storing executable code; an input adapted to receive news content comprising a first news story; and a predictive module executed by the processor, the predictive module including code executable by the processor to: process the first news story to identify information pertaining to a first company; apply sentiment analysis to determine a first sentiment score associated with the first news story as it relates to the first company; and determine a derivative sentiment value related to the first company. The system may further comprise one or more of: a feature engine executed by the processor to train the predictive module using historical news data and historical stock price data. The predictive module may include code adapted to process the first news story to identify embedded metadata or other descriptors, process text, words, phrases and attribute relevance to the first company. The predictive module may include code adapted to: process the first news story to identify information pertaining to a second company distinguishable from the first company; apply sentiment analysis to determine a second sentiment score associated with the first news story as it relates to the second company; and determine a second derivative sentiment value related to the second company. The predictive module may include code adapted to: use the derivative sentiment value and the sentiment score to determine a predicted price behavior associated with the first company. The predictive module may include code adapted to: generate an expression of the predicted behavior, including at least one of trade volume, price direction and price volatility.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION OF THE INVENTION

Figure 1:
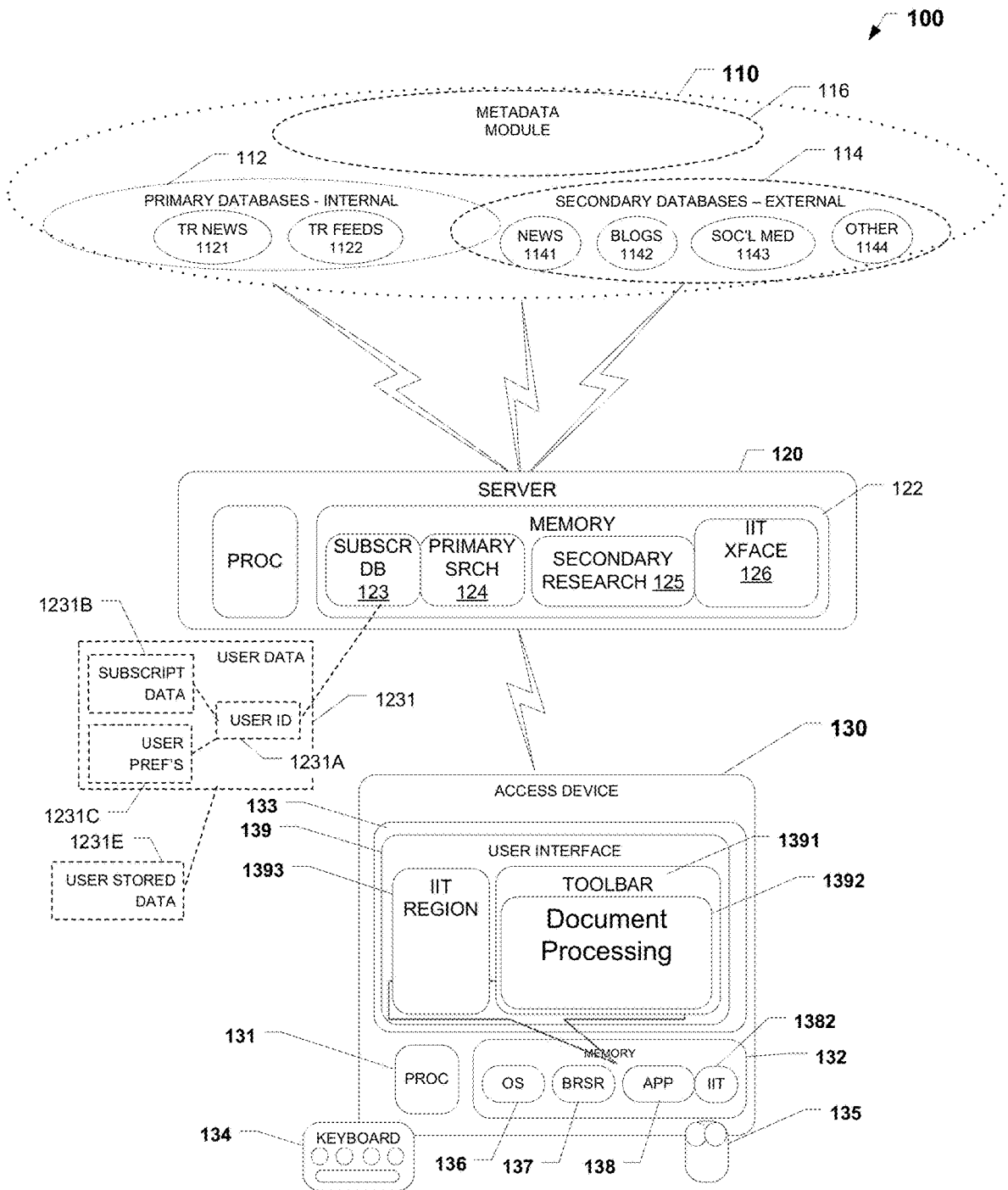
FIG. 1 is a first schematic diagram illustrating an exemplary computer-based system for implementing the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

In accordance with the exemplary embodiments described herein, the present invention provides a News Analytics System (NAS), and related methods, adapted to automatically process and "read" news stories and other content in as close to real-time (relative to release) as possible. Modern news systems include expanded news and metadata about news that allow the NAS to be set up with multidimensional hurdles useful as a source of Alpha for quantitative analysts. The NAS is adapted to use traditional and new media sources of content as sources of "Alpha." For example, internal textual sources available to service providers may be applied against predictive models to arrive at anticipated market-related behavior. In addition, internal sources may be supplemented with external sources, freely available or subscription-based, as additional data points considered by the predictive model. The NAS accesses new media sources of information for quantitative analysts and generates results to enhance investment and trading strategies (e.g., stocks and other equities, bonds and commodities) and enable users to track and spot new opportunities and generate Alpha. The NAS includes a news sentiment analysis to provide further meaningful insight to drive informed trading and investment decisions.

With respect to equities, news metadata shows predictable volatility and directional drift for equities in native English markets (US, UK)—mild positive drift, stronger negative drift. Market conditions and firm attributes change news response in line with a theory of cognitive dissonance. With respect to commodities, news alerts predict intra-day drift-negative drift increases when negative news sentiment increases and positive drift is stronger when positive news is repeated. Drift may be examined in terms of short term (e.g., approximately 30 minutes) reversion with longer term (e.g., approximately two hours) momentum from news events.

The NAS may employ natural language processing techniques to automatically analyze news content and generate trade (e.g., buy/hold/sell) signals in close to real-time. As described herein, the term close to real time means within a second. However, the wider the scope of data used in connection with the NAS, the longer the response time may be. To shorten the response time, a smaller window/volume of data/content may be considered. In addition, the NAS may be configured to maintain a rolling set of data so that it merely updates the existing scoring and reporting and at any given moment is merely processing ("reading" and scoring and predicting) based on newly discovered, received or released content from whatever source. The NAS scans and analyzes stories on thousands of companies in close to real-time and feeds the results into quantitative strategies and predictive models. The NAS outputs can be used to power quantitative strategies across markets, asset classes, and all trading frequencies, support human decision making, and assist with risk management and asset allocation decisions. The NAS tracks news sentiment over time, provides a comprehensive understanding of company-related news coverage, and guides trading and investment decisions.

The NAS employs natural language processing and other linguistics technology to, for example, score text across the following exemplary, primary dimensions: "Author sentiment"—metrics for how positive, negative or neutral the tone of the item is, specific to each company in the article; "Relevance"—how relevant or substantive the story is for a particular item; "Volume analysis"—how much news is happening on a particular company; "Uniqueness"—how new or repetitive the item is over various time periods; and Headline analysis—denotes special features such as broker actions, pricing commentary, interviews, exclusives, and wrap-ups, among many others. The NAS uses rich metadata, for example: company identifiers; topic codes—identifying subject matter; stage of the story—alert, article, update, etc.; and business sector and geographic classification codes; index references to similar articles. The metadata across multiple fields provides differentiated content for use by quantitative analysts and sophisticated algorithmic engines.

The NAS may utilize a variety and variations of text scoring and metadata types. The following are exemplary types for use by the invention: Item Type—Alert, Article, Updates, Corrections; Item Genre—Classification of the story, i.e., interview, exclusive, wrap-up, etc.; Headline—Alert or headline text; Relevance-0-1.0; Prevailing Sentiment—1, 0, −1; Positive, Neutral, Negative—Provides more detailed sentiment indication; Location of First Mention—Sentence location of the first time the item is mentioned; Total Sentences—Used for article length; Number of Companies—How many companies are tagged to the item; Number of Words/Tokens—How many words/tokens are about the company; Total Words/Tokens—Total words/tokens in the news item; Broker Action—Denotes broker actions: upgrade, downgrade, maintain, undefined or whether it is the broker itself; Price/Market Commentary—Used to flag items describing pricing/market commentary; Item Count—How many items have been published on a company over different time periods; Linked Count—Denotes level of repetition from 12 hours to 7 days; Topic Codes—Describes what the story is about, i.e. RCH=Research; RES=Results; RESF=Results Forecast; MRG=Mergers & Acquisitions, etc.; Other Companies—What are the other companies tagged to the article; and Other Metadata—Index IDs, linked references, story chains, etc.

FIGS. 1-4 illustrate exemplary structural components and framework for carrying out the present invention and for providing an effective interface for user interaction with such a computer and database-based system. Following that are more detailed descriptions of the implementation of the processes and features of the present invention, including a discussion of low frequency work on news sentiment and a general exploratory data analysis of equities (including volatility and direction) and commodities. In an exemplary scenario, intended not to limit the invention but merely to help illustrate, the following illustrates how news meta-data is related to prices and discusses short-term relationship between news and prices. The exemplary discussion examiners four equity markets (US, UK, Japan and Hong Kong) and four commodities (crude oil, oil products, precious metals and grains). Exemplary forecasting models and frameworks are discussed thereafter, including a description of an exemplary engine for consuming news and making asset price forecasts. Performance is examined with a goal to make short term predictions about returns, trading volume and volatility.

The NAS may be implemented in a variety of deployments and architectures. NAS data can be delivered as a deployed solution at a customer or client site, via a hosting solution(s) or central server, or through a dedicated service. FIG. 1 shows an exemplary News Analytics System (NAS) 100 comprising an online information-retrieval system adapted to integrate with either or both of a central service provider system or a client-operated processing system. In this exemplary embodiment, NAS System 100 includes at least one web server that can automatically control one or more aspects of an application on a client access device, which may run an application augmented with an add-on framework that integrates into a graphical user interface or browser control to facilitate interfacing with one or more web-based applications. System 100 includes one or more databases 110, one or more servers 120, and one or more access (e.g., client) devices 130.

News Database 110 includes a set of primary databases (Internal) 112, a set of secondary databases (External) 114, and a metadata module 116. Primary databases 112, in the exemplary embodiment, include a News (in this case represented by exemplary Thomson Reuters TR News) database 1121 and a Feed (in this case represented by exemplary Thomson Reuters TR News Feed) database(s) 1122. Secondary databases 114 include News (such as non-internal) database 1141, Blogs database 1142, social media database 1143, and other content database(s) 1144. Metadata module 116 includes is adapted to identify, extra or apply, or otherwise discern metadata associated with news stories. Such metadata may be used by NAS 100 to pre-process news stories, e.g., sentence splitting, speech tagging, parsing of text, tokenization, etc., to facilitate association of stories with one or more companies and to prepare the content for the application of computational linguistic processes and for sentiment analysis.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a primary search module 124, metadata research module 125, and a user-interface module 126. Processor module 121 includes one or more local or distributed processors, controllers, or virtual machines. Memory module 122, which takes the exemplary form of one or more electronic, magnetic, or optical data-storage devices, stores subscriber database 123, primary search module 124 (such as for predictive analysis related to a company based on the predictive modeling of the present invention), secondary research module 125 (such as other financial services available to the user to further research a company of interest), and user-interface module 126.

Subscriber database 123 includes subscriber-related data for controlling, administering, and managing pay-as-you-go or subscription-based access of databases 110. In the exemplary embodiment, subscriber database 123 includes one or more user preference (or more generally user) data structures. In the exemplary embodiment, one or more aspects of the user data structure relate to user customization of various search and interface options. Primary search module 124 includes one or more search engines and related user-interface components, for receiving and processing user queries against one or more of databases 110.

Figure 2:
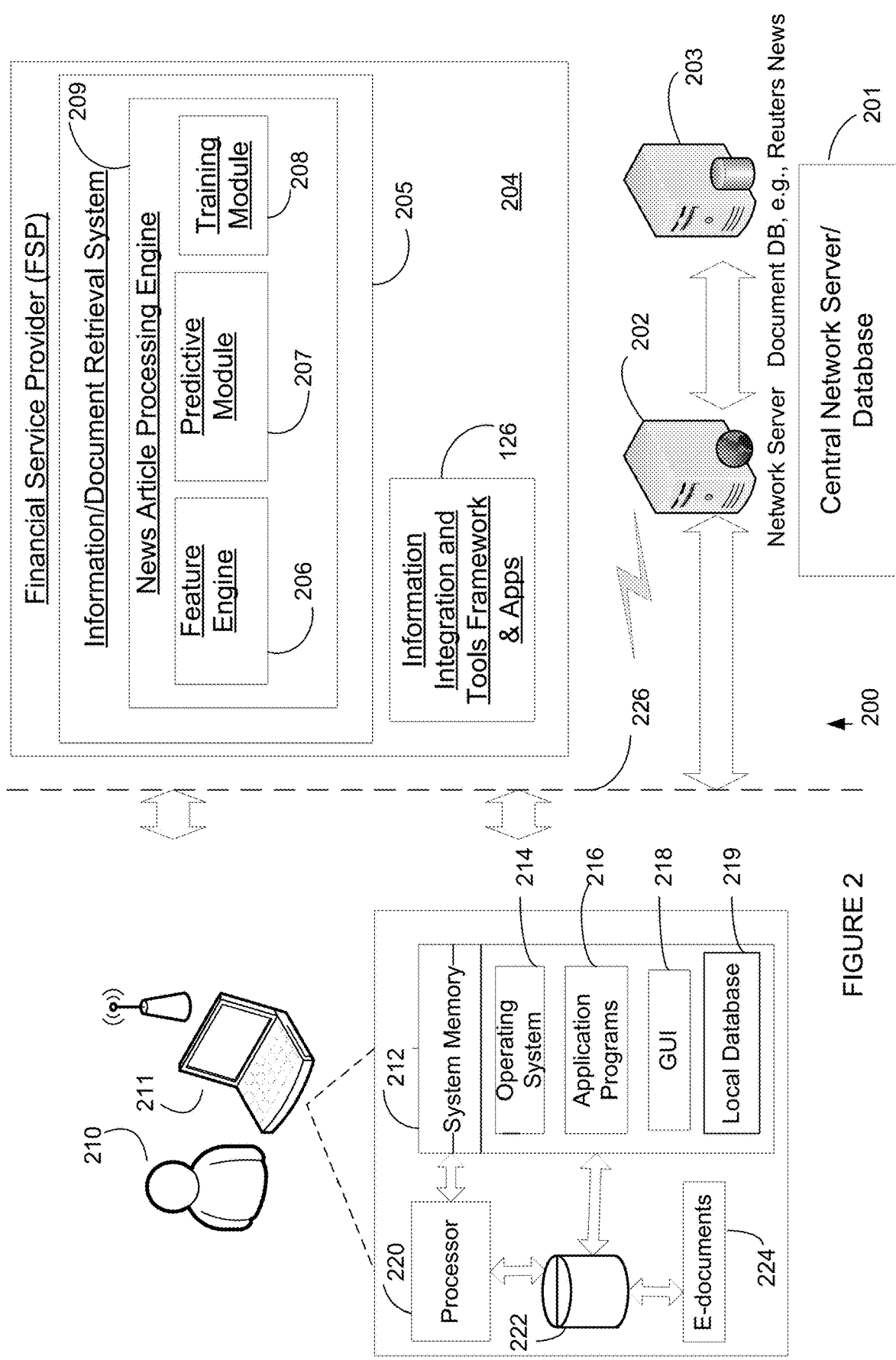
FIG. 2 is a second schematic diagram illustrating an exemplary computer-based system for implementing the present invention.

Information-integration-tools (IIT) framework module 126 (or software framework or platform) includes machine readable and/or executable instruction sets for wholly or partly defining software and related user interfaces having one or more portions thereof that integrate or cooperate with one or more applications. As shown in FIG. 2, NAS includes a News Article Processing Engine that cooperates with IIT 126 and metadata module 116, that includes or may cooperate with one or more search engines for receiving and processing against metadata and aggregating, scoring, and filtering, recommending, and presenting results. In the exemplary embodiment, NAP Engine 209 includes one or more feature vector builders or feature engine 206, predictive modeling module 207, and learning or training engine or module 208 to implement the functionality described herein.

With reference to FIG. 1, access device 130, such as a client device, is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131 one or more processors (or processing circuits) 131, a memory 132, a display 133, a keyboard 134, and a graphical pointer or selector 135. Processor module 131 includes one or more processors, processing circuits, or controllers. In the exemplary embodiment, processor module 131 takes any convenient or desirable form. Coupled to processor module 131 is memory 132. Memory 132 stores code (machine-readable or executable instructions) for an operating system 136, a browser 137, document processing software 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of graphical user interfaces on display 133. Upon launching processing software an integrated information-retrieval graphical-user interface 139 is defined in memory 132 and rendered on display 133. Upon rendering, interface 139 presents data in association with one or more interactive control features (or user-interface elements).

In one embodiment of operating a system using the present invention, an add-on framework is installed and one or more tools or APIs on server 120 are loaded onto one or more client devices 130. In the exemplary embodiment, this entails a user directing a browser in a client access device, such as access device 130, to internet-protocol (IP) address for an online information-retrieval system, such as offerings from Thomson Reuters Financial and other systems, and then logging onto the system using a username and/or password. Successful login results in a web-based interface being output from server 120, stored in memory 132, and displayed by client access device 130. The interface includes an option for initiating download of information integration software with corresponding toolbar plug-ins for one or more applications. If the download option is initiated, download administration software ensures that the client access device is compatible with the information integration software and detects which document-processing applications on the access device are compatible with the information integration software. With user approval, the appropriate software is downloaded and installed on the client device. In one alternative, an intermediary "firm" network server may receive one or more of the framework, tools, APIs, and add-on software for loading onto one or more client devices 130 using internal processes.

Once installed in whatever fashion, a user may then be presented an online tools interface in context with a document-processing application. Add-on software for one or more applications may be simultaneous invoked. An add-on menu includes a listing of web services or application and/or locally hosted tools or services. A user selects via the tools interface, such as manually via a pointing device. Once selected the selected tool, or more precisely its associated instructions, is executed. In the exemplary embodiment, this entails communicating with corresponding instructions or web application on server 120, which in turn may provide dynamic scripting and control of the host word processing application using one or more APIs stored on the host application as part of the add-on framework.

FIG. 2 illustrates another representation of an exemplary NAS system 200 for carrying out the herein described processes that are carried out in conjunction with the combination of hardware and software and communications networking. In this example, system 200 provides a framework for searching, retrieving, analyzing, and ranking System 200 may be used in conjunction with a system 204 offering of a information or professional financial services provider (FSP), e.g., Thomson Reuters Financial, and include an Information Integration and Tools Framework and Applications module 126, as described hereinabove. Further, in this example, system 200 includes a Central Network Server/Database Facility 201 comprising a Network Server 202, a Database of documents, e.g., news stories, blogs, etc., 203, an Information/Document Retrieval System 205 having as components a Search Engine 209, a Feature building module 206, a Predictive module 207 and a Training or Learning Module 208. The Central Facility 201 may be accessed by remote users 210, such as via a network 226, e.g., Internet. Aspects of the system 200 may be enabled using any combination of Internet or (World Wide) WEB-based, desktop-based, or application WEB-enabled components. The remote user system 210 in this example includes a GUI interface operated via a computer 211, such as a PC computer or the like, that may comprise a typical combination of hardware and software including, as shown in respect to computer 211, system memory 212, operating system 214, application programs 216, graphical user interface (GUI) 218, processor 220, and storage 222, which may contain electronic information 224 such as electronic documents. The methods and systems of the present invention, described in detail hereafter, may be employed in providing remote users, such as investors, access to a searchable database. In particular, remote users may search a database using search queries based on company GIC, stock or other name to retrieve and view predictive analysis and/or suggested action as discussed hereinbelow. Client side application software may be stored on machine-readable medium and comprising instructions executed, for example, by the processor 220 of computer 211, and presentation of web-based interface screens facilitate the interaction between user system 210 and central system 211. The operating system 214 should be suitable for use with the system 201 and browser functionality described herein, for example, Microsoft Windows Vista (business, enterprise and ultimate editions), Windows 7, or Windows XP Professional with appropriate service packs. The system may require the remote user or client machines to be compatible with minimum threshold levels of processing capabilities, e.g., Intel Pentium III, speed, e.g., 500 MHz, minimal memory levels and other parameters.

The configurations thus described are ones of many and are not limiting as to the invention. Central system 201 may include a network of servers, computers and databases, such as over a LAN, WLAN, Ethernet, token ring, FDDI ring or other communications network infrastructure. Any of several suitable communication links are available, such as one or a combination of wireless, LAN, WLAN, ISDN, X.25, DSL, and ATM type networks, for example. Software to perform functions associated with system 201 may include self-contained applications within a desktop or server or network environment and may utilize local databases, such as SQL 2005 or above or SQL Express, IBM DB2 or other suitable database, to store documents, collections, and data associated with processing such information. In the exemplary embodiments the various databases may be a relational database. In the case of relational databases, various tables of data are created and data is inserted into, and/or selected from, these tables using SQL, or some other database-query language known in the art. In the case of a database using tables and SQL, a database application such as, for example, MySQL™, SQLServer™, Oracle 81™, 10G™, or some other suitable database application may be used to manage the data. These tables may be organized into an RDS or Object Relational Data Schema (ORDS), as is known in the art.

Figure 3:
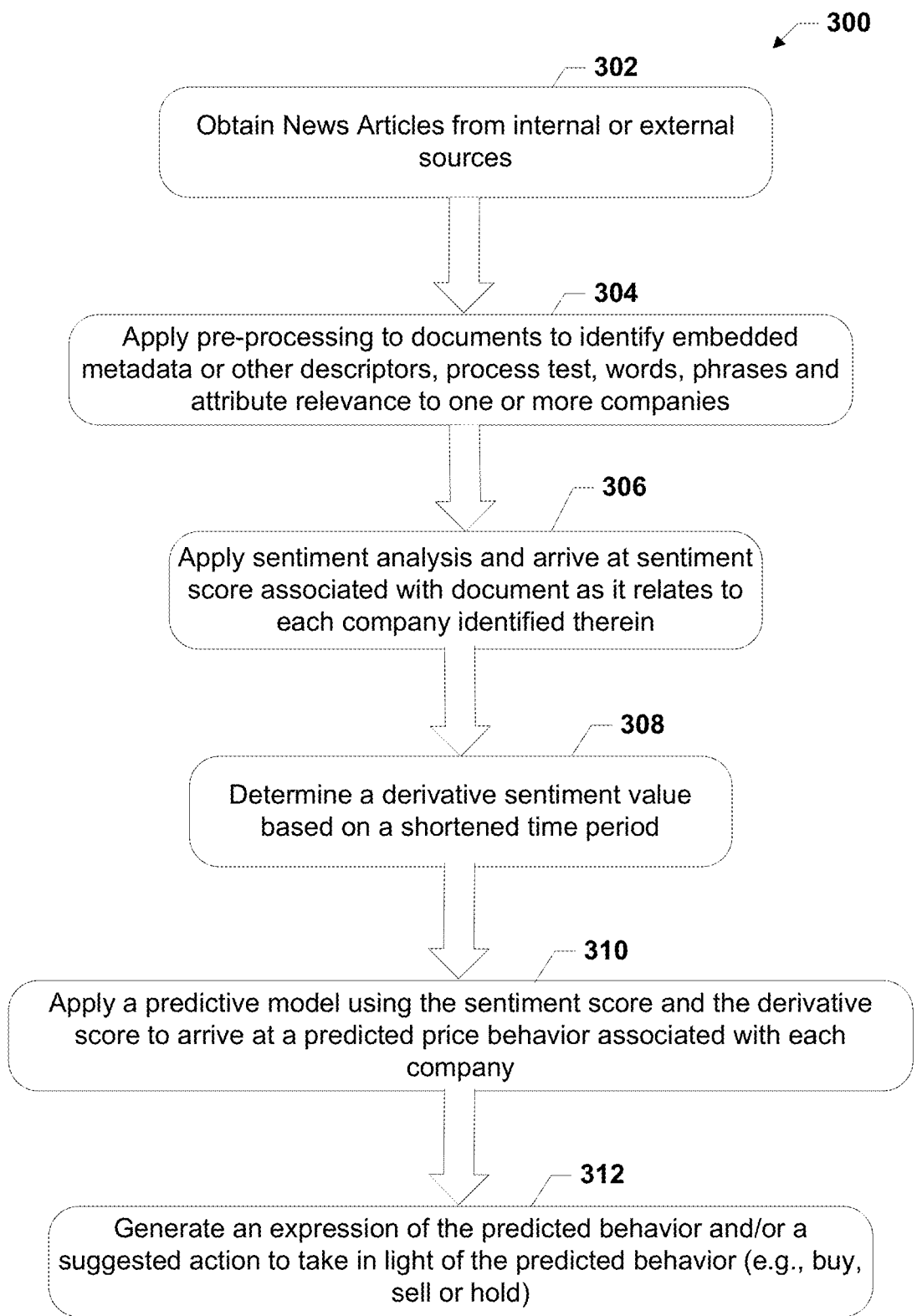
FIG. 3 is a search flow diagram illustrating an exemplary method of implementing the present invention.

In one exemplary method of the present invention, and with reference to the flow of FIG. 3, the following processes are performed. Initially, at step 302, a user obtains news articles or other suitable content (news feeds, blogs, etc.) from internal or external sources. At step 304 the system applies pre-processing to documents to identify embedded metadata or other descriptors, process test, words, phrases and attribute relevance to one or more companies. At step 306, the system applies sentiment analysis and arrive at one or more sentiment scores associated with a document as it relates to each company identified therein. At step 308, the system determines a derivative sentiment value based on a shortened time period. At step 310, the system applies a predictive model using the sentiment score and the derivative score to arrive at a predicted price behavior associated with each company. At step 312, the user generates an expression of the predicted behavior and/or a suggested action to take in light of the predicted behavior (e.g., buy, sell or hold).

Figure 4:
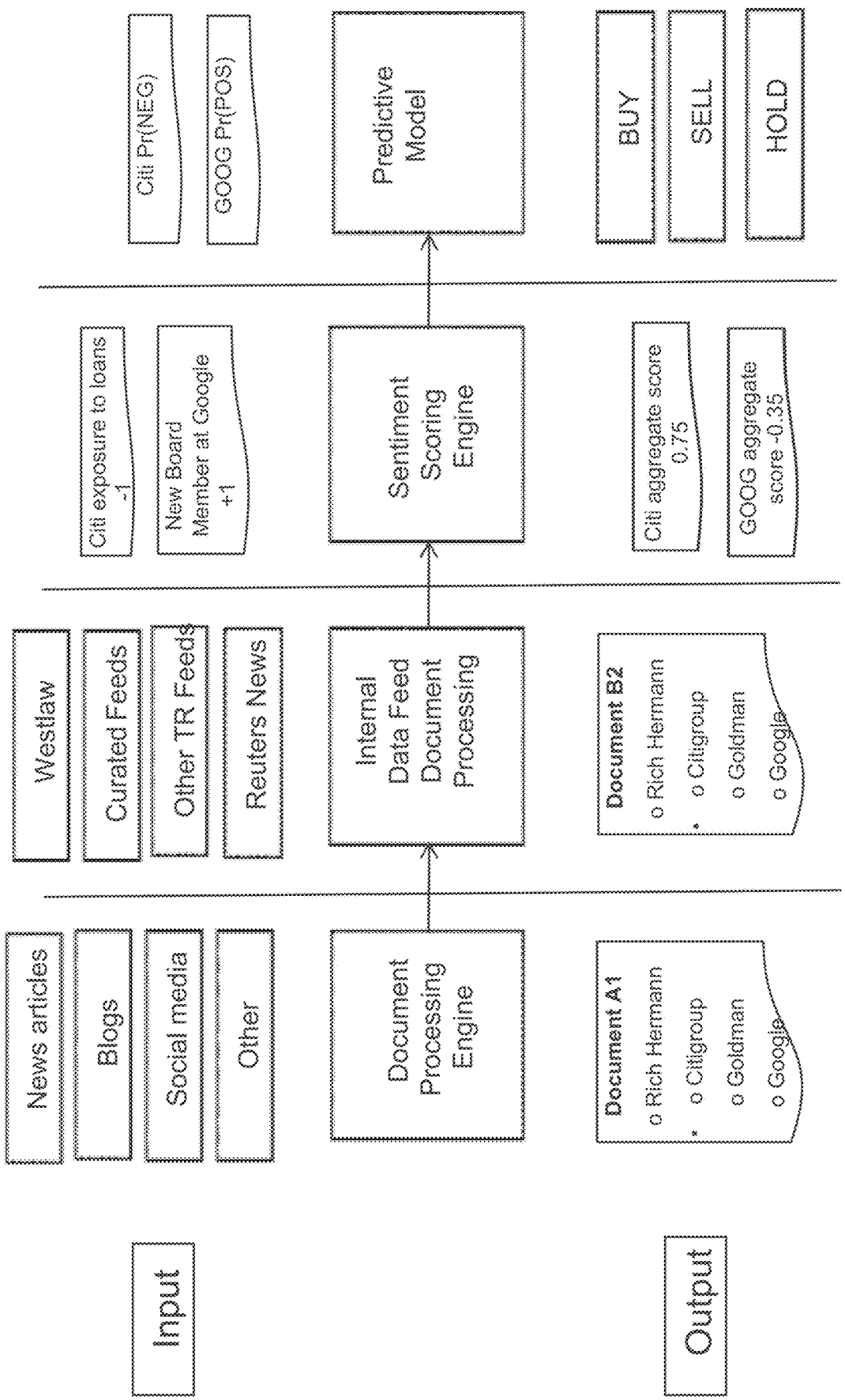
FIG. 4 is a flow diagram illustrating a database and new story processing and sentiment analytics and predictive engine aspect of the present invention.

FIG. 4 is a flow diagram illustrating database and document processing, sentiment scoring and predictive modeling aspects of the present invention as input and output of a system employing the present invention, such as the method of FIG. 3. For instance, external document or news information, such as news articles and traditional news sources, blogs, social media, is seen as an input to a document processing engine. Internal news feeds and the like, e.g., TR Feeds, Reuters News, Westlaw, Curated feeds, are processed by an internal data feed document processing module. The combined news feeds are further processed by sentiment scoring engine and are ultimately processed in accordance with a predictive model to output predictive analysis of respective companies or other outputs such as suggested actions (buy, sell or hold).

Figure 5:
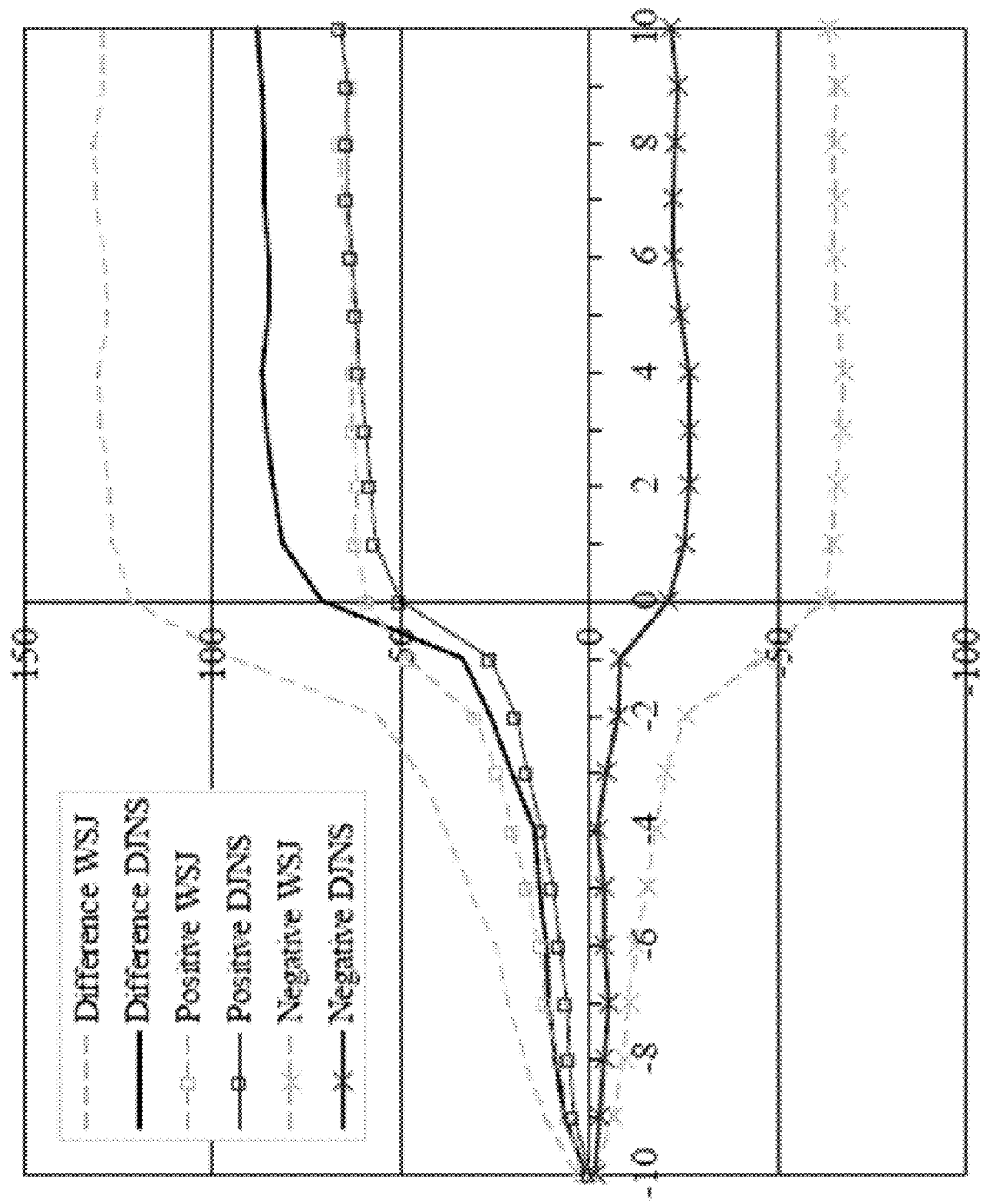
FIG. 5 is a chart representing the Tetlock News Event Study (1984-2004) illustrating the affect of news stories on stock price.

FIG. 5 is a chart that represents the Tetlock News Event Study (1984-2004) and shows firm (stock price) valuations around positive and negative new stories. All news stories focus on S&P 500 firms and come from either Dow Jones News Service (DJNS) or The Wall Street Journal (WSJ)

between 1980 and 2004 inclusive. The chart illustrates an exemplary firm stock price behavior around positive and negative news stories. The figure is a graphical representation of a firm's historical abnormal event returns from ten trading days preceding a news story's release to ten trading days following its release. The abscissa represents trading day relative to story release and the ordinate represents Cumulative Abnormal Returns (CAR) in basis points (BP). The plotted response curves represent differences (WSJ/DJNS), positive abnormal return (WSJ/DJNS) and negative abnormal return (WSJ/DJNS). As indicated by the response curves, there exists a correlation between the release of positive/negative news stories and price behavior. As apparent from the curves, abnormal returns begin to appear prior to the release (point 0) of a story and continue following the initial release date.

Figure 6:
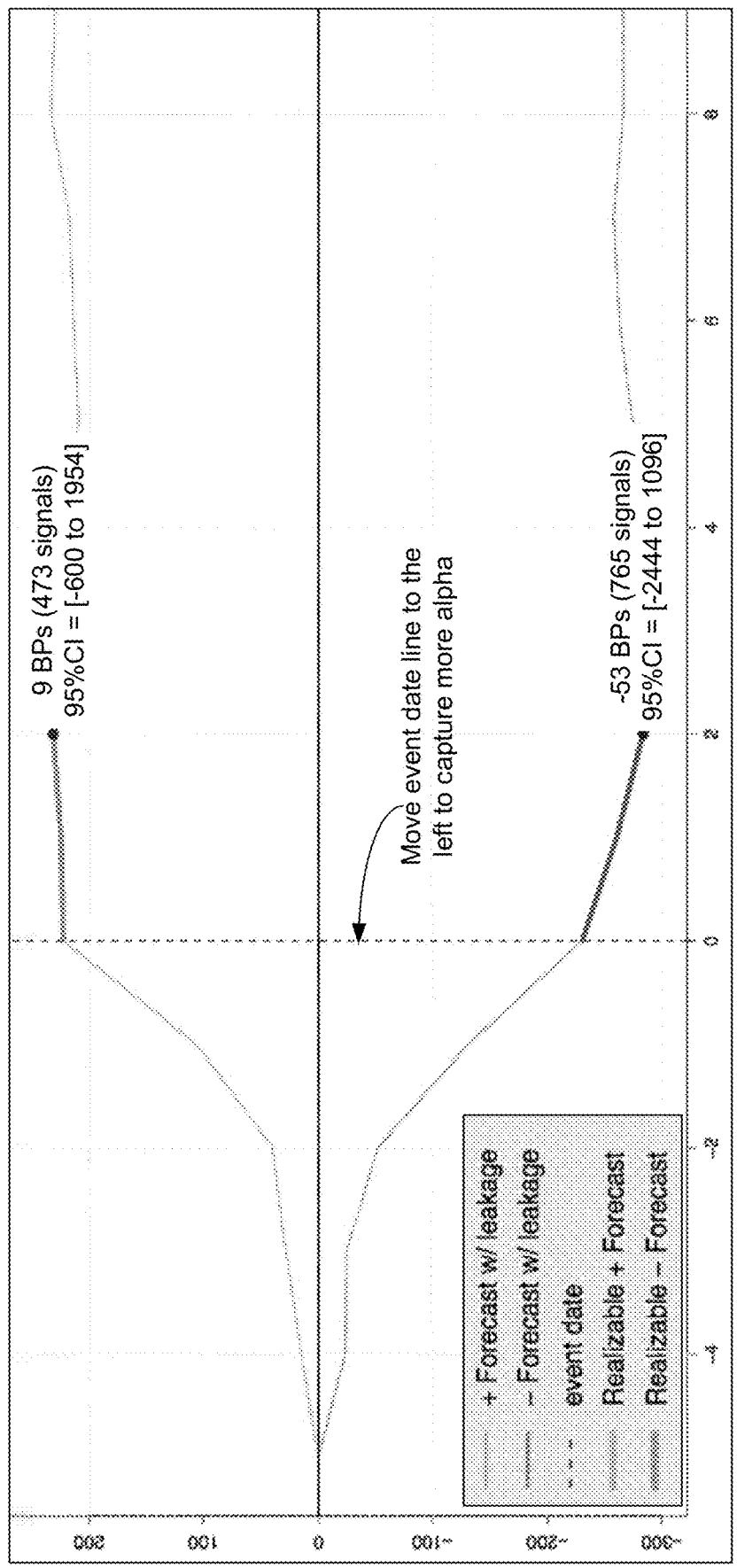
FIGS. 6-43 are charts that represent response curves associated with the application of news analytics.
Figure 7:
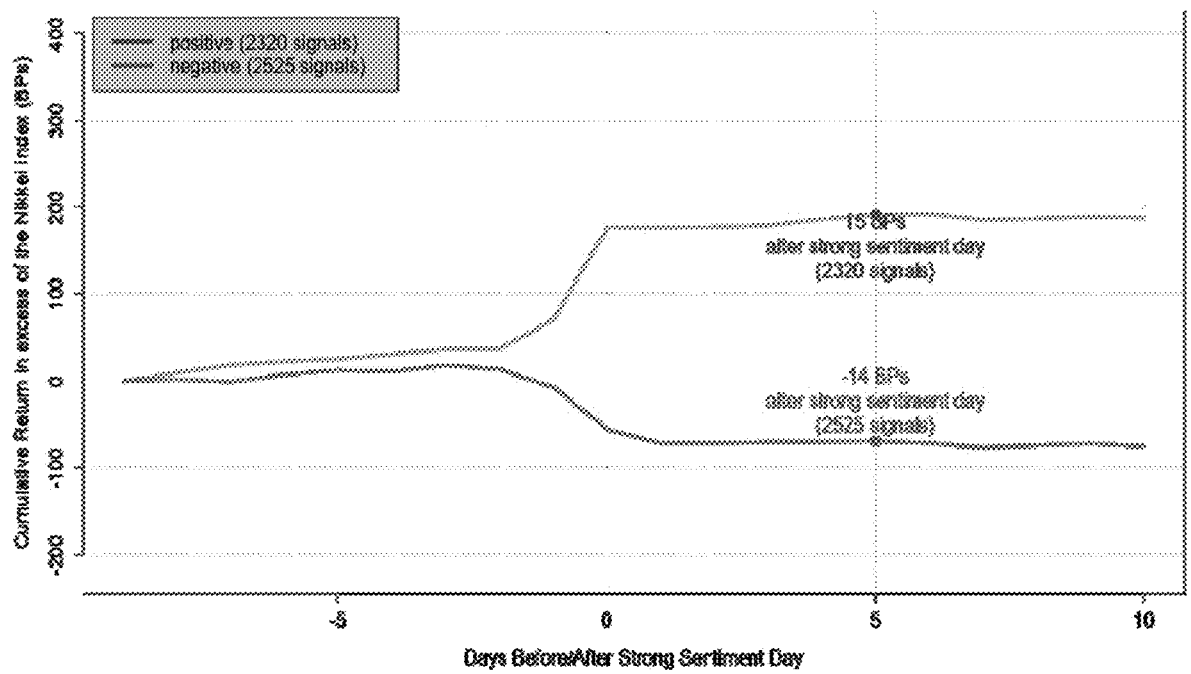

FIG. 6 is a chart that represents response curves associated with an application of news analytics to positive and negative news stories over a period of five days leading up to an event (−5 through −1), the day of the event (0), and nine days after the event (1-9). In this example, the event occurring at day (0) is at least five stories on one day, all positive or negative, for companies listed in the S&P 1500 from 2003-02 through 2008-12. For example, the stories may relate to a release of performance data, a new contract that will result in increased revenues, etc. for which a public release of information concerning the event does not occur until event day (0). As seen in the example, information of information likely the subject of the stories (positive or negative) may be leaked on days −5 through −1, thus causing a gradual run-up to the deviation from SPY. As the response curves deviate from 0 on the ordinate (which represents Return Excess of SPY (symbol for SPDR Standard & Poor's Depositary Receipts S&P 500 Stock Index) to a range of −300 to over 200 in Basis Points, the deviation increases, non-linearly, up to day 0 and then continues to deviate less sharply after event day 0. To achieve a greater performance, the system in essences moves the event date to the left as indicated on the graph to capture more Alpha. In other words, the system preferably gives predictive indication prior to day 0 so that more of the price deviation is realized. For instance, for stocks experiencing a positive deviation a "buy" signal at the earliest possible point in time is preferred and for stocks experiencing a negative deviation from SPY a "sell" signal at the earliest possible point in time is preferred.

Figure 8:
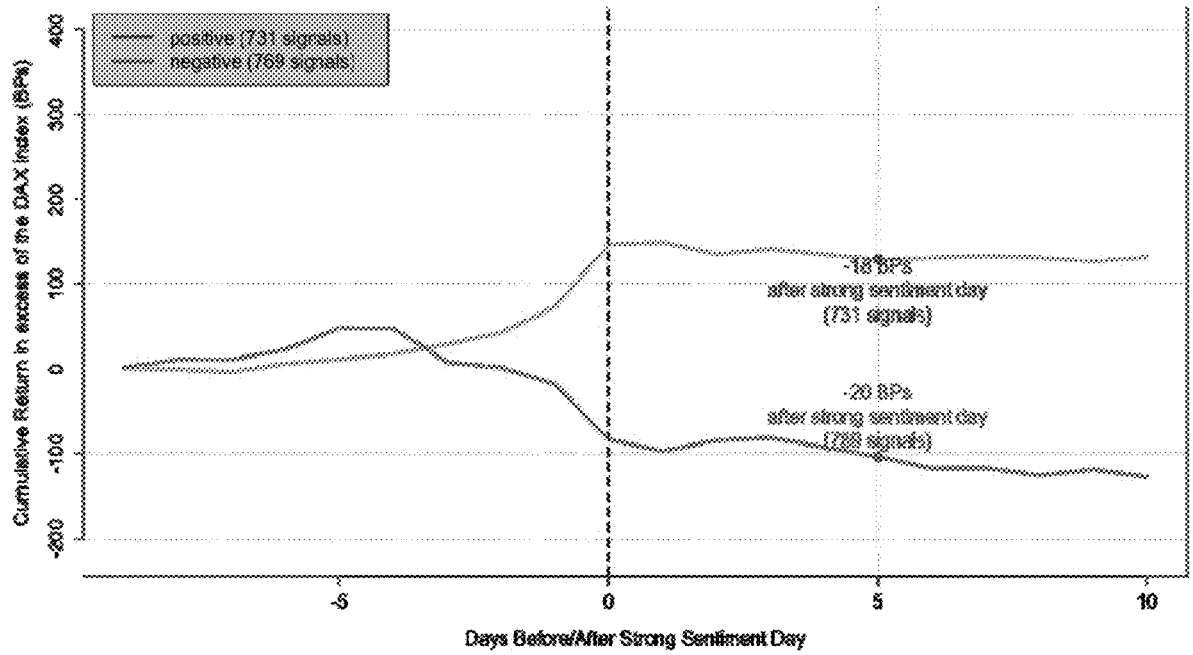
Figure 9:
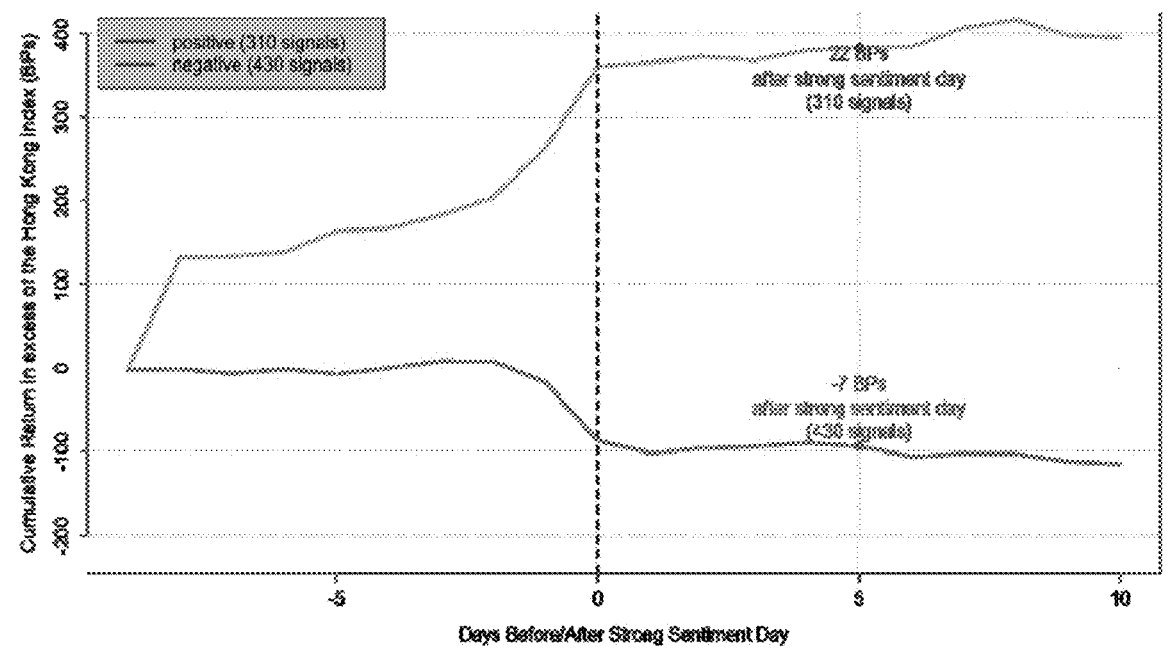
Figure 10:
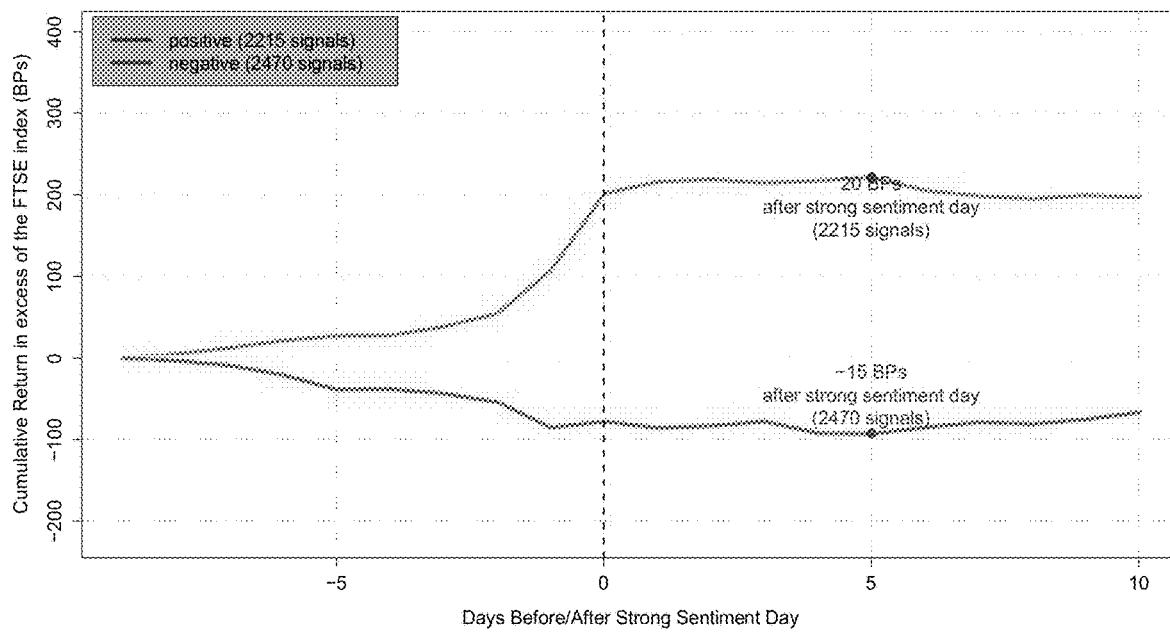

FIGS. 7-10 are graphical representations that show the news/price correlation exists across national borders with consistent results in many jurisdictions and markets. Each chart represents an example of extreme sentiment days for each respective index. In each of the four charts the ordinate represents the cumulative return in excess of the respective index (FIG. 7—Nikkei Index; FIG. 8—DAX Index; FIG. 9—Hong Kong Index; and FIG. 10—FTSE Index) and the abscissa represents the days before (Days −10 through −1) and days after (1-10) a strong sentiment day (Day 0). As with the chart of FIG. 6, in each of the charts return varies from the index leading up to the event day 0. If an investor can move the line from day 0 to predict the coming deviation prior to its occurrence, then greater profits may be realized or losses avoided.

By way of example, for the S&P 1500 the monthly tally of RICs, i.e., Reuters instrument code, for which there is at least one news item in the RNSE archive has grown from approximately 600 to approximately 1000 from 2003 to the present. RICs, ticker-like codes used to identify financial instruments and indices, are used for looking up information on various financial information networks (like Thomson Reuters market data platforms, e.g., Bridge, Triarch, TIB and RMDS—Reuters Market Data System (RMDS) open data integration platform). Reuters NewsScope Sentiment Engine (RNSE) enables clients to leverage a unique set of news sentiment, relevance, and novelty indicators for algorithmic trading systems as well as risk management and human decision support processes. The service utilizes a new linguistic model which has been developed specifically for this market and scores sentiment in milliseconds for news on 40 commodity and energy assets in addition to over 10,000 companies supported in the current offering. The NAS may include a sentiment scoring engine, such as RNSE, as an extension of the machine-readable news function. The invention is not limited to the specific and exemplary types of investments listed herein. Algorithmic trading is useful to both sell and buy-side market participants in the cash equity markets as well as other liquid asset classes such as foreign exchange, commodities and energy markets. Commodity markets offer significant opportunities for institutional investors and proprietary traders to grow and diversify investment strategies. Given the growth of the global commodities and energy markets, price volatility and increased adoption of this asset class into active trading strategies customer demand for relevant quantitative solutions is increasing. The sentiment scores produced can be used by trading desks and quantitative research analysts to better model the movement of asset prices. Clients have access to historical data, which allows them to back-test the system's applicability for their trading and investment strategies.

The NAS may be tuned or back-tested using historical data. The NAS may be configured to set news thresholds or hurdles using metadata to find high volume, relevant, actionable news. In one manner, the NAS is set up to act or generate signals based on extreme sentiment, e.g., company-specific day signals. In one scenario, the NAS triggers a prediction and suggested action when at least four novel news events occur prior to a set time, e.g., 3:30 pm, for trade at close. Novel news items are distinguishable from "copy-cat" or other similar news reports in essence reporting the same information as an original news story. However, the sentiment or news analytics engine of the NAS may give some weight to extreme or abnormal volume related to the same story. This may be perceived as an indication of greater importance or significance to the company and to its stock price. Also, where average sentiment is extremely positive or negative represents top 5% of average daily distribution.

In another manner, the NAS may be configured so that: a "pure" news signal could be combined with many others, e.g., see Deutsche Bank Signal Processing report; portfolio cash & beta may be allowed to vary with signals; daily trading at market close; transaction costs included, e.g., 25 basis point round trip transaction cost; hold for 20 days, subject to stop-loss rule set at 5%, profit take rule set at 20%.

Figure 11:
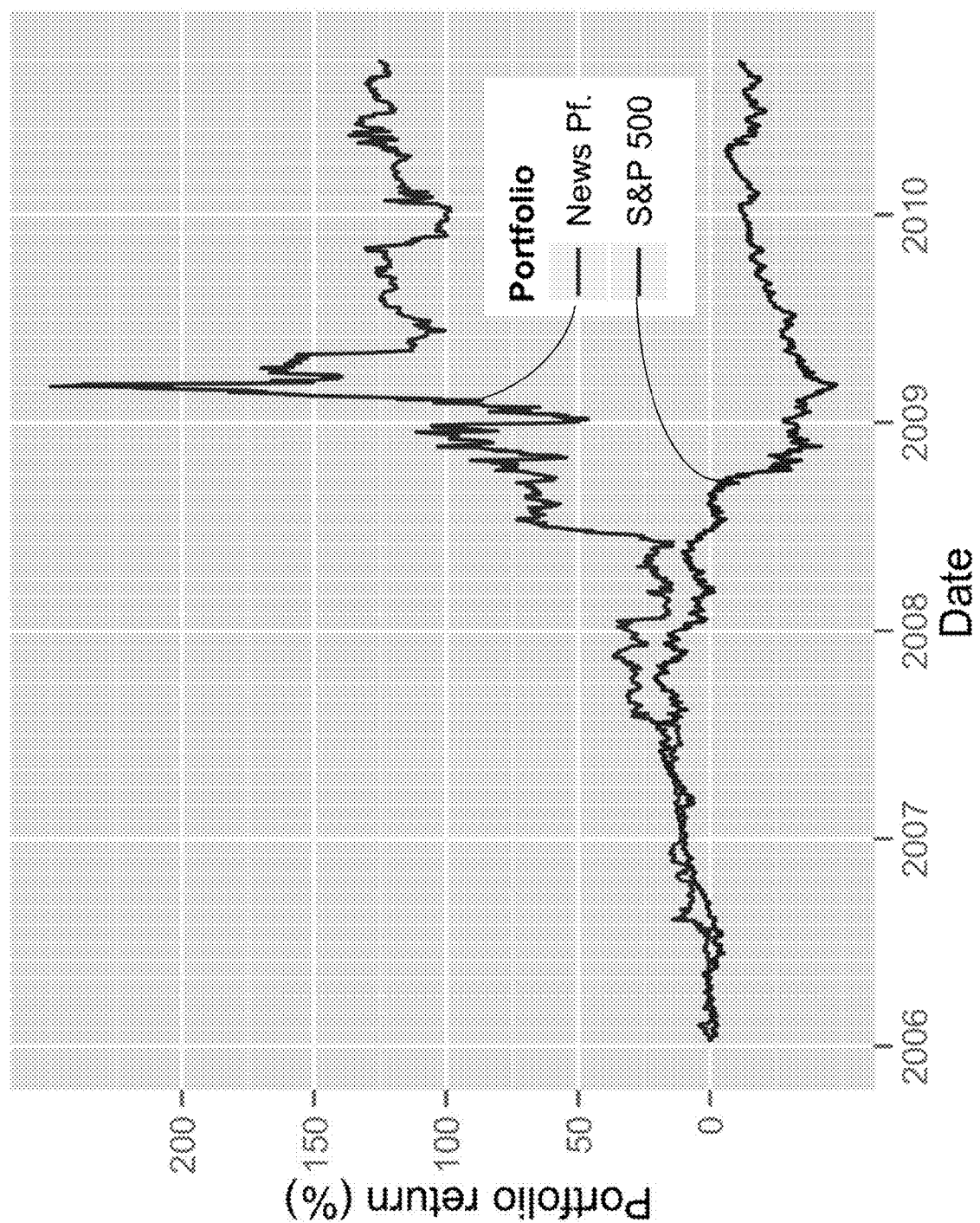

FIG. 11 is a chart representing respective portfolio returns for a News-adjusted, news driven portfolio using the NAS as compared against the performance of the S&P 500 Index for historical data commending in 2006 and ending in mid-year 2010. In addition to predictive price movement, the NAS of the present invention may be used to predict a degree of volatility associated with extreme news activity.

In configuring the NAS, consideration may be given not only to how news metadata conditions or affects price response, but also how the market may condition news response and how from a broad overall "market" perspective that may affect how significant news may be on a company basis. Aspects of how the market conditions news response include: volatility, market direction, firm beta, firm market capitalization. Aspects of how news metadata may condition price response include: polarity, extremity, novelty, and topics.

Such exploratory data analysis of, for example, equities (stocks) and commodities involves determining various attributes derived from tracked and collected (or otherwise obtained) data and filtering of such data. In keeping with the present invention, the methods and systems consider, for example, attributes of news meta-data, seasonality and regimes. The following are recognized attributes of news meta-data: intensity; novelty; polarity; and extremity. Regimes include directional, volatility and sentiment.

With respect to filtering collected data, in one exemplary manner the system may limit the analysis to consider news with relevance greater than or equal to a score of, e.g., 0.3. Further, the system may remove "WRAPUP" and "IMBALANCE" items. The system may also filter using predetermined codes or categories, e.g., filter by RIC. For example, using Commodity RICs, the system filters as follows: CRU—Crude oil commodities news; PROD—Oil Products commodities news; MET—Precious and Industrial metals commodities news; and GRA—Grains commodities news. Using Equity RICs, the system filters as follows: .N/.O—US Equity news (NYSE, NASDAQ); .T—Japanese equity news (Tokyo Stock Exchange); .HK—Honk Kong equity news (Hong Kong Stock Exchange); and .L—UK Equity news (London Stock Exchange).

In one example, the data in Table 1, represents data from a Thomson Reuters historical statistics database and is used with the following constraints as a global filter: relevance score >=0.3; no order imbalance messages; and 2003 through end of 2011Q3.

TABLE 1

| Equity Market | Exchanges | Number of News Items | Number of Distinct RICs | # of RICs with >=400 news items |
|---|---|---|---|---|
| US | NYSE (.O) and NASDAQ (.N) | 6.13 million | 7485 | 3425 |
| UK | London Stock Exchange (.O) | 3.67 million | 1536 | 1192 |
| Hong Kong | Hong Kong Stock Exch (.HK) | .68 million | 1236 | 554 |
| Japan | Tokyo Stock Exchange (.T) | .76 million | 2183 | 228 |

TABLE 2

| Commodity Category | # of News Items |
|---|---|
| Crude Oil | .74 million |
| Precious Metals | .72 million |
| Grains | .46 million |
| Oil Products | .41 million |

Exploratory Data Analysis involves, e.g., news meta-data, which may include: intensity; novelty; polarity; and extremity. Exploratory data analysis of seasonality may focus on: monthly seasonality; daily seasonality; and/or hourly seasonality. Exploratory data analysis of regimes may include: up versus down regime; high versus low volatility regime; and market sentiment regimes.

With respect to relating news meta-data to prices, the system may focus on equities and commodities. For example, considering a fixed time-from for data of Jan. 1, 2007-Sep. 31, 2011, the system may consider new attributes and framing/context of data. News Attributes may include: Relevance; Novelty; Extremity; and Topics, news sources/genres/etc. Framing/Context of data may include: Directional; Volatility; and Sentiment.

Table 3, represents an exemplary data profile of new responses for four sets of equities from four markets: US, UK, Japan and Hong Kong, with a data period of January 2009 to Sep. 24, 2011. The data collected for the NYSE and NASDAQ exchanges in the US totaled 1.59 million news items covering 6,038 equities with market caps ranging from $200,000 to $420 billion and comprised: 661,000 articles (42%); 752,000 alerts (47%); and 175,000 appends (11%).

TABLE 3

| Country | Exchanges | RIC Suffixes | # unique equity RICs | # News Items | Market Proxy | Market Proxy RIC |
|---|---|---|---|---|---|---|
| United States | NYSE, NASDAQ | .N, .O | 7319 | 1.59 million | S&P 500 Index | .SPX |
| United Kingdom | London Stock Exch | .L | 1459 | .693 million | FTSE 100 Index | .FTSE |
| Japan | Tokyo Stock Exch | .T | 2177 | .0707 million | Nikkei 225 | .N225 |
| Hong Kong | Hong Kong Stock Exch | .HK | 1236 | .199 million | Hang Seng Index | .HSI |

In this example, equities related data may be considered from a "general news response" perspective or responses may be may be filtered equity responses. For example, the news responses may be filtered by country, e.g., US, UK, Japan, or Hong Kong, or by RIC, market proxy, market proxy RIC or exchange.

Figure 12:
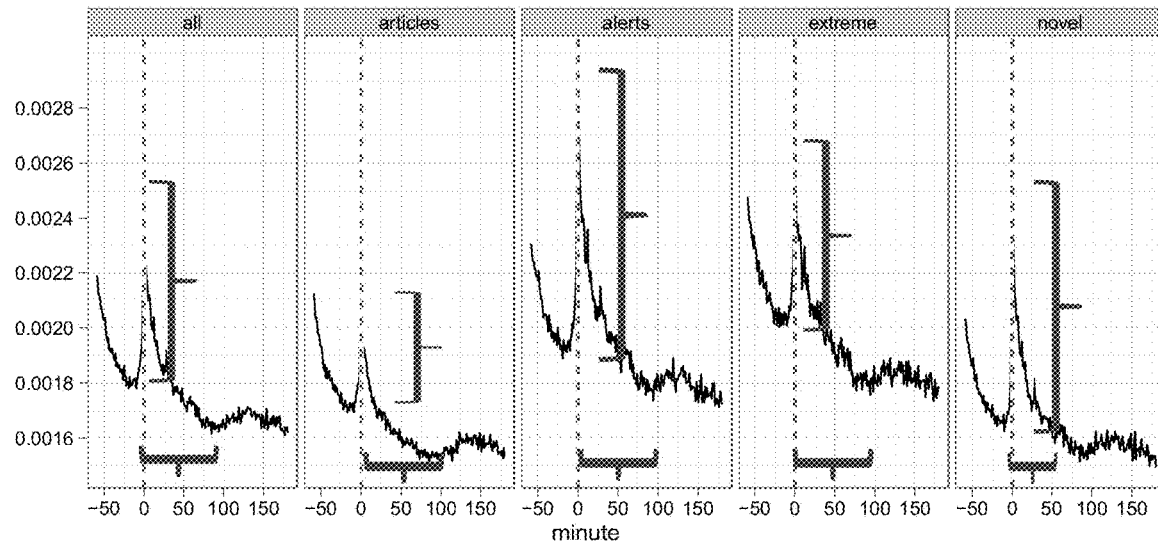
Figure 13:
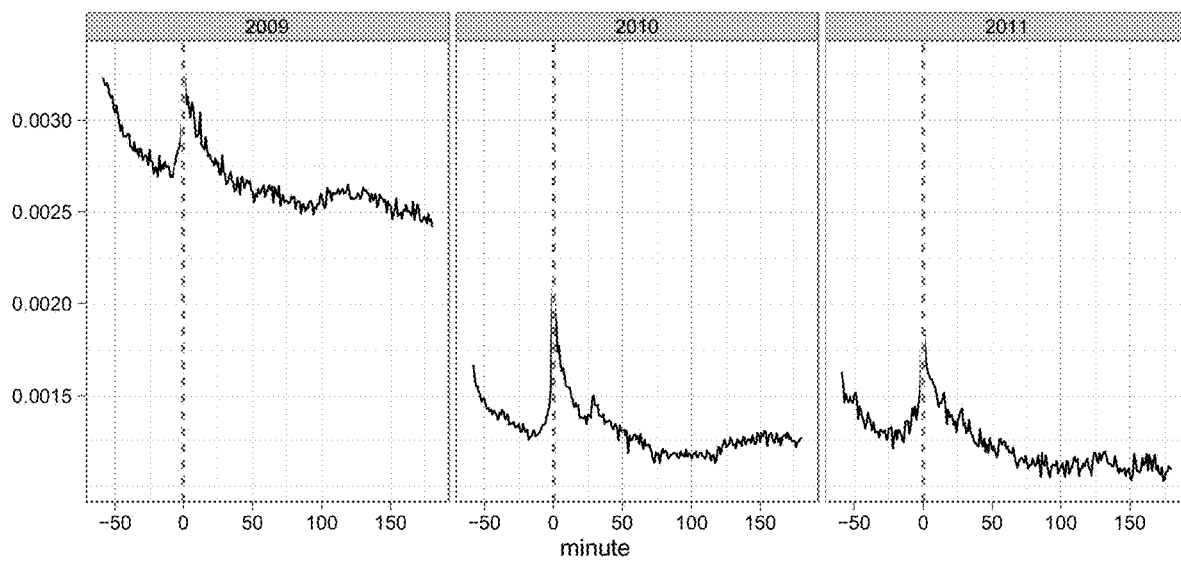
Figure 14:
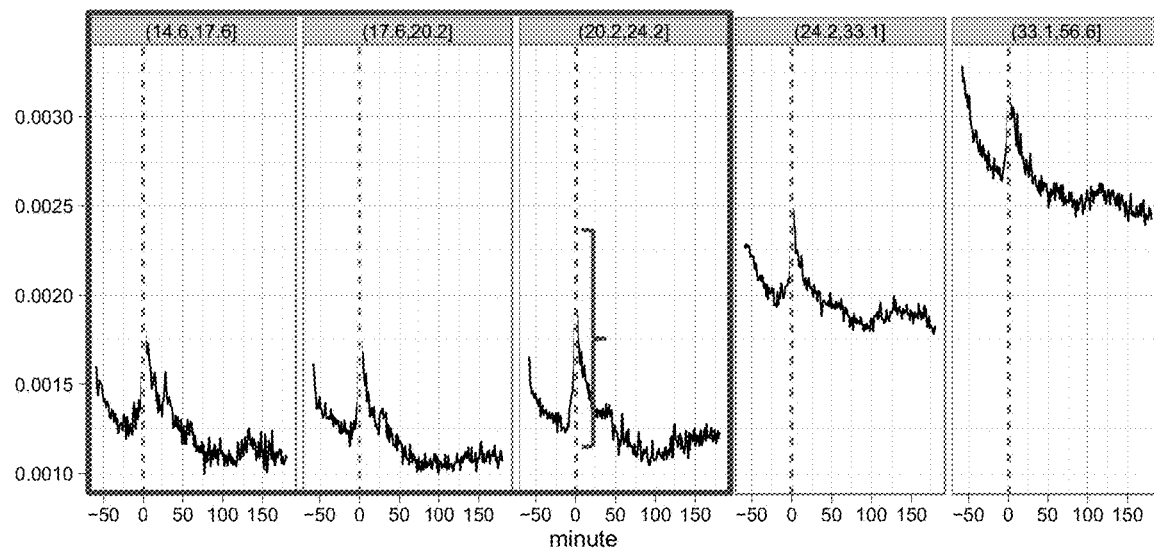
Figure 15:
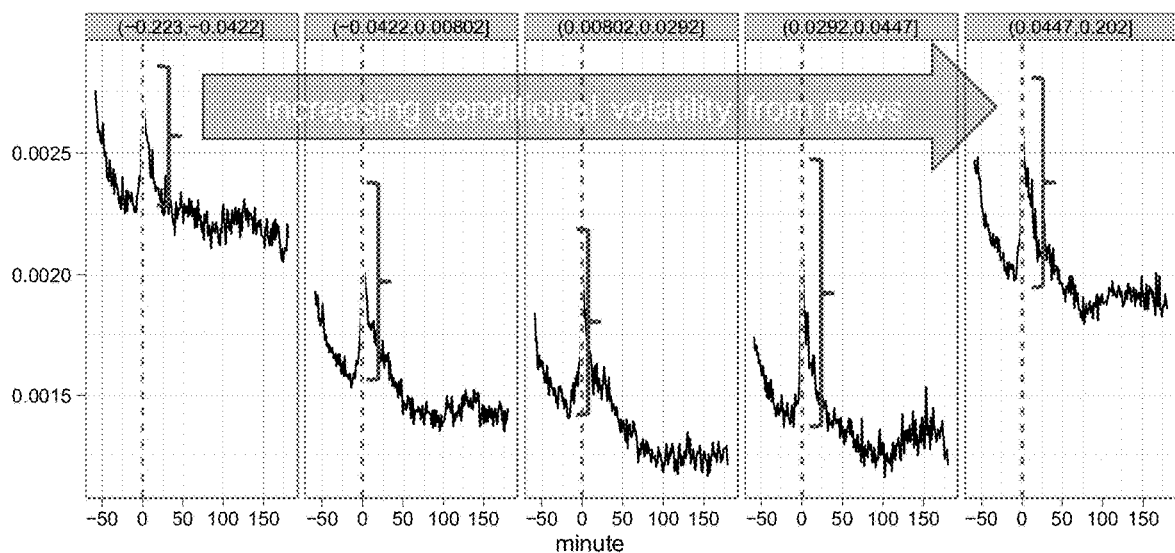
Figure 16:
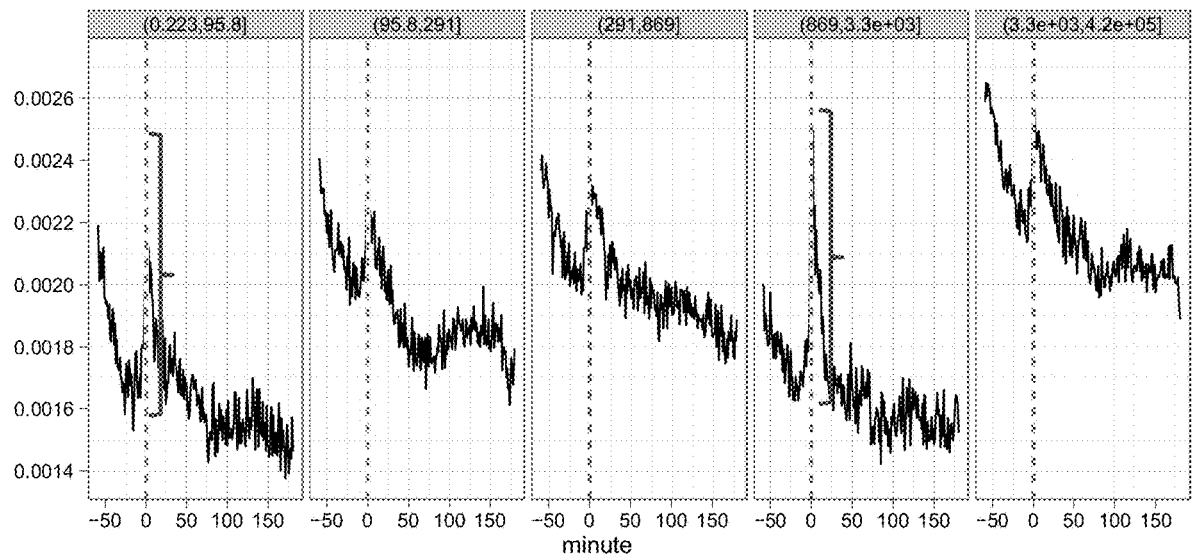
Figure 17:
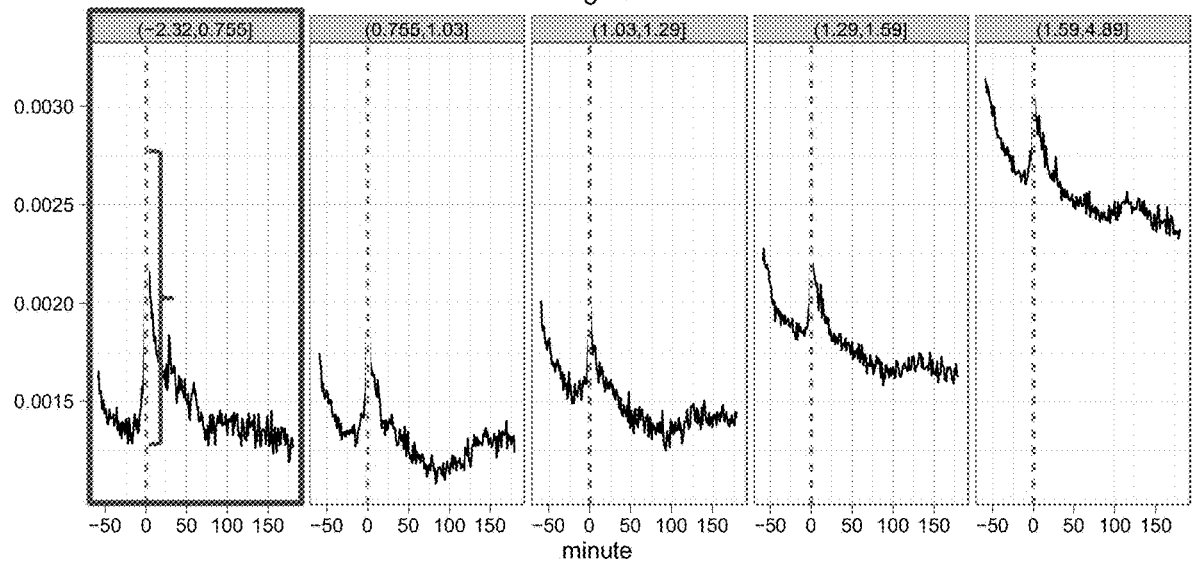
Figure 18:
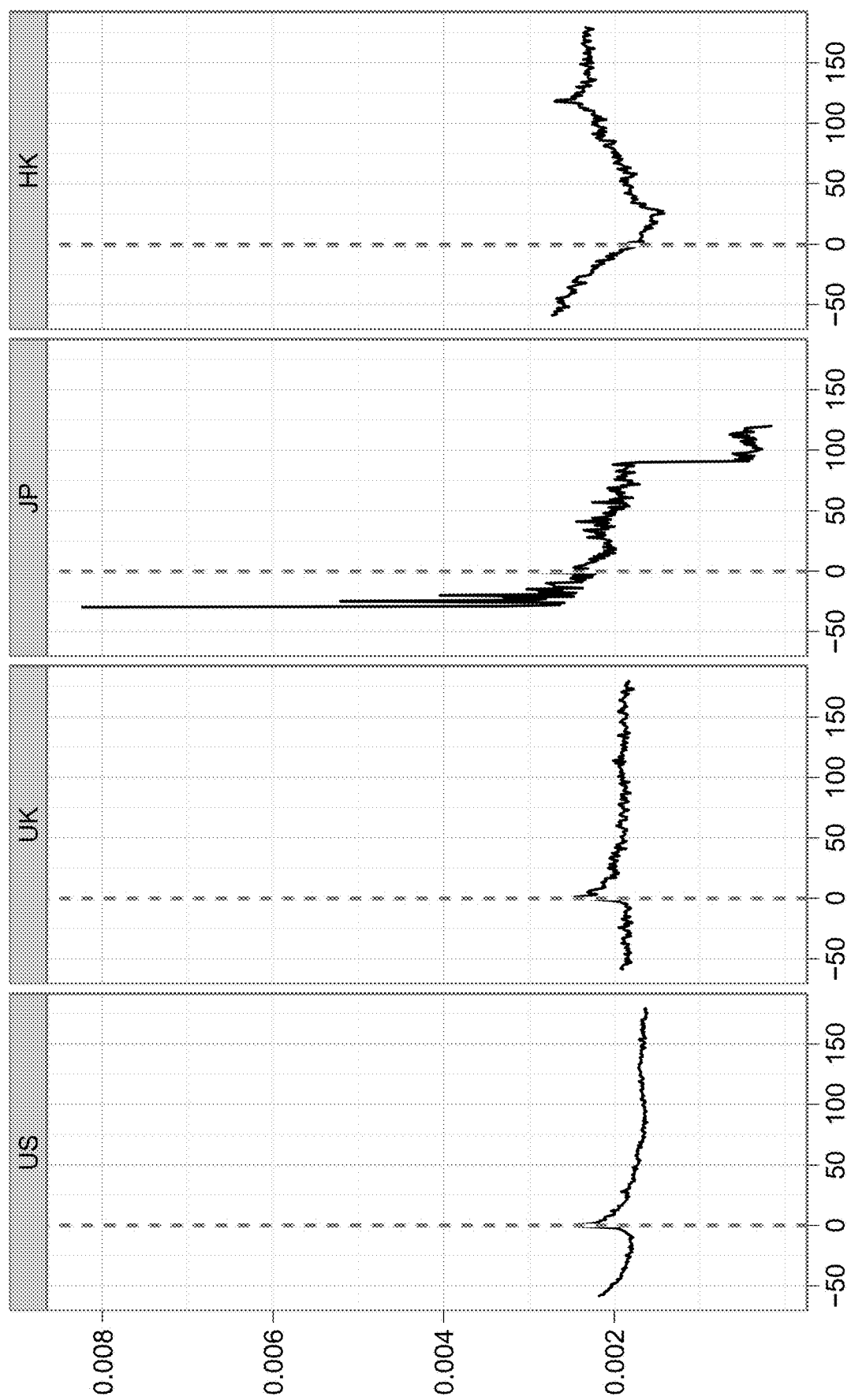
Figure 19:
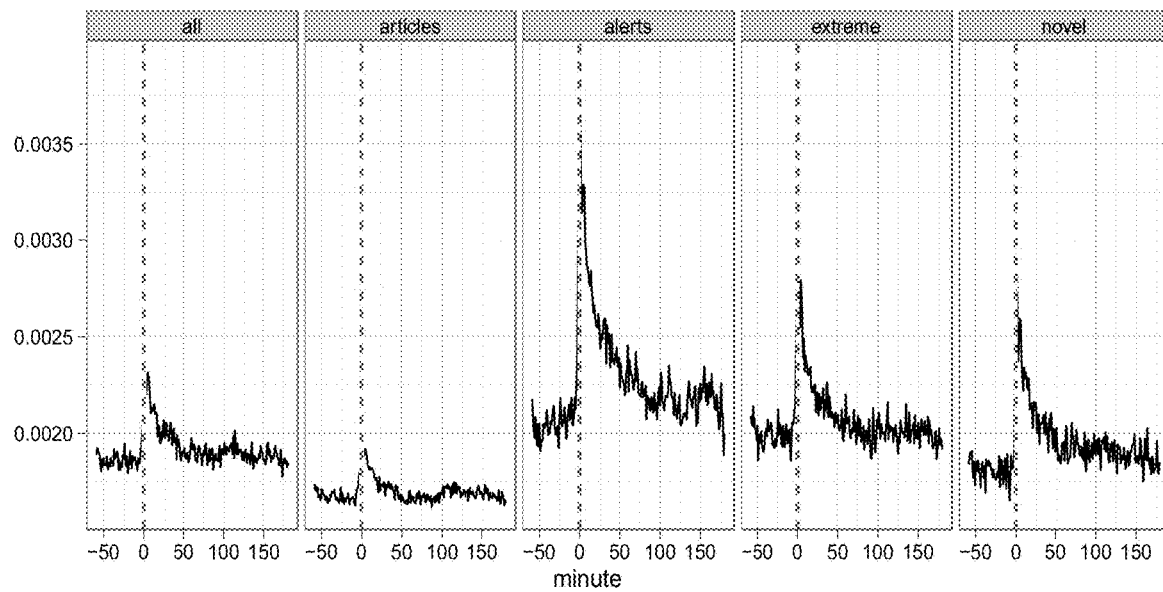
Figure 20:
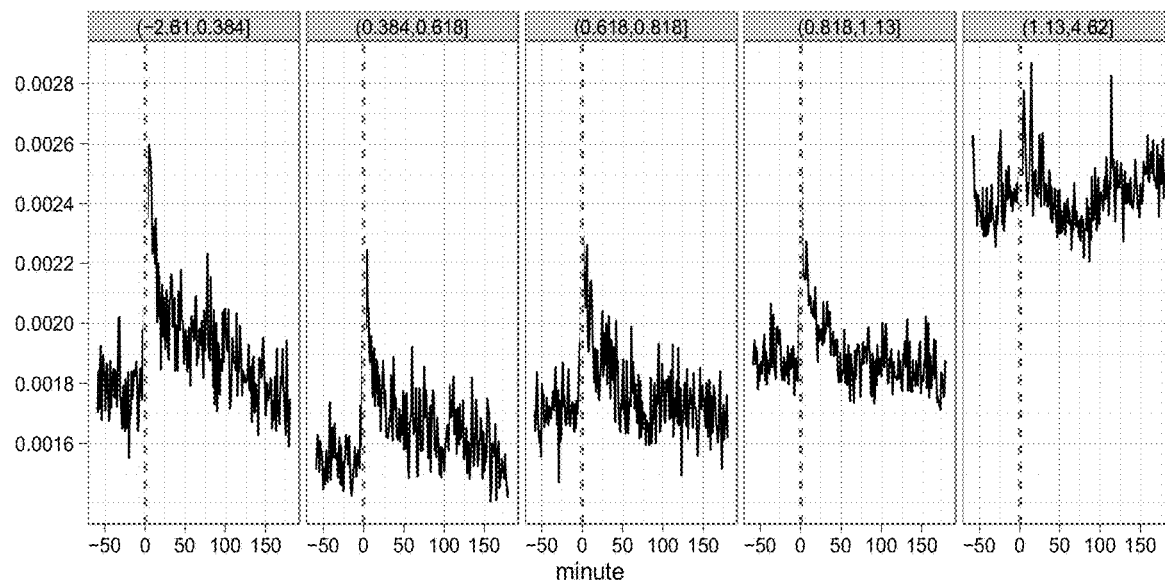
Figure 21:
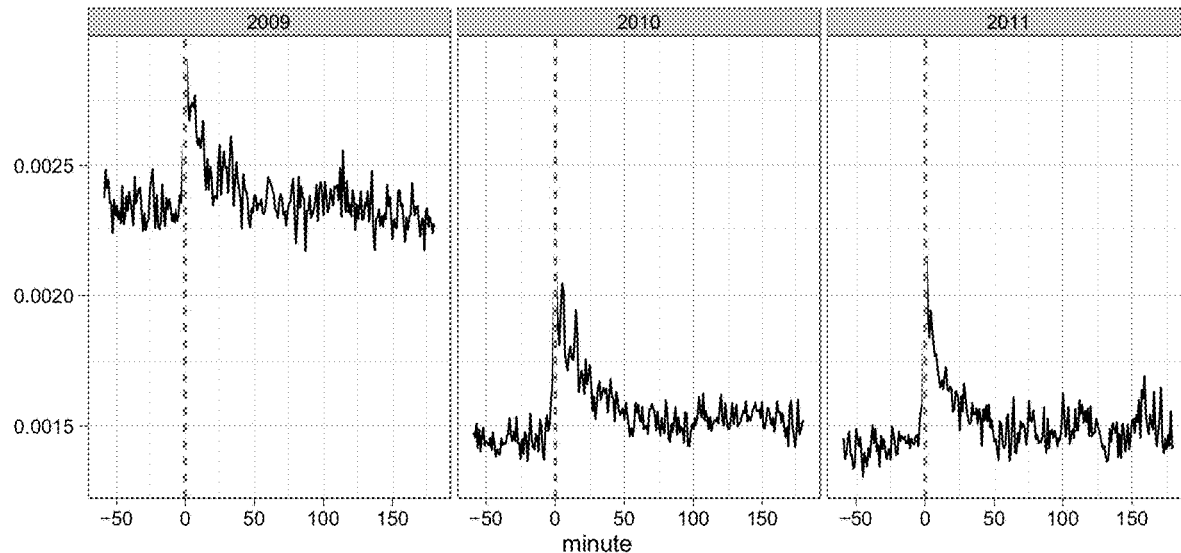
Figure 22:
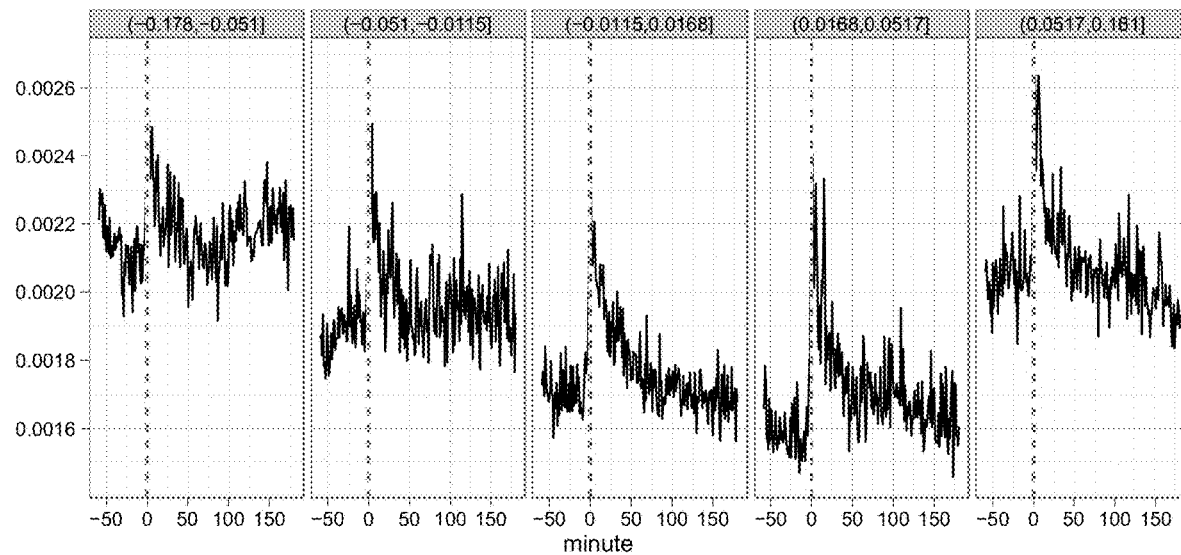

FIG. 12 is a chart representing volatility of residuals around news of the specific type. Both the level of induced volume and the duration of the effect are important. Example is for the period between 11 AM to 2 PM EST, extreme is Pr(POS) (probability positive) or Pr(NEG) (probability negative) in top decile, i.e., the top 10% of data represented by the point at which 10% of data is above it and 90% of data is below it. FIG. 13 is a chart representing volatility and news: persistence 2009-2011 with volatility of residuals by year. 2009 had much higher volatility but the additional volume induced by news is as strong and as persistent in 2010 an 2011. FIG. 14 is a chart representing volatility around news in high versus low volume regime. Level of VIX represents the ticker symbol for the Chicago Board Options Exchange Volatility Index, a measure of the implied volatility of the S&P 500 index options. News induces more volatility (relatively) when VIX is not high. FIG. 15 is a chart representing volatility around news in up versus down markets showing increasing conditional volatility from news. News induces more volatility when the market is up (although general level of volume is higher when market is extremely up or down). FIG. 16 is a chart representing volatility around news by market cap. Volatility of residuals by market capitalization. News induces more volume for microcap and midcaps. FIG. 17 is a chart representing volatility around news by stock beta. Volatility of residuals by stock beta (previous year). News for low beta stocks induces more volatility than news for high beta stocks. US news volatility: recap News about a given equity typically induces a degree of volatility but the response (volatility) is exaggerated when: The news is an "alert"; VIX is not high; the market is up; the equity is a micro to midcap (<$3B); and the equity has a low beta. One analytic theory: News induces cognitive dissonance from the point of view of a risk adverse net-long asset holder. The more lulled this asset holder is (prices rising, low volume) the greater the surprise at new information.

Figure 23:
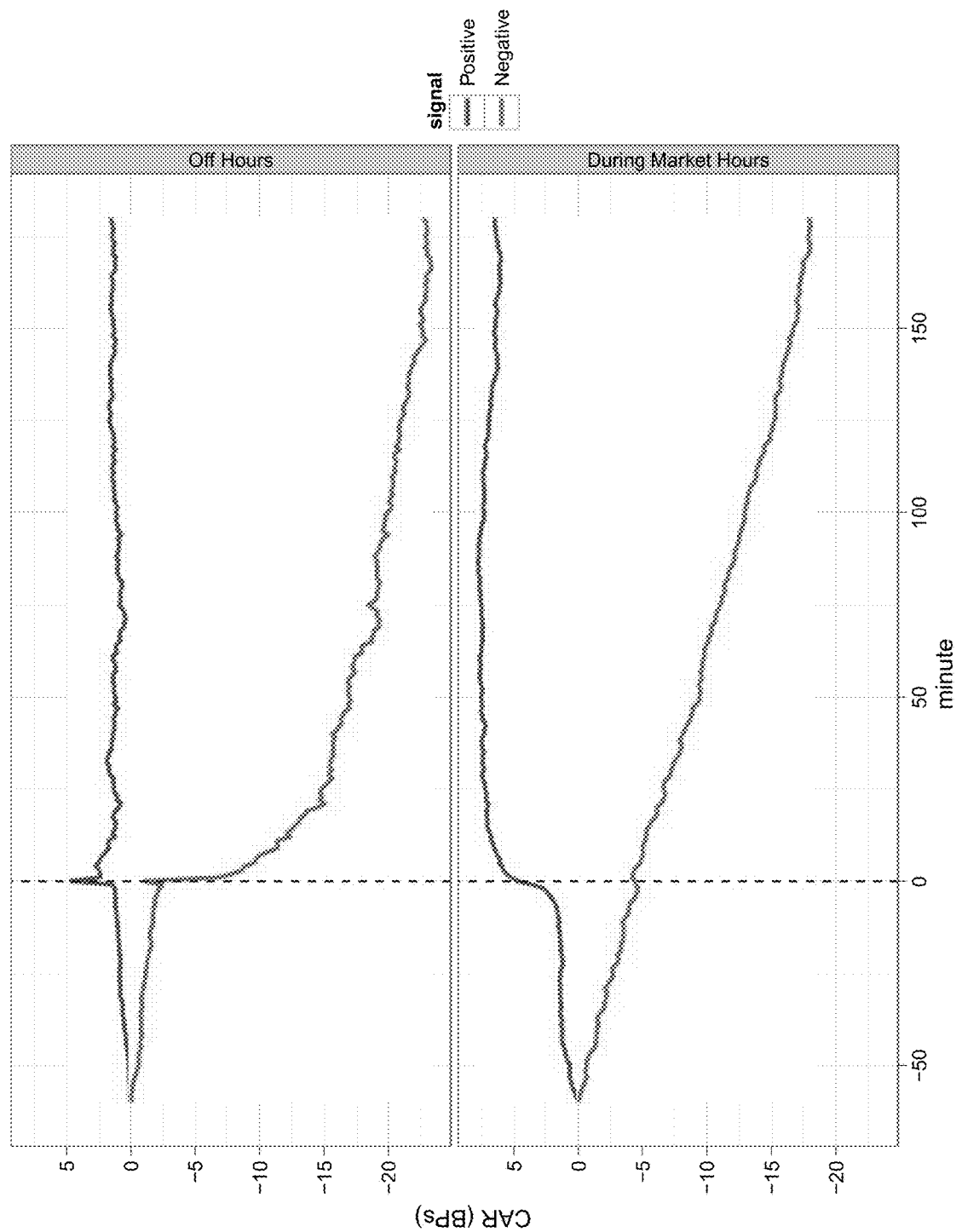
Figure 24:
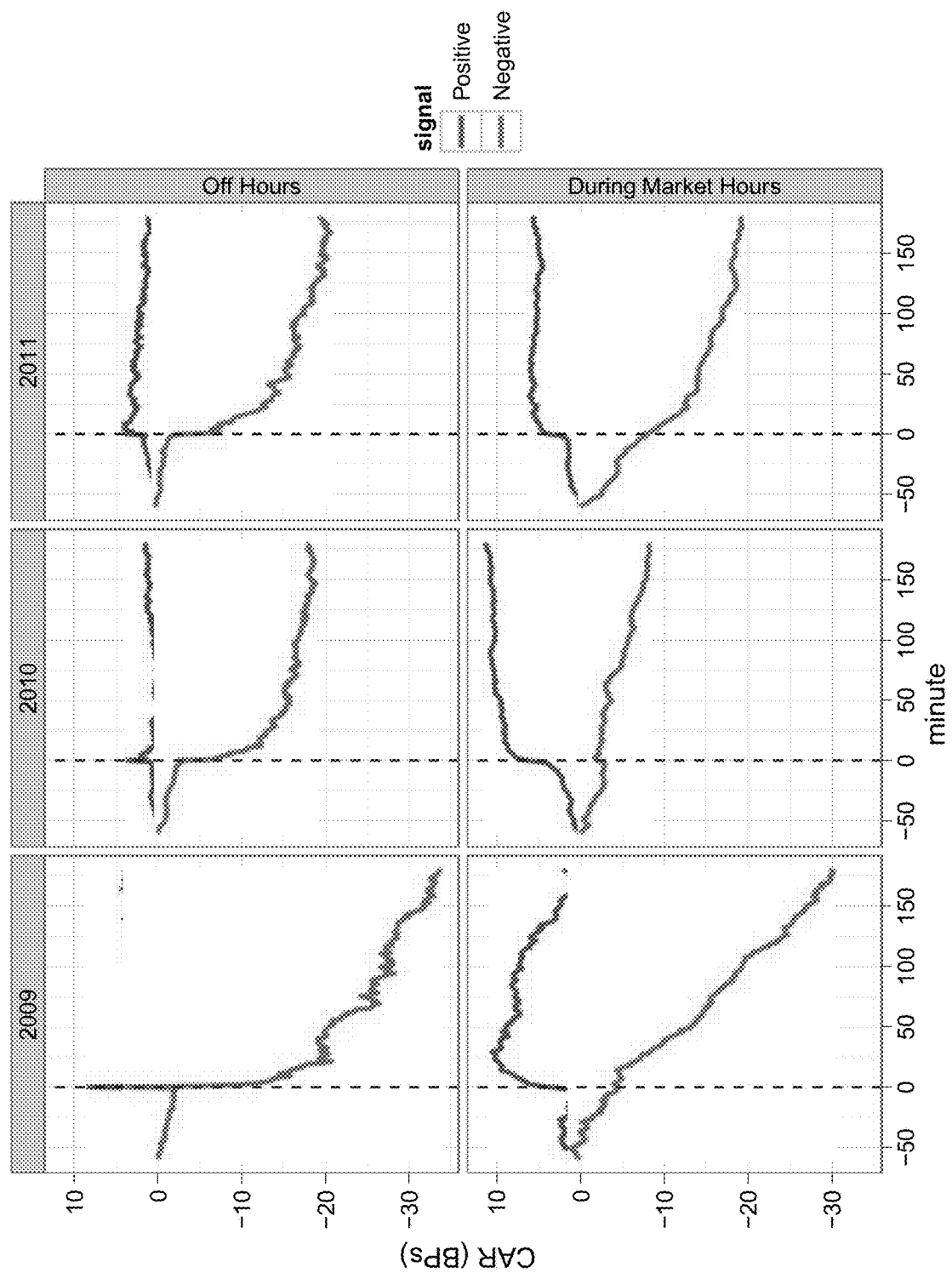
Figure 25:
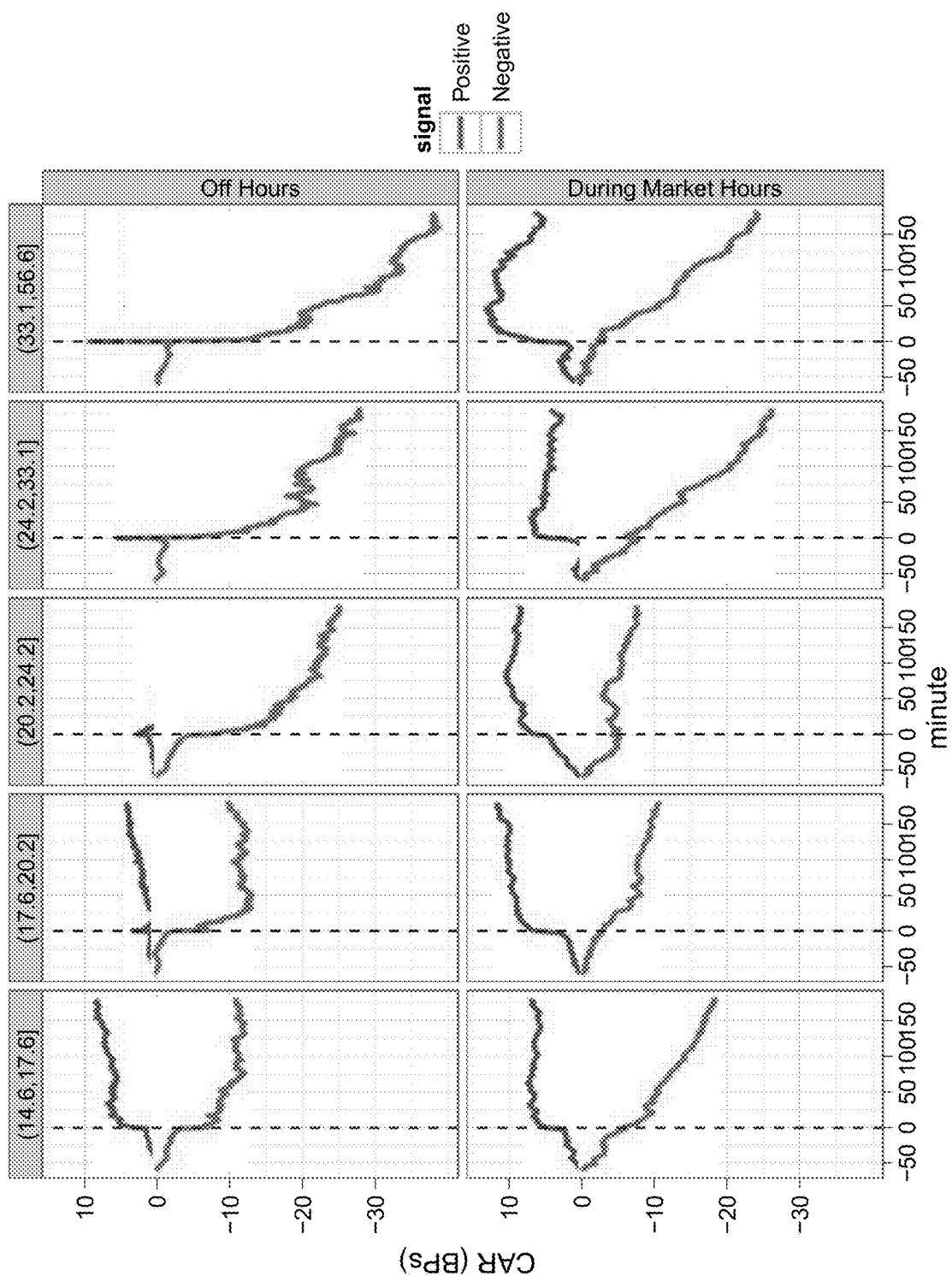
Figure 26:
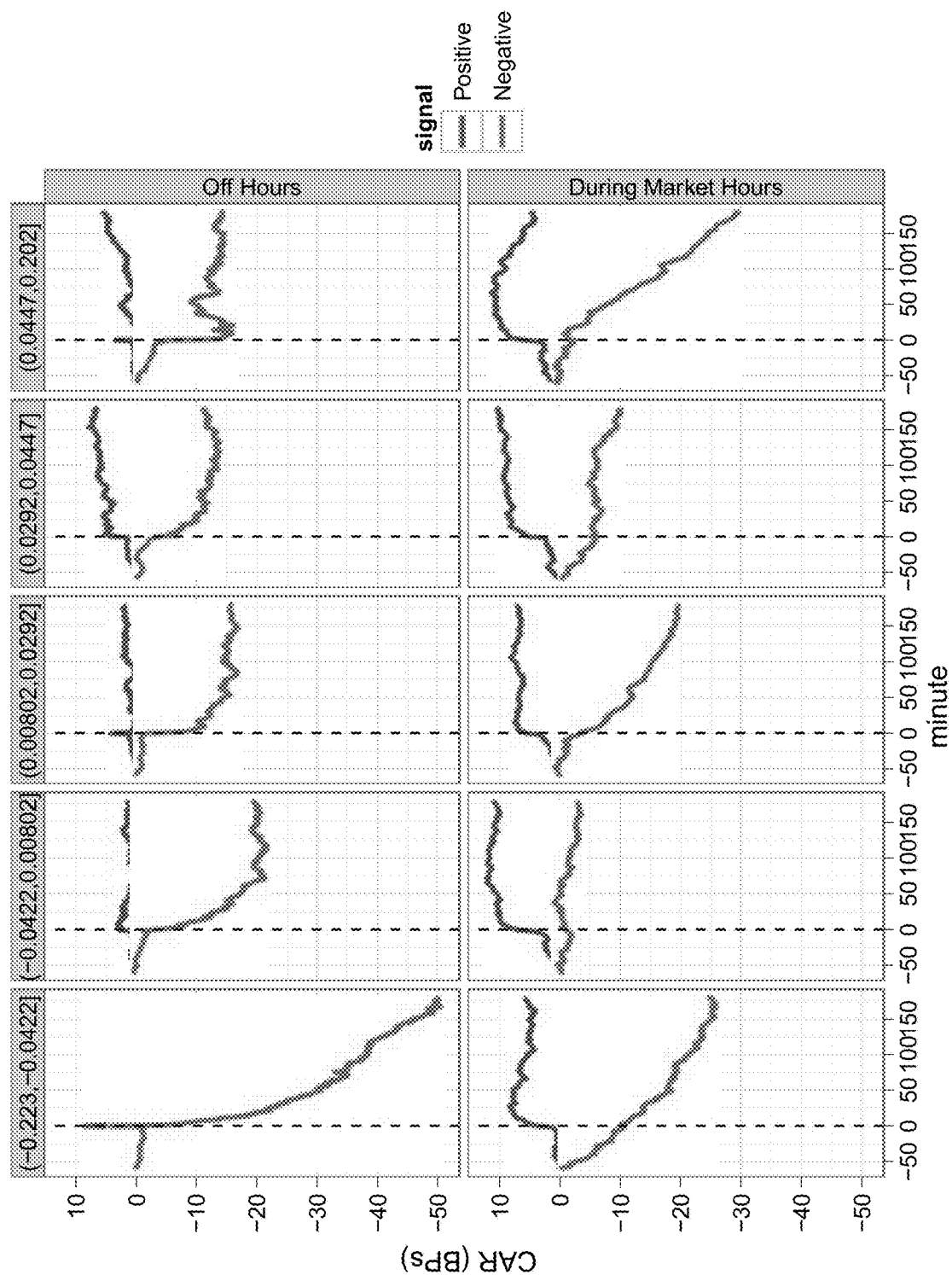
Figure 27:
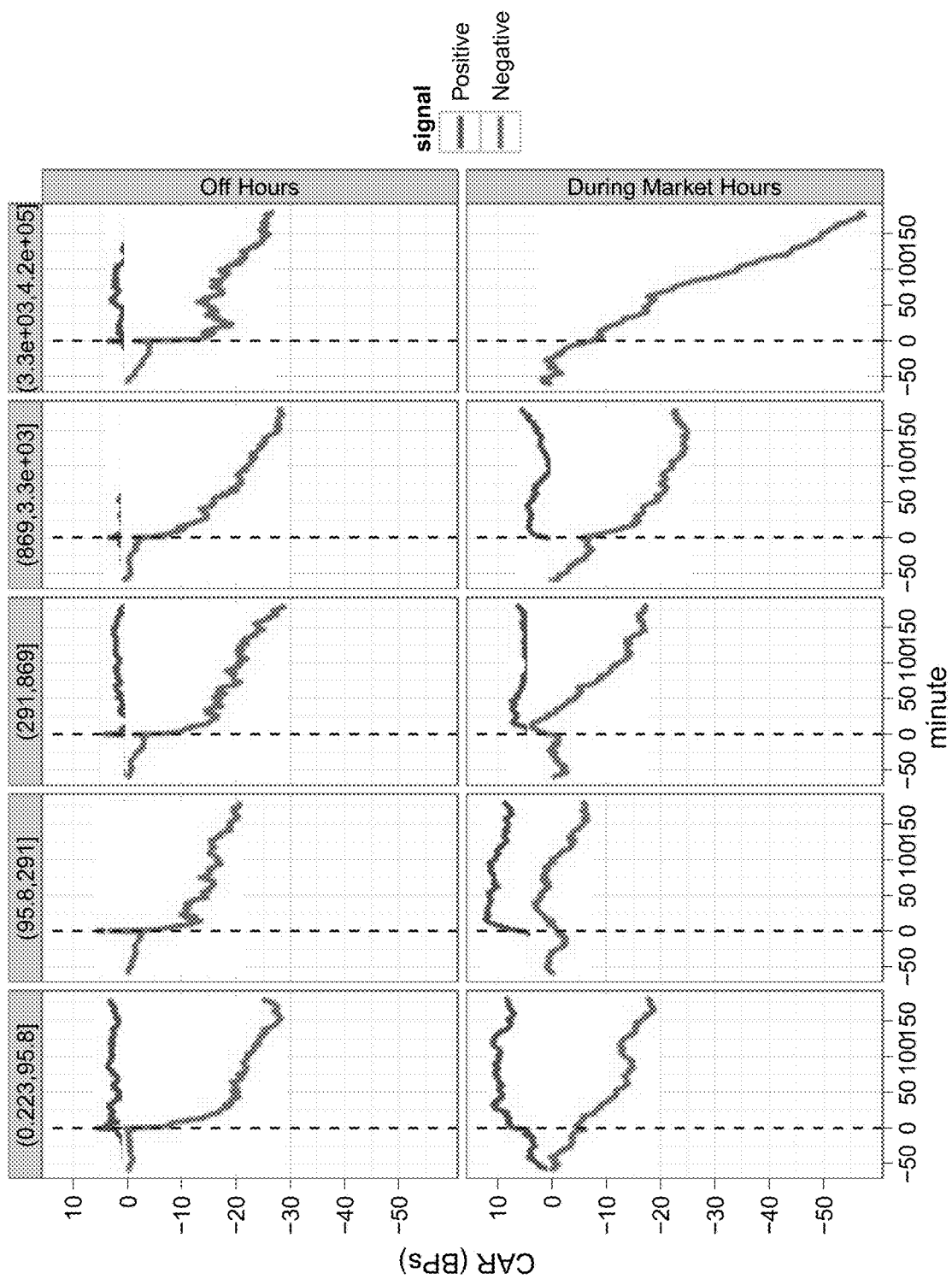
Figure 28:
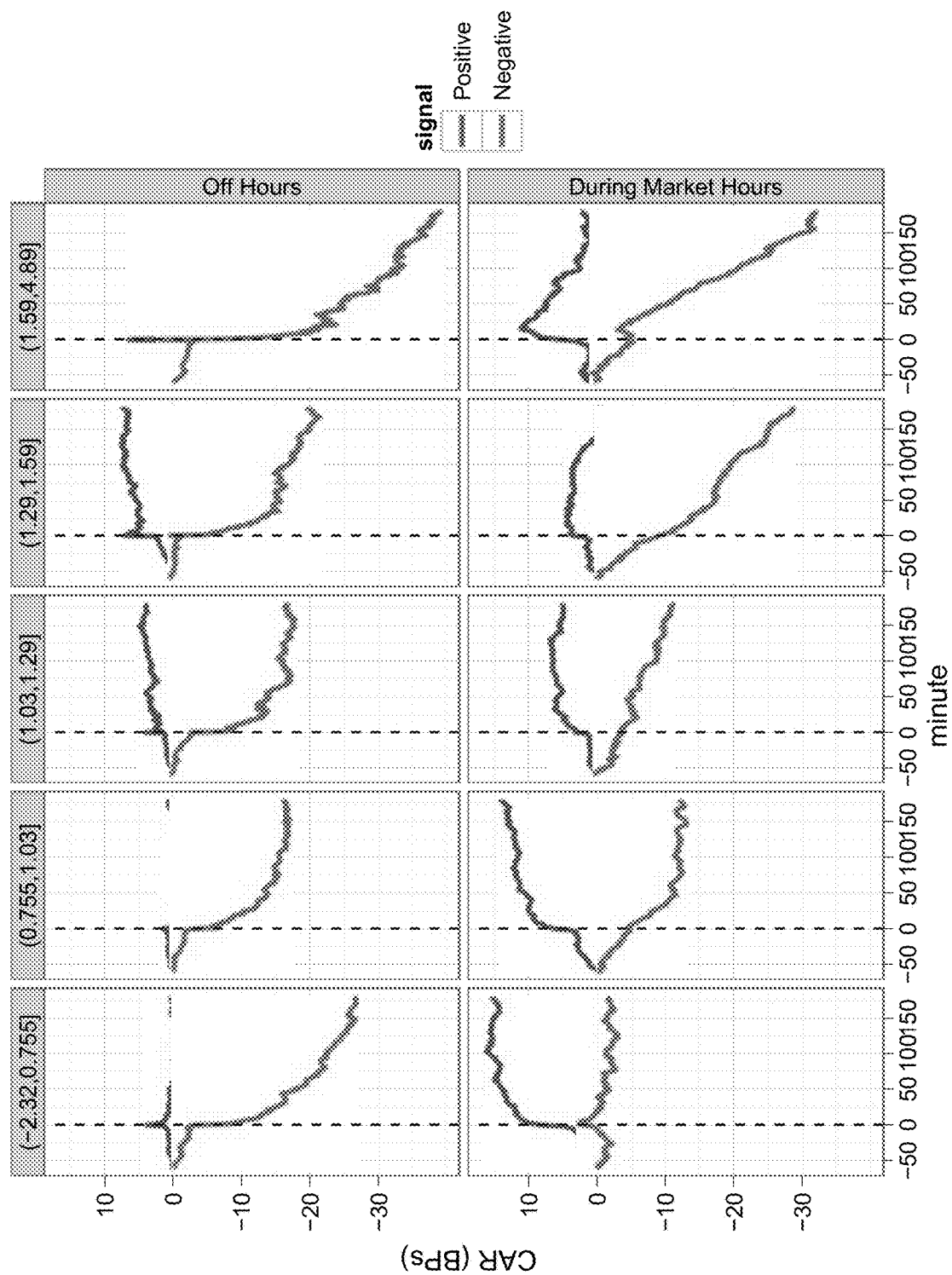

FIGS. 18-22 are charts representing international comparison of volatility around news response. US, UK: News induces more volatility when it surprises people: When the market is improving; when the stock is low beta; and when VIX is low. Japan: English news is associated with some volatility but there appear to be other earlier drivers. Hong Kong: English news is associated with decreased volatility, possibly since local language news came first. FIG. 23 is a chart representing us equity news: sentiment and direction. Unfiltered Response to News Sentiment: Strong negative effect; Weak positive effect; and Cumulative Abnormal Returns (CAR) of 20 basis points (BPs) to be earned on the short side for negative news over about 2.5 hours. FIG. 24 is a chart representing news sentiment response persistence: 2009-2011. Negative news has a strong drift in down years. Positive news has a mild drift in not-so-down years. FIG. 25 is a chart representing news sentiment response and volatility regime. Strong negative news effect when volatility is high. Mild positive news effect when volatility is low. FIG. 26 is a chart representing news sentiment response and recent market direction. Momentum at the open. No clear pattern during market hours. FIG. 27 is a chart representing news sentiment response by market capitalization. Increasing effect of negative news with larger firms. One explanation for this is a slower imputation into price for smaller firms. FIG. 28 is a chart representing news sentiment response by Beta. Mild positive drift for positive news on low beta firms. Stronger negative drift for negative news on high beta firms.

Figure 29:
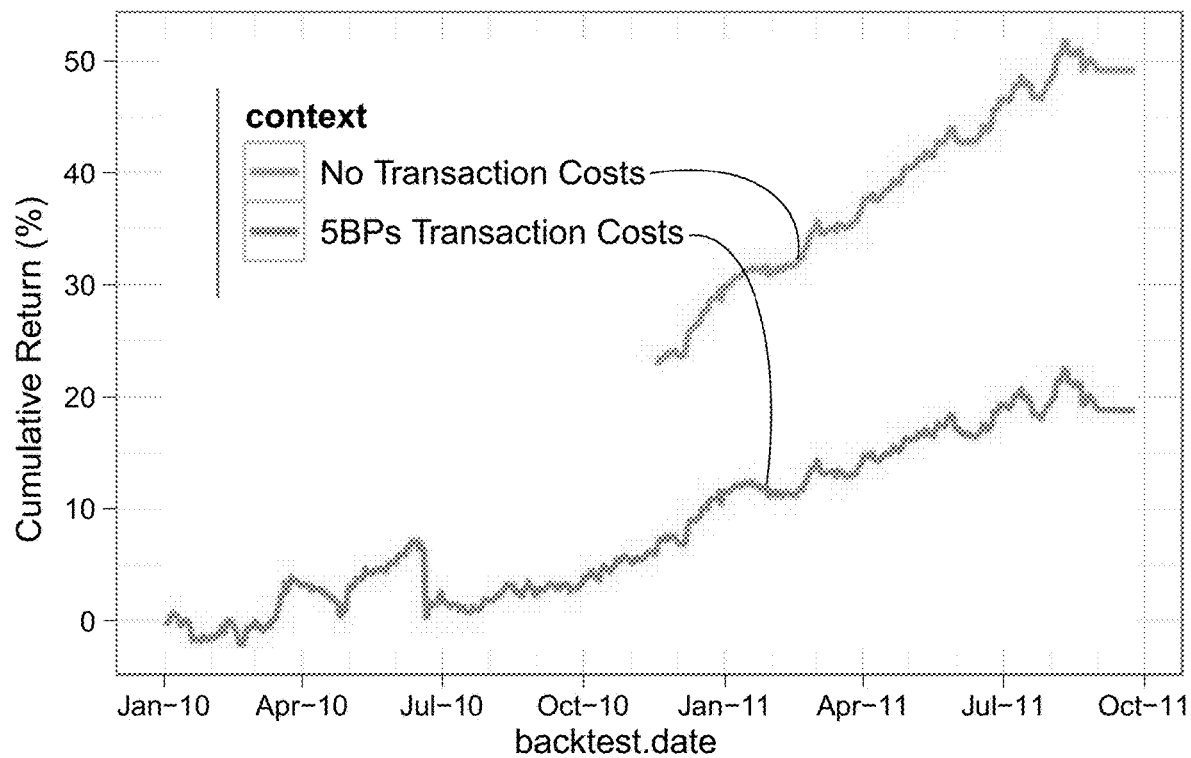
Figure 30:
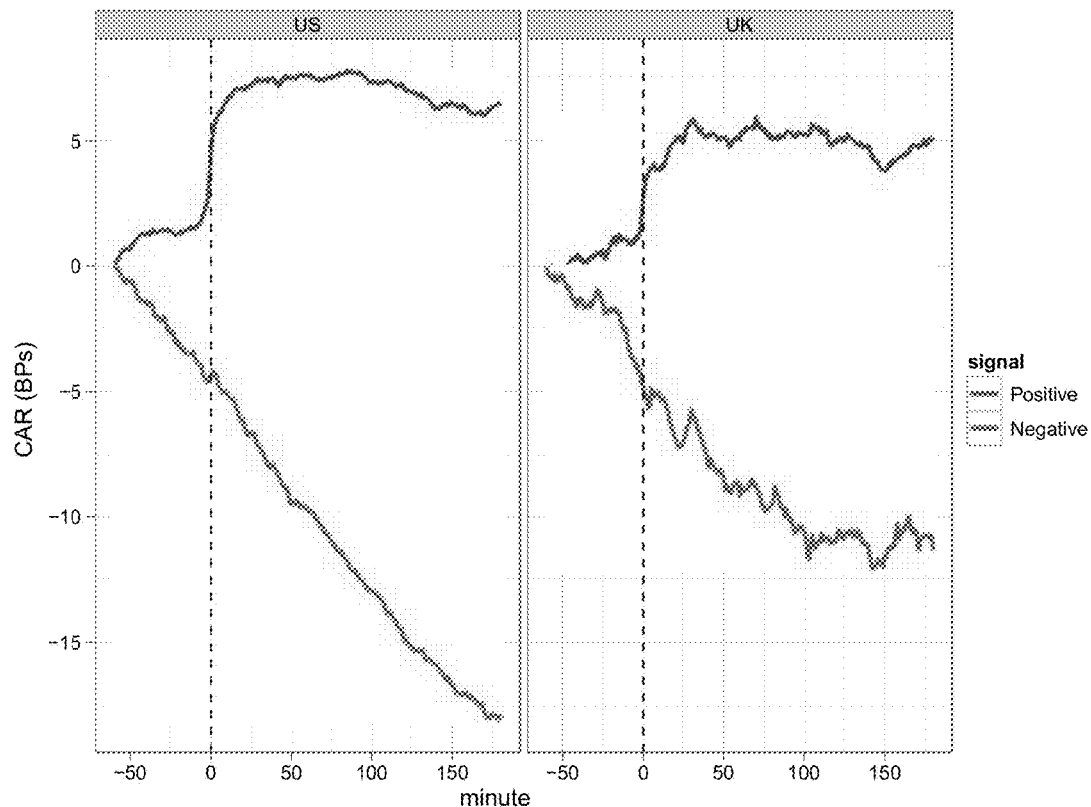

The following is an exemplary backtest of news sentiment at the open of trading/market. Overnight, go long stocks that have had a story with (positive sentiment) SENT_POS>0.5 and short stocks that have had a story with (negative sentiment) SENT_NEG>0.5. Weight by # of stories with the above criteria so the news can "cancel out." Assume entry at the price as of 9:35 AM. Hold for 2 hours and 55 minutes (or until market close). Beta hedged (so we can just sum the residuals)—have to adjust the hedge every minute. No transaction "T"-costs Sharpe Ratio: 3.79, annual return 20%. 5BP T-cost Sharpe Ratio: 2.07, annual return 7%. FIG. 29 shows an exemplary backtest of news sentiment at the open of trading/market with No T-costs Sharpe Ratio: 3.79, annual return 28% and 5BP T-cost Sharpe Ratio: 2.07, annual return 15%. FIG. 30 shows a news sentiment response concerning US and UK, wherein similar directional response to negative and positive news (during market hours) is observed.

Figure 31:
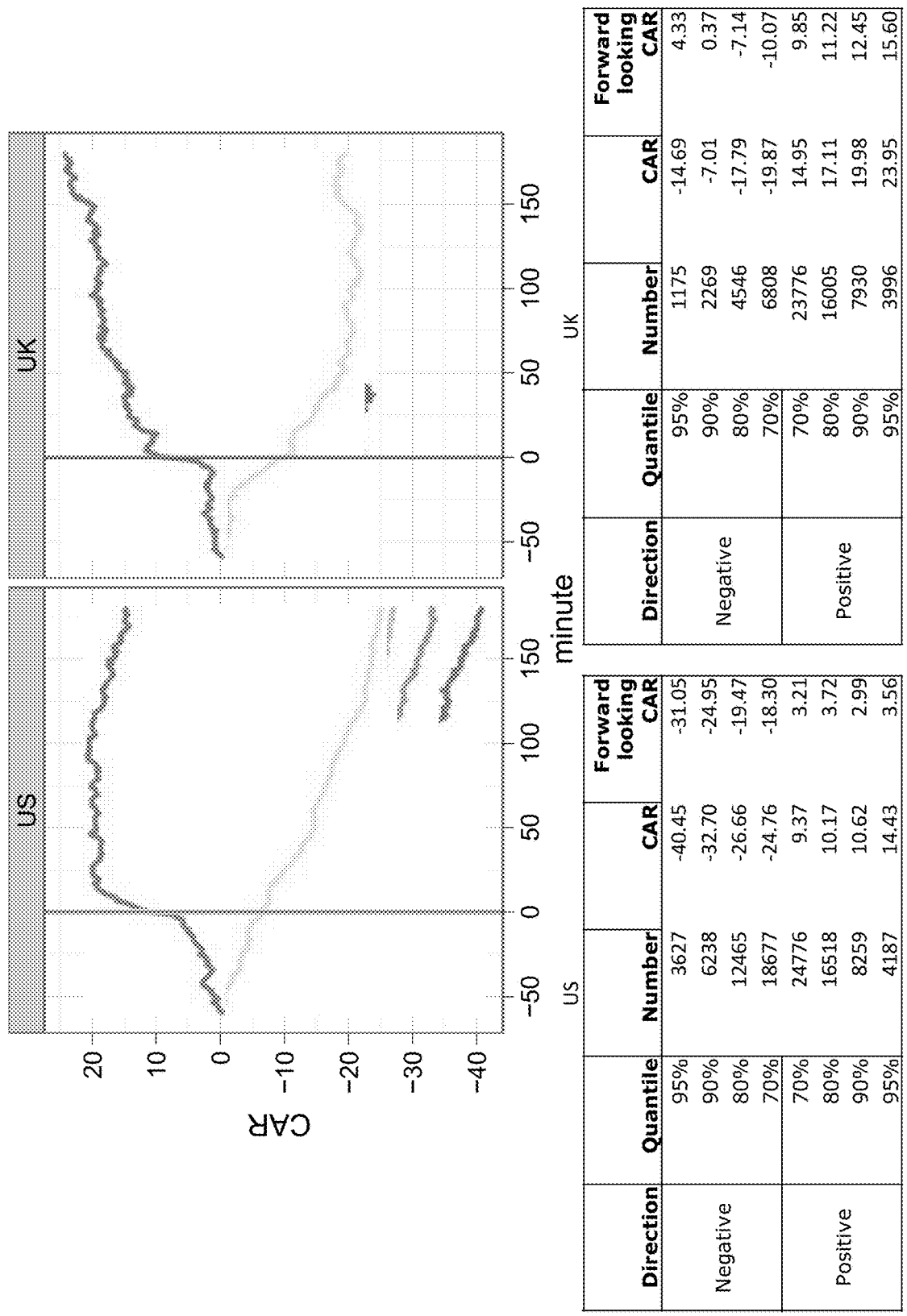
Figure 32:
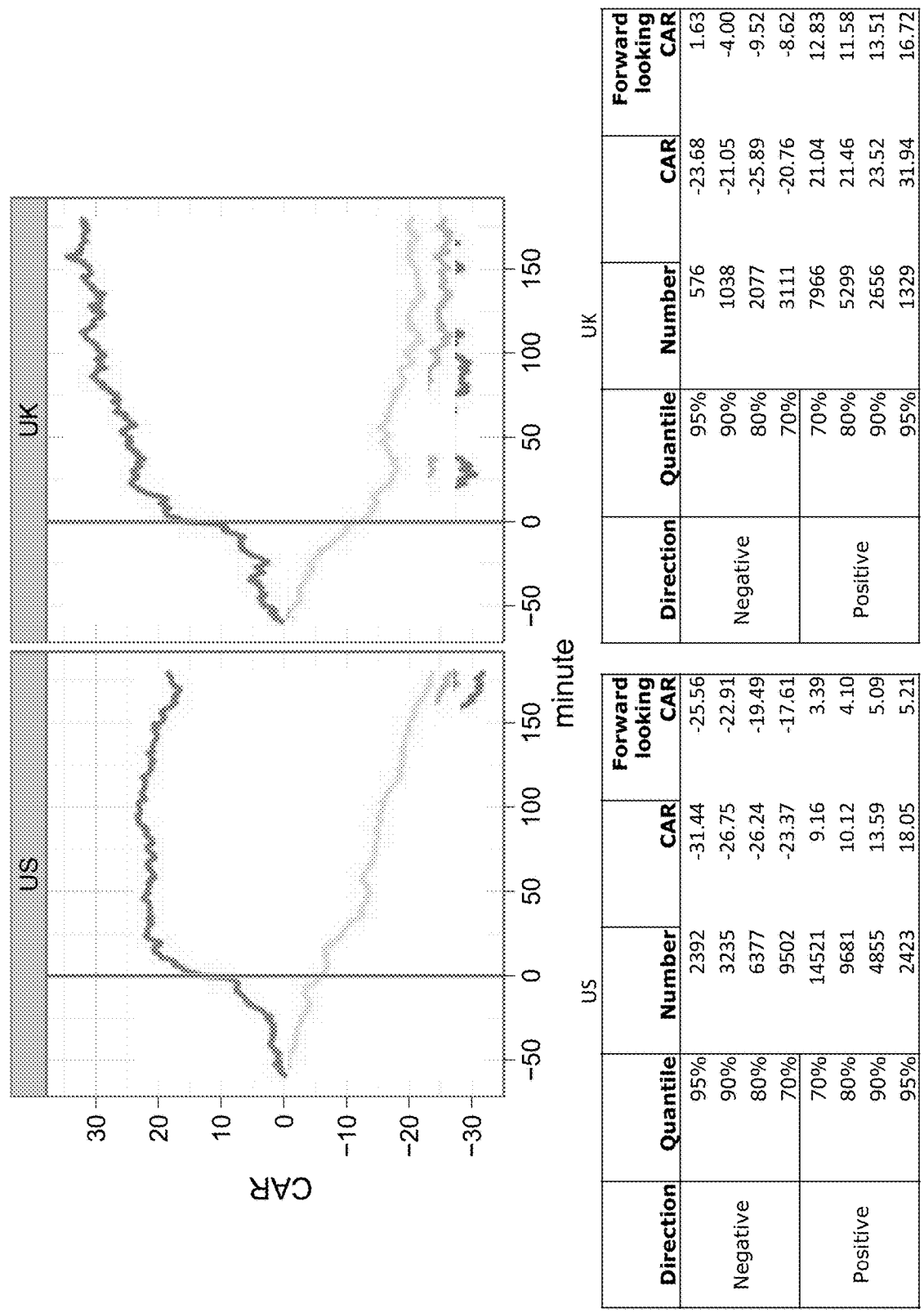
Figure 33:
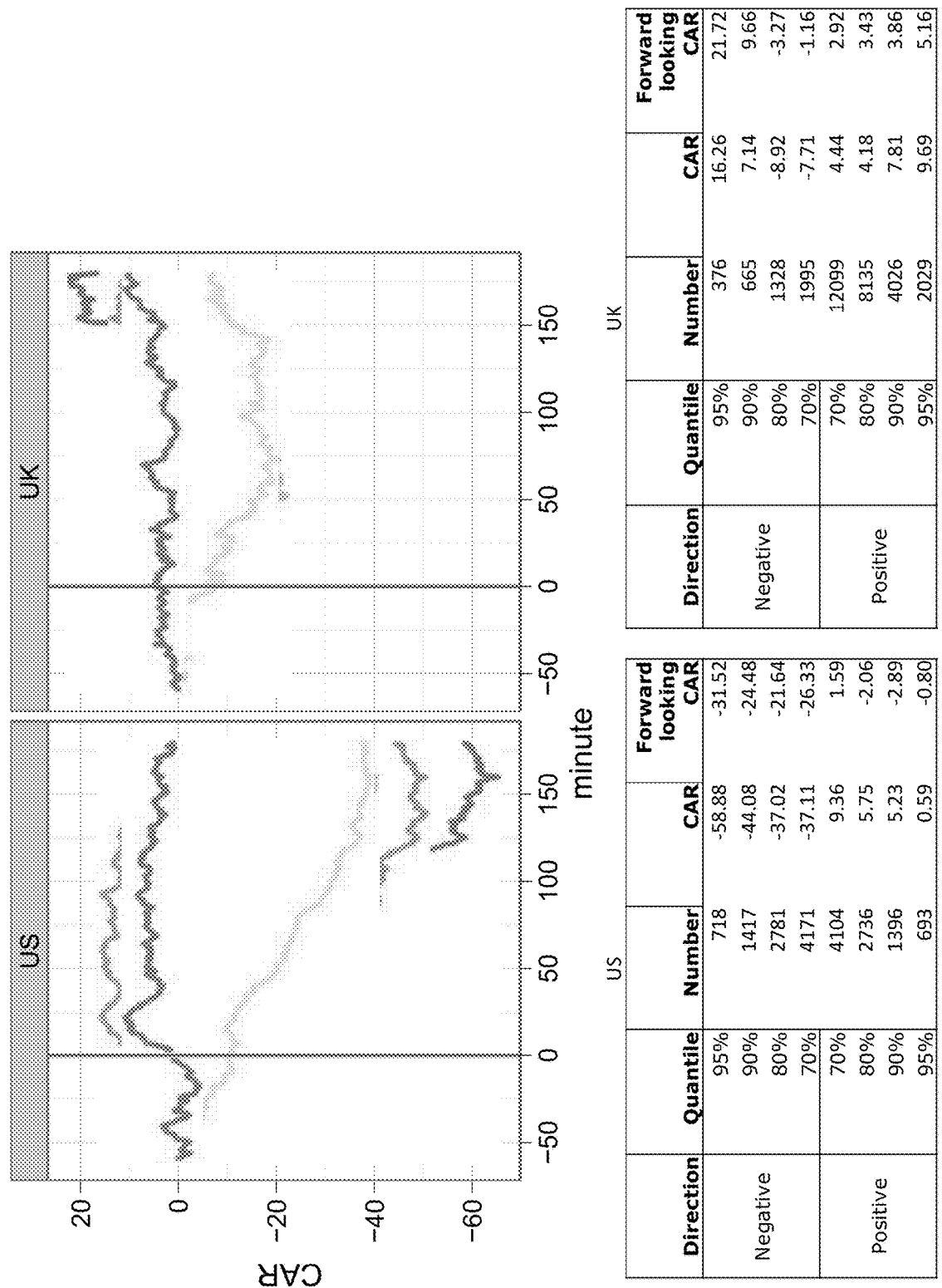
Figure 34:
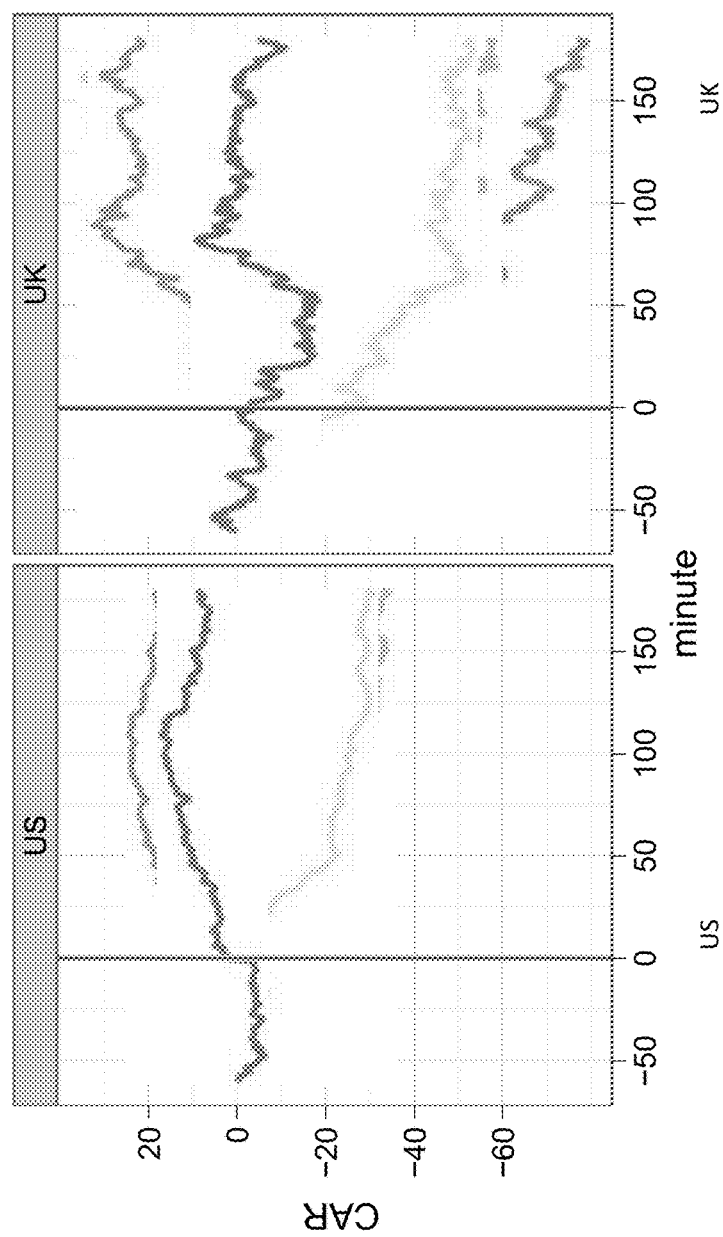
Figure 35:
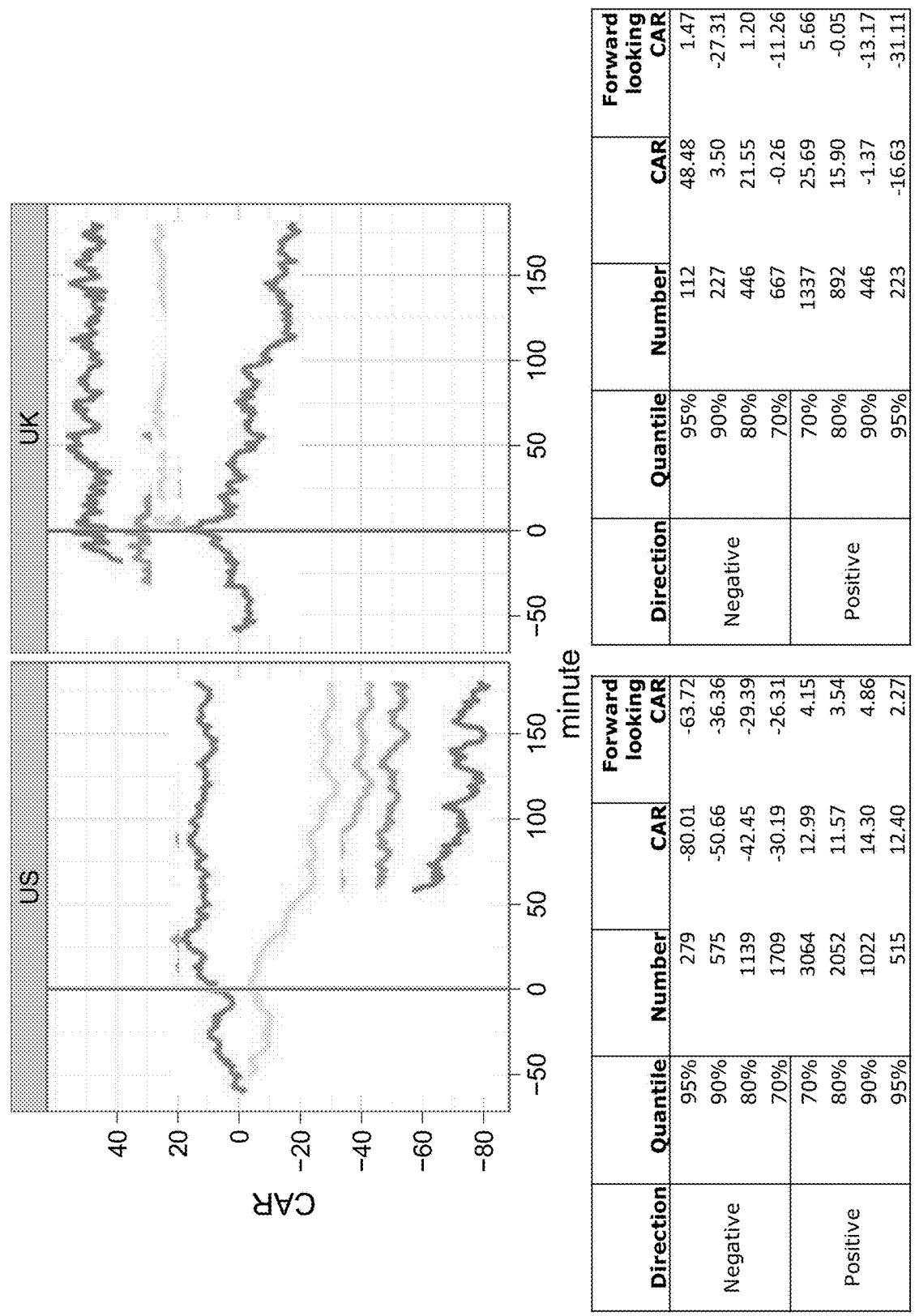
Figure 36:
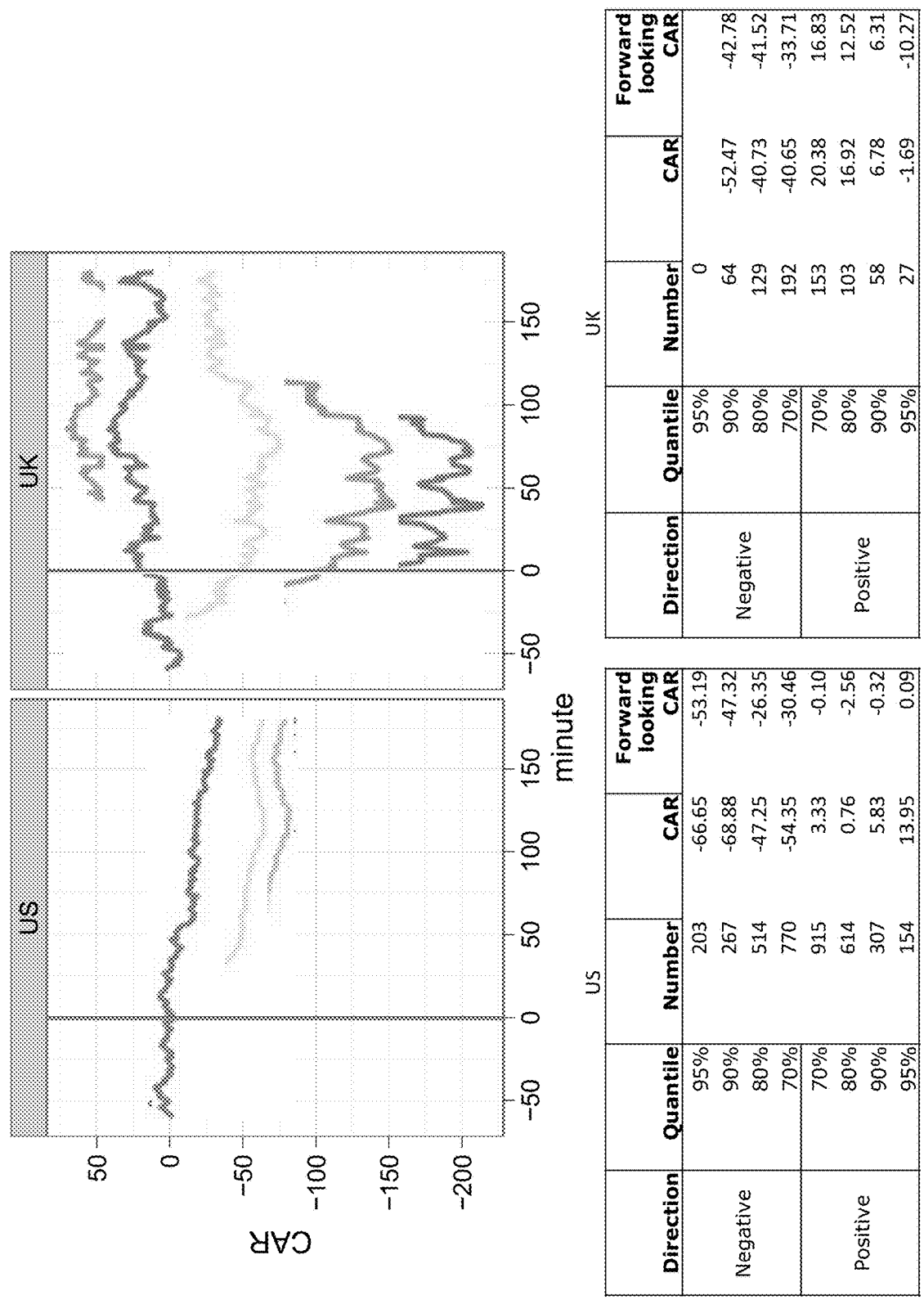
Figure 37:
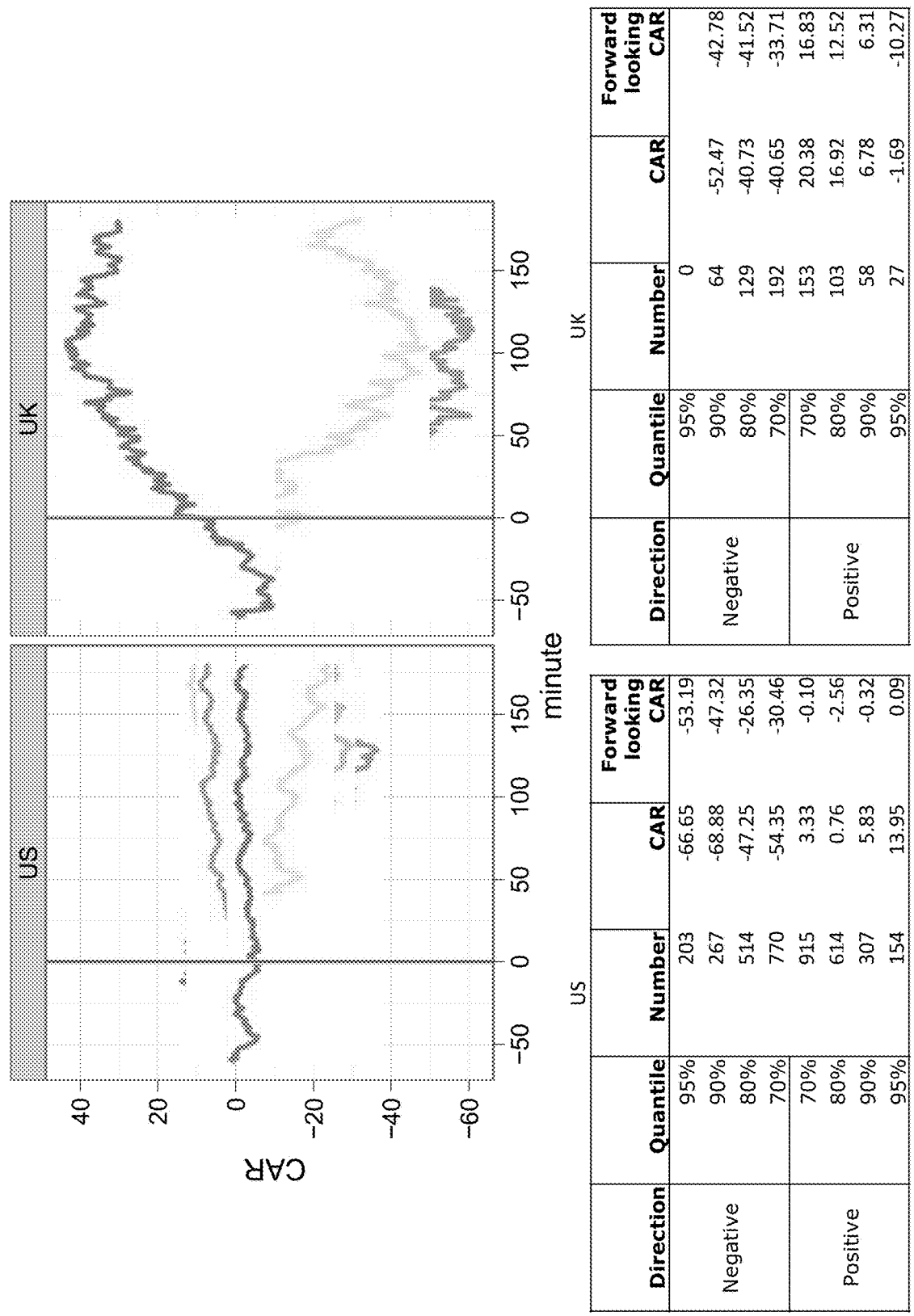
Figure 38:
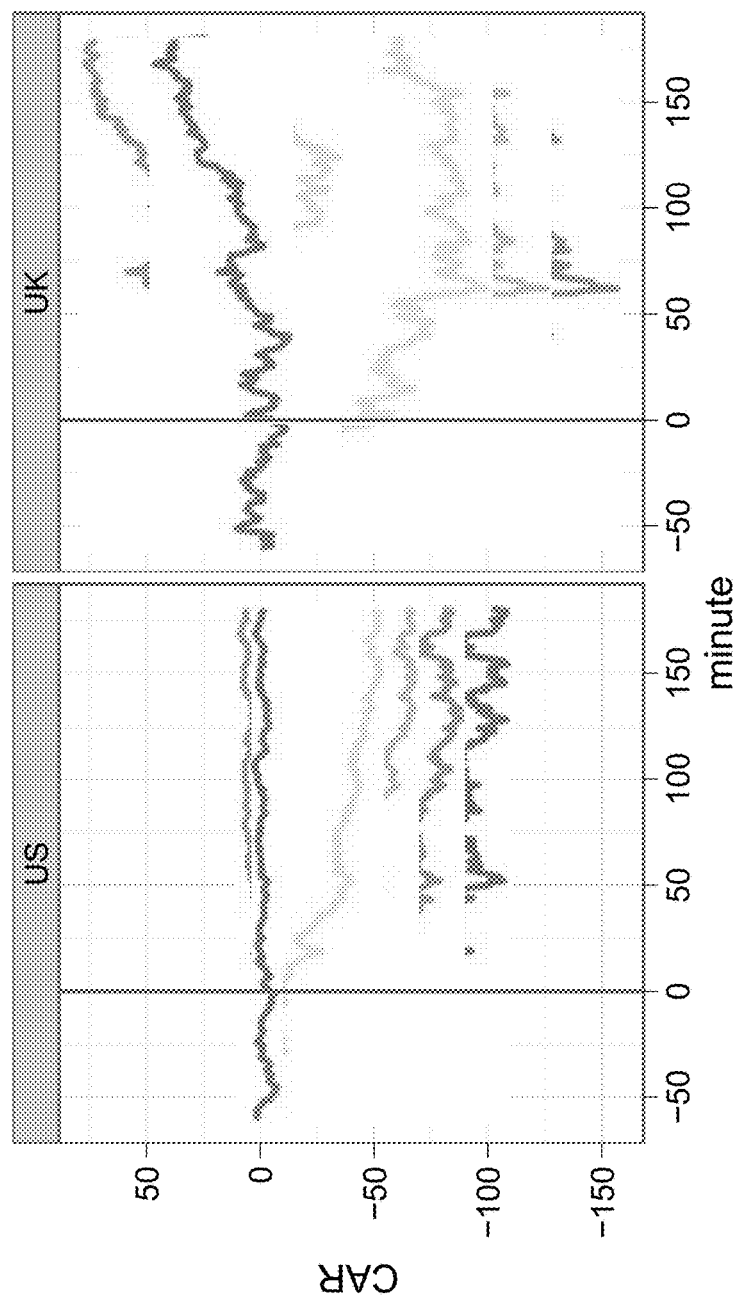

FIGS. 31-38 are a series of charts and data associated with several exemplary sentiment extremity types: FIG. 31—during trading; FIG. 32—novel news; FIG. 33—repeated news; FIG. 34—earnings results; FIG. 35—M&A mergers and acquisitions news; FIG. 36—credit rating news; FIG. 37—long news items; and FIG. 38—long and subjective news. Exemplary data sets are used as % quantiles (percentiles) for select intervals of 70, 80, 90, and 95 percentile for both positive and negative directions. The respective Cumulative Abnormal Returns (CAR) values and forward looking CAR values are shown for each quantile represented. Sentiment extremity increases negative drift for US news and positive drift for UK news. News meta-data attributes that can induce cognitive dissonance increase the drift effects of news sentiment extremity: novelty; important topic codes; and story complication (length, length+subjectivity). As with low frequency, filtering news and news meta-data allows a practitioner to dial between breadth and strength of signal.

Now with respect to use of the NAS in the context of commodities, Table 4, represents an exemplary data profile of new responses for four sets of "COMMODITIES" instruments: CRU, MET, PROD, and GRA. In this example, the four sets of responses were followed for price response. The analysis involved a high frequency analysis from May 8, 2007 through end of 2010—fifteen financial quarters—with log returns Winsorized to + or −3%.

TABLE 4

| Commodity Category | Commodity Category name | Subindex | RIC | # News Items from Oct. 6, 2009 |
| --- | --- | --- | --- | --- |
| CRU | Crude Oil | S&P GSCI Crude Oil Index Excess Return | .SPGSCLP | 112,096 |
| MET | Metals (Precious and Industrial) | S&P GSCI Industrial Metals Index Excess Return | .SPGSINP | 90,688 |
|  |  | S&P GSCI Precious Metals Index Excess Return | .SPGSPMP |  |
| PROD | Oil Products | S&P GSCI GasOil Index Excess Return | .SPGSGOP | 53,969 |
|  |  | S&P GSCI Heating Oil Index Excess Return | .SPGSHOP |  |
| GRA | Grains | S&P GSCI Grains Index Excess Return | .SPGSGRP | 58,709 |

Figure 39:
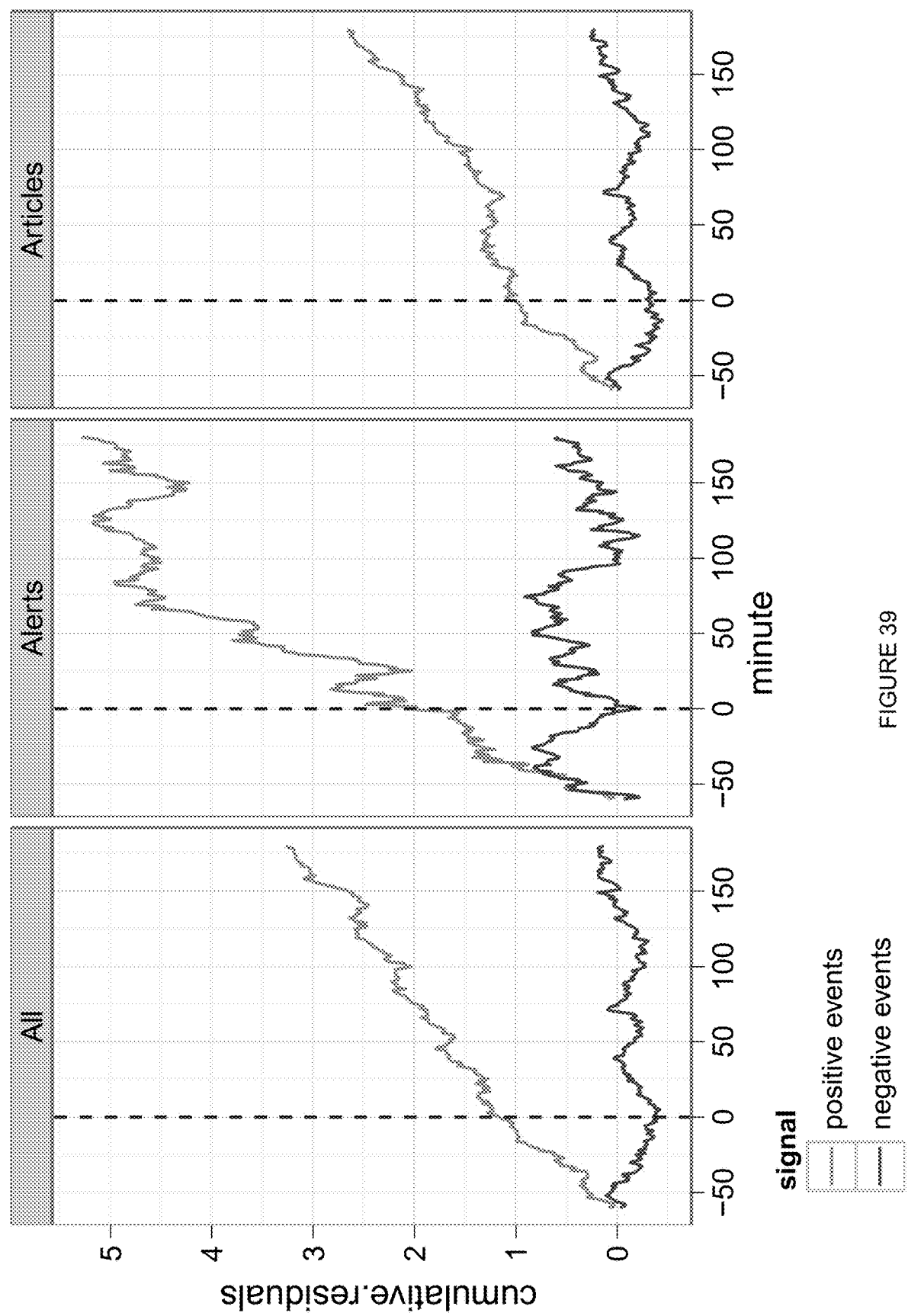

FIG. 39 is a chart representing Commodity Crude CRU Focus on Alerts in conjunction with the present invention. FIG. 39, is a graphical representation of news responses related to the CRU commodity instrument showing three sets of responses respectively associated with "All", "Alerts" and "Article" news items based on the data shown in Table 5. Each set includes a "positive event" signal and a "negative event" signal graphically represented on each of the three sets that involve CRU. This example focuses on "Alerts," and as shown in the data of Table 5, there are far fewer "Alert" related events (positive and negative) than there are "All" and "Articles" related events.

TABLE 5

| Item Type | Direction | # Triggers | Avg Post Event Return (1 min) | Avg Post event SD (1 min) |
|---|---|---|---|---|
| All | POS | 38506 | 0.012 | 5.67 |
|  | NEG | 37724 | 0.003 | 5.50 |
| Articles | POS | 26695 | 0.009 | 5.56 |
|  | NEG | 27286 | 0.003 | 5.38 |
| Alerts | POS | 8035 | 0.018 | 6.05 |
|  | NEG | 7023 | 0.003 | 5.80 |

Figure 40:
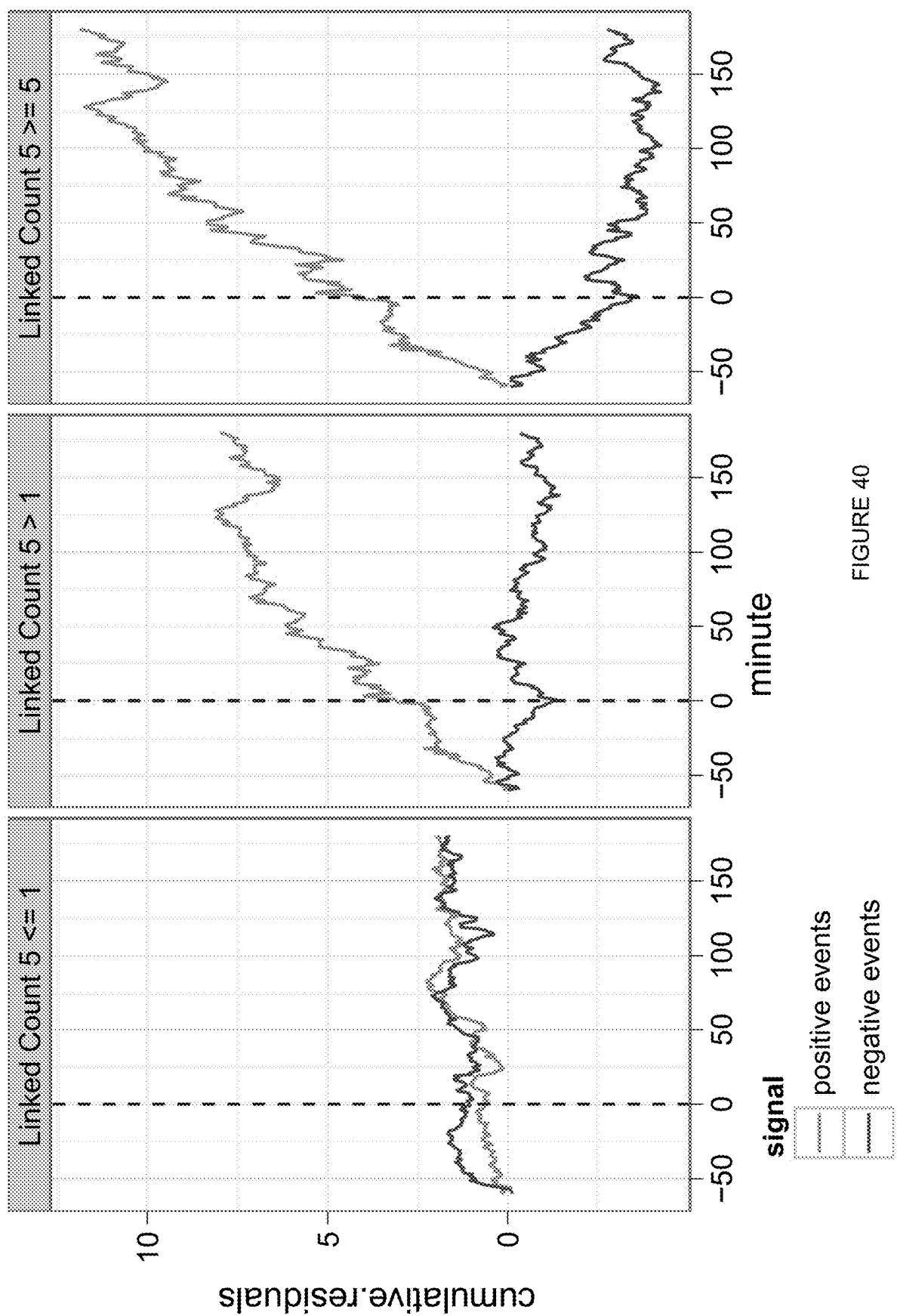

FIG. 40 is a chart representing Commodity Crude New Momentum and price momentum in conjunction with the present invention. FIG. 40, is a graphical representation of news responses related to the CRU commodity instrument showing three sets of responses respectively associated with "Linked Count 5<=1", "Linked Count 5>1", and "Linked Count 5>=5" news items based on the data shown in Table 6. [need to explain what "linked count 5" refers to] Each set includes a "positive event" signal and a "negative event" signal graphically represented on each of the three sets that involve the CRU commodity instrument. This example focuses on news momentum and price momentum. As shown in the data of Table 6 and in the respective graphical representations of such data, when "Linked Count 5<=1", the numbers of positive and negative events in a preceding 50 minute period, i.e., −50 through 0 minutes, are within a tight range and this attribute continues for the time beginning at time 0 through minute 180 (three hours). When "Linked Count 5>1", the numbers of positive and negative events in the preceding 50 minute period, i.e., −50 through 0 minutes, show a diverging trend and this trend not only continues but increases for the time beginning at time 0 through minute 180 (three hours). When "Linked Count 5>=5" the numbers of positive and negative events in the preceding 50 minute period, i.e., −50 through 0 minutes, show a sharply diverging trend (even greater than Linked Count 5>1) and this trend not only continues but increases for the time beginning at time 0 through minute 180 (three hours).

TABLE 6

| Item Type | Direction | # Triggers | Avg Post Event Return (1 min) | Avg Post event SD (1 min) |
|---|---|---|---|---|
| NOVEL NEWS | POS | 3621 | 0.007 | 5.67 |
|  | NEG | 3360 | 0.003 | 5.50 |
| NON NOVEL NEWS | POS | 4414 | 0.027 | 5.56 |
|  | NEG | 3663 | 0.005 | 5.38 |
| REPEATED NEWS | POS | 2795 | 0.043 | 6.05 |
|  | NEG | 2190 | 0.004 | 5.80 |

Figure 41:
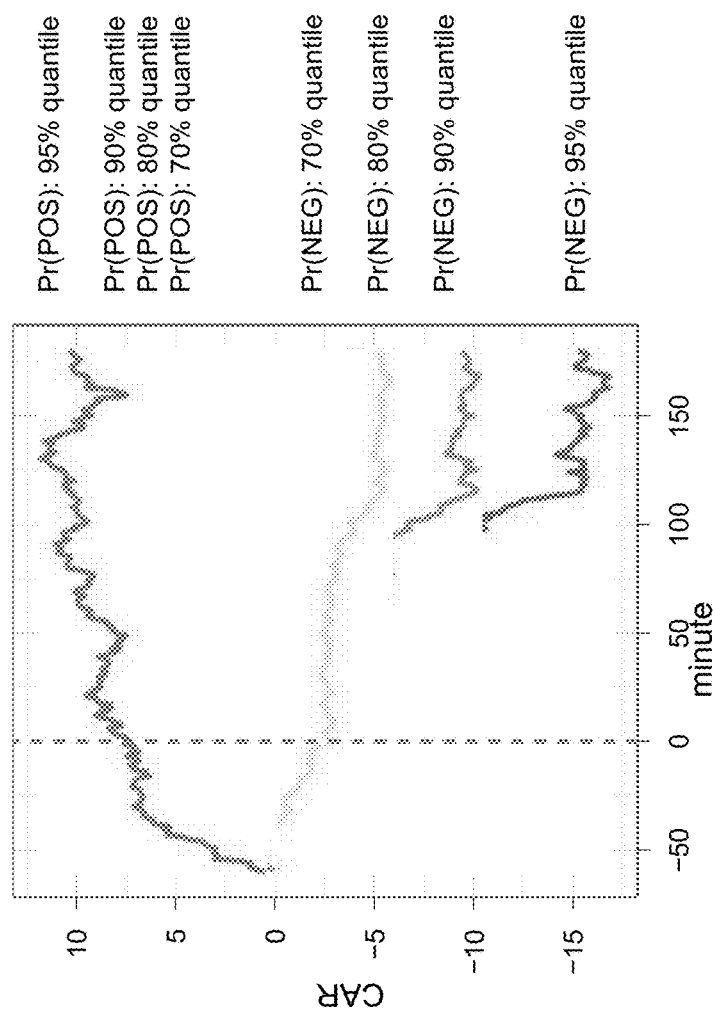

FIG. 41 is a chart representing Commodity Crude Conditioning return on sentiment extremity in conjunction with the present invention. Table 7 represents

TABLE 7

| Sentiment | Extremity Quantile | # alerts | CAR | Forward looking CAR |
|---|---|---|---|---|
| Negative | 95% | 352 | −15.27 | −13.78 |
|  | 90% | 753 | −9.39 | −7.14 |
|  | 80% | 1411 | −3.76 | −3.06 |
|  | 70% | 2125 | −5.16 | −2.52 |
| Positive | 70% | 2421 | 5.72 | 4.18 |
|  | 80% | 1620 | 6.76 | 5.00 |
|  | 90% | 807 | 5.76 | 2.43 |
|  | 95% | 434 | 10.36 | 3.07 |

Table 8 represents Commodity Crude Conditioning return on price momentum and sentiment extremity in conjunction with the present invention;

TABLE 8

| Sentiment | Extremity Quantile | # alerts | CAR | Forward looking CAR |
|---|---|---|---|---|
| Negative | 95% | 204 | −30.40 | −25.21 |
|  | 90% | 408 | −19.91 | −15.74 |
|  | 80% | 820 | −9.59 | −8.25 |
|  | 70% | 1230 | −10.91 | −5.52 |
| Positive | 70% | 1427 | 5.56 | 2.85 |
|  | 80% | 958 | 7.22 | 4.20 |
|  | 90% | 476 | 7.10 | 1.61 |
|  | 95% | 270 | 14.59 | 2.73 |

Table 9 represents Commodity Crude showing articles matter at the opening of the market/trading and in conjunction with the present invention;

TABLE 9

| Direction | Quantile | Number | CAR | Forward looking CAR |
|---|---|---|---|---|
| Negative | 95% | 352 | −2.31 | −2.31 |
|  | 90% | 753 | −1.40 | −1.40 |
|  | 80% | 1411 | −0.30 | −0.30 |
|  | 70% | 2125 | −0.01 | −0.01 |
| Positive | 70% | 2421 | 8.89 | 8.91 |
|  | 80% | 1620 | 7.93 | 7.92 |
|  | 90% | 807 | 8.02 | 8.00 |
|  | 95% | 434 | 8.67 | 8.63 |

Figure 42:
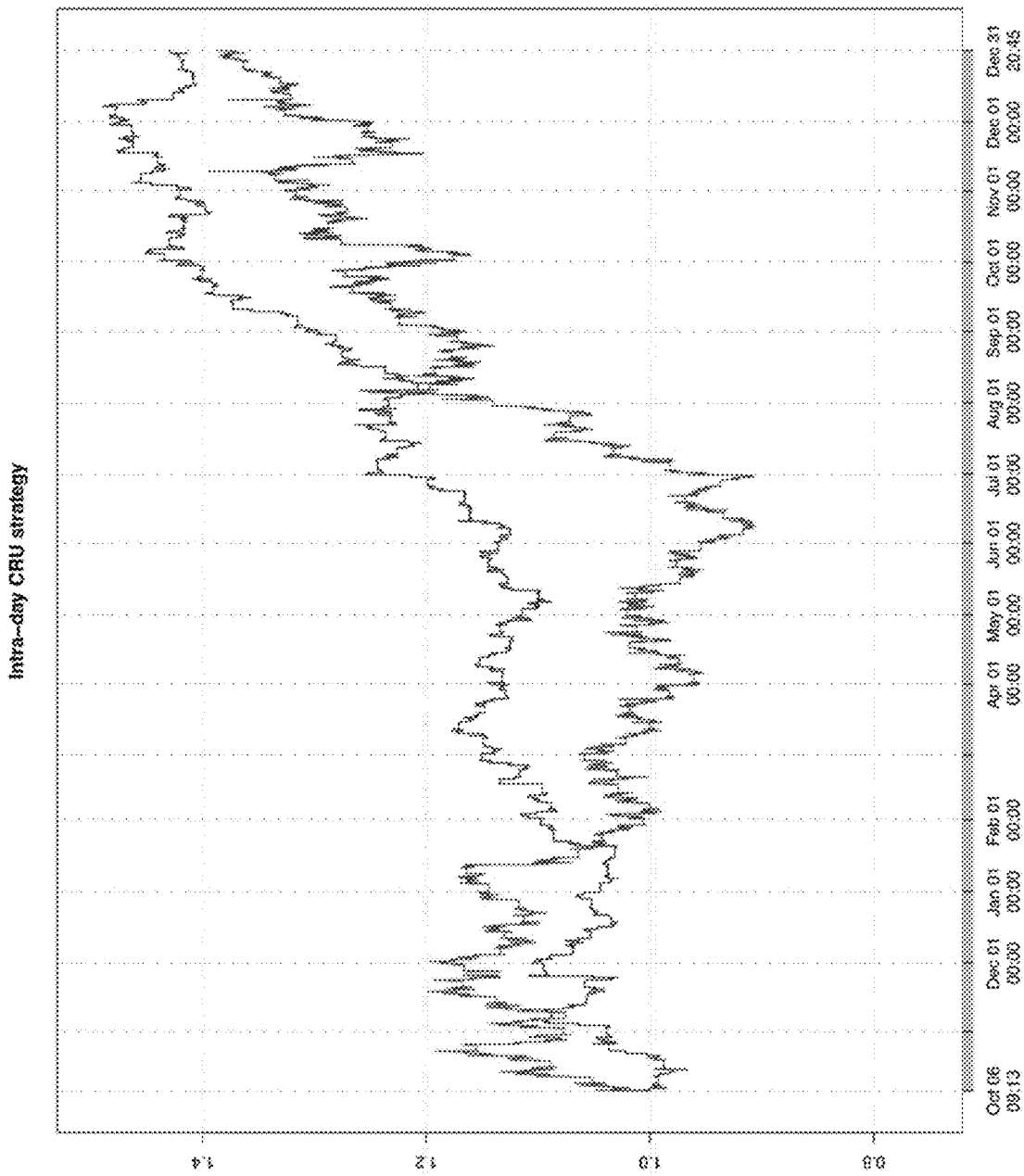

While FIGS. 39-41 and Tables 7-9 relate to response curve data and analysis regarding commodity CRU, similar results have been found with respect to other commodities, including MET, PROD, and GRA. FIG. 42 is a chart representing a backtest of an Intra-day Crude commodity strategy. Long/short switching based on news sentiment. Long 1 contract when Pr(POS)>=0.5. Four times contracts when linked count5>1. Four times more contracts when linkedcount5>=5. Short when Pr(NEG)>=0.7. Four times when previous hour return is <−5 bps. Four times when Pr(NEG)>=0.8. Annualized Sharpe ratio of 1.97.

Table 10 relates to Grain set of data and to conditioning return on sentiment extremity, i.e., extremity of sentiment impacts forward looking CAR for negative but not positive news.

TABLE 10

| Direction | Quantile | Number | CAR | Forward looking CAR |
|---|---|---|---|---|
| Negative | 95% | 140 | −20.66 | −9.13 |
|  | 90% | 290 | −11.09 | −2.26 |
|  | 80% | 549 | −9.33 | −2.94 |
|  | 70% | 823 | −10.94 | −2.79 |

TABLE 10-continued

| Direction | Quantile | Number | CAR | Forward looking CAR |
|---|---|---|---|---|
| Positive | 70% | 915 | 21.42 | 8.37 |
| | 80% | 612 | 22.71 | 7.67 |
| | 90% | 309 | 28.60 | 10.67 |
| | 95% | 162 | 20.41 | 12.15 |

Table 11 relates to Crude data set and to conditioning return on price momentum and sentiment extremity, i.e., a |5 bps| filter on the previous hour magnifies the response to negative news doubles negative news response.

TABLE 11

| Direction | Quantile | Number | CAR | Forward looking CAR |
|---|---|---|---|---|
| Negative | 95% | 77 | −37.58 | −13.48 |
| | 90% | 153 | −27.32 | −11.54 |
| | 80% | 310 | −20.46 | −11.76 |
| | 70% | 457 | −27.08 | −12.10 |
| Positive | 70% | 472 | 36.25 | 8.37 |
| | 80% | 311 | 40.63 | 8.35 |
| | 90% | 156 | 46.15 | 9.37 |
| | 95% | 81 | 42.10 | 8.70 |

Table 12 shows a composite of results from applying the techniques discussed above across four commodities—Crude Oil, Metals (Precious), Oil Products (Gas Oil) and Grains. The chart represents the key response characteristics derived from market reaction to various news/sentiment types and conditions. For example, for Crude Oil, at high frequency decision is to focus on alerts. Consider positive news that is repeated and increase trade commitment when news is negative and extreme or preceded by a price move.

TABLE 12

| | Crude Oil | Metals (Precious) | Oil Products (Gas Oil) | Grains |
|---|---|---|---|---|
| During trading most impact from . . . | Alerts | Alerts Alerts | Alerts Alerts | Alerts Alerts |
| Half hour response to alerts is . . . | Reversion Reversion | Reversion Reversion | Reversion | Reversion |
| 3 hour response to alerts is . . . | Positive Drift | Negative Drift | Positive Drift | Negative Drift |
| Sentiment Extremity of alerts . . . | Increases Drift | Increases Drift | Increases Drift | Increases Drift |
| Novel alerts . . . | Increases Drift Increases Drift | Increases Drift | | Increases Drift |
| Repeated alerts . . . | Increased Drift | | Increases Drift Increases Drift | Increases Drift |
| Extremity + Price Momentum . . . | Increased Drift | Articles Articles | Articles Articles | |
| Market open most impact form . . . | Articles | Articles Articles | Articles Articles | Articles Articles |

Additional backtesting with same setup as previously used for CRU commodity example except allowing for positive news momentum when EDA suggests. The result was that for CRU Sharpe value of 2.10; Industrial metals IND Sharpe value of 1.39; Grains (GRA) Sharpe value of 1.06; Heating Oil (PROD) Sharpe value of 0.87; Gas Oil (PROD) Sharpe value of 0.25; and Precious Metals (MET) Sharpe value of −0.76.

The following describes how the present invention may be implemented in an exemplary forecasting framework with respect to an overall architecture of the NAS. The NAS may employ a supervised learner that is trained offline and runs in real-time. For every new news item, predict: subsequent abnormal return; log(volume); and log(realized volatility). Use "features" to make these forecasts. Features are encoded representations and analytics of how people think about, process and respond to news. See FIGS. 44-46 and related description below. The NAS architecture may use a Rolling Window Re-training, i.e., train a family of predictive models every period, or periodically, for use in the next or subsequent period(s).

With respect to feature engineering, the NAS may employ the following: News Type Differentiation (e.g., Was the news item an article? An alert?); News Topic Differentiation (e.g., Was the news item associated with an important topic code? (AAA, MRG, DIV, CORPD, RES, RESF, RSCH)); News Genre Differentiation (e.g., Was the news an update? A broker upgrade or downgrade? A digest?); News Source Differentiation (e.g., Was the news from Reuters? PR NewsWire? Other sources?); News Relevance (e.g., Was the news relevant to the RIC at the 30% level? 60%?); News Sentiment Extremity (e.g., Was Pr(POS)>=50%? 75? How about Pr(NEG)? 50%? 75%?); News Novelty (e.g., How novel was the news in the last day? Two days? Week?); Framing or regime (e.g., Was the previous day's (sentiment, return, volatility) low or high?)

Figure 43:
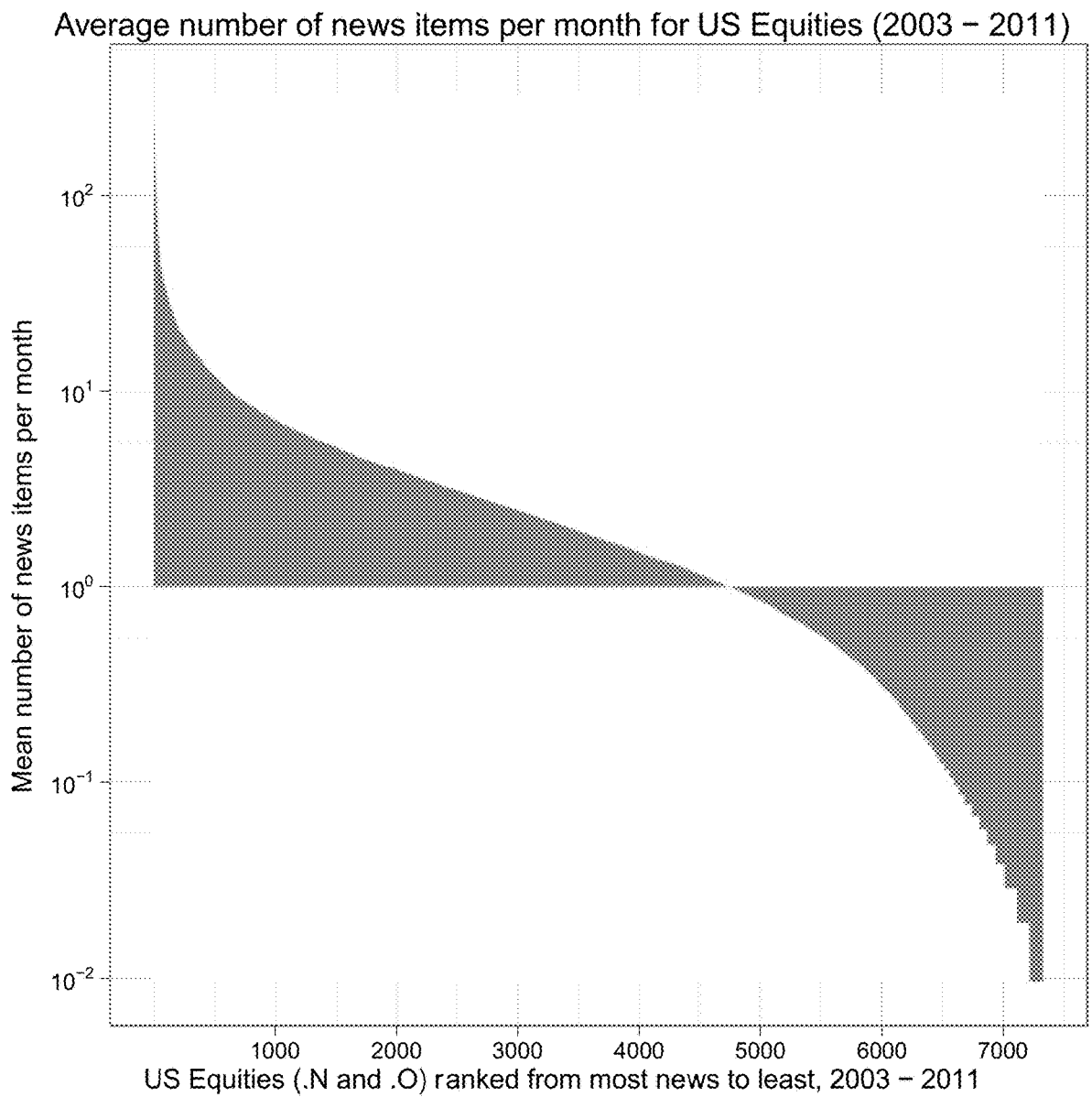

FIG. 43 is a chart representing the average number of news items per month for US equities from 2003 through 2011. The chart illustrates the disparity with respect to volume of news related to equities and the concepts of sparsity and density in conjunction with the present invention. Disparity exists when there is a relatively high volume of news for some RICs all the time and a relatively low volume of news for other RICs. In this manner, the invention may incorporate a differentiation based on relative volume. "Shocks" are considered as potential significant events and represent a change in expectation or assessment about a firm/company performance or price and a corresponding change in investor sentiment about the company. Shocks may be the culmination of one or more news stories or may also include actual events. Although the invention is primarily directed to methods to more effectively analyze the effect of news stories on stocks and to developing a predictive model to anticipate the affect of such news stories, the invention may also consider actual events (although significant events, like natural disasters, often have direct and immediate impact on stock prices). A shock could also be a change in condition such as supply issues. An example of such a shock is the recent tsunami related disaster in Japan that resulted in a prolonged period of manufacturing shut down that affected a number of companies operating not only in Japan but elsewhere (companies that relied on supply of parts from Japan). In one exemplary embodiment, when calculating shocks, calculate over: Past units of time; and Past number of news items.

Figure 44:
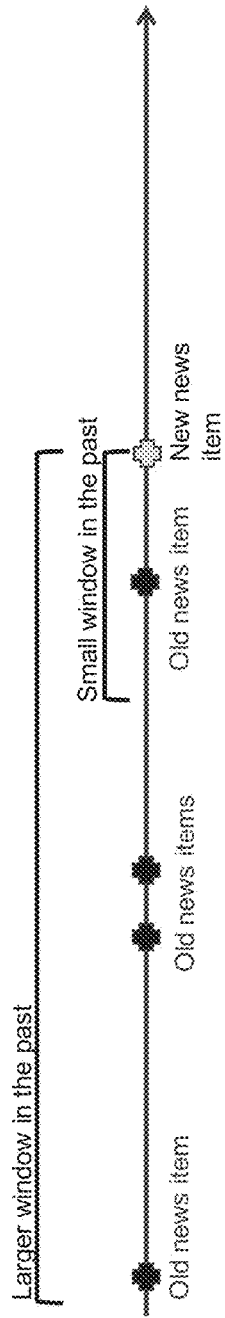
FIG. 44 is a schematic diagram representing feature engine construction and implementation and predictive modeling in association with the present invention.
Figure 45:
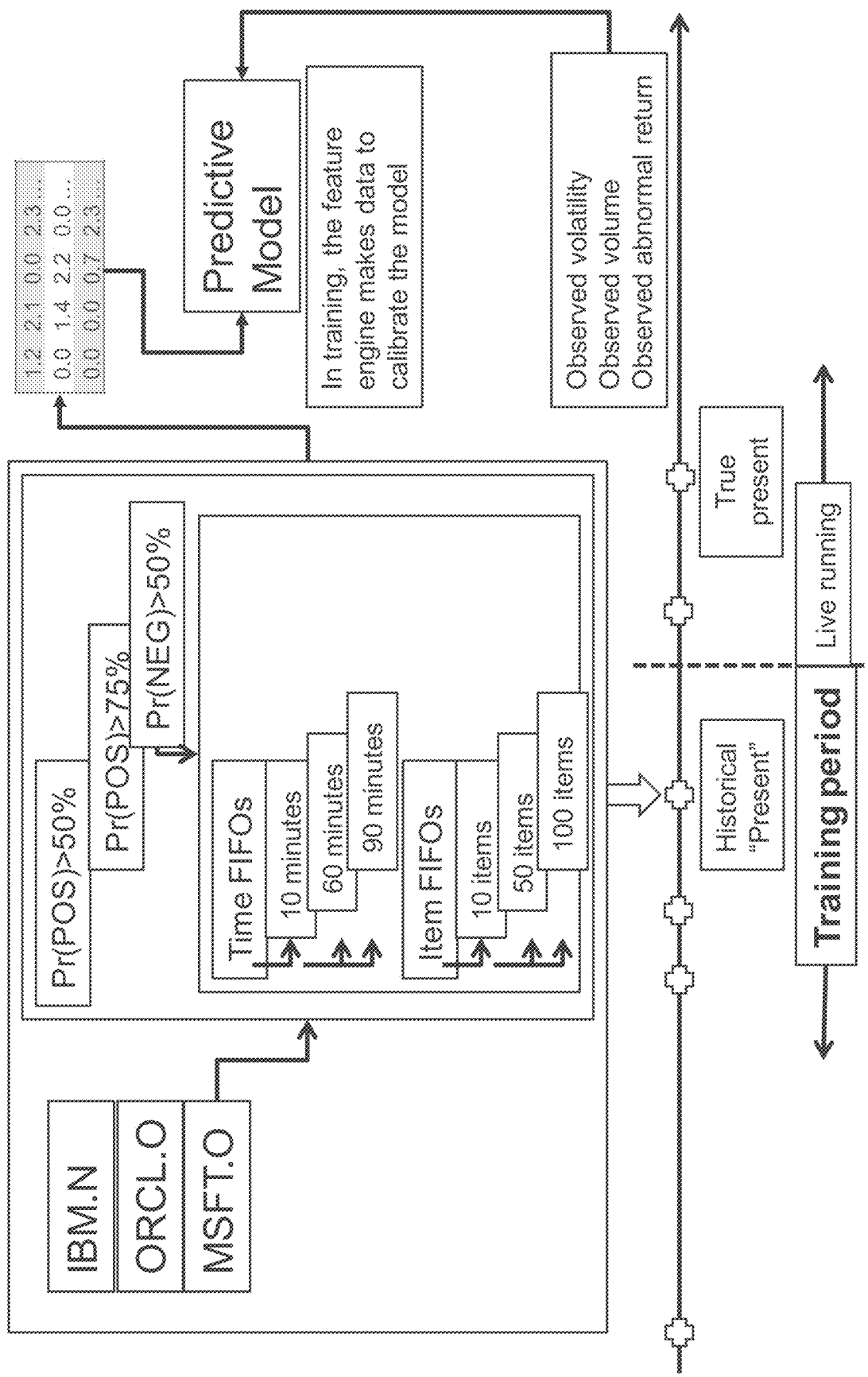
FIG. 45 is a schematic diagram representing a feature engine calibration process building on the feature construction and implementation of FIG. 43.
Figure 46:
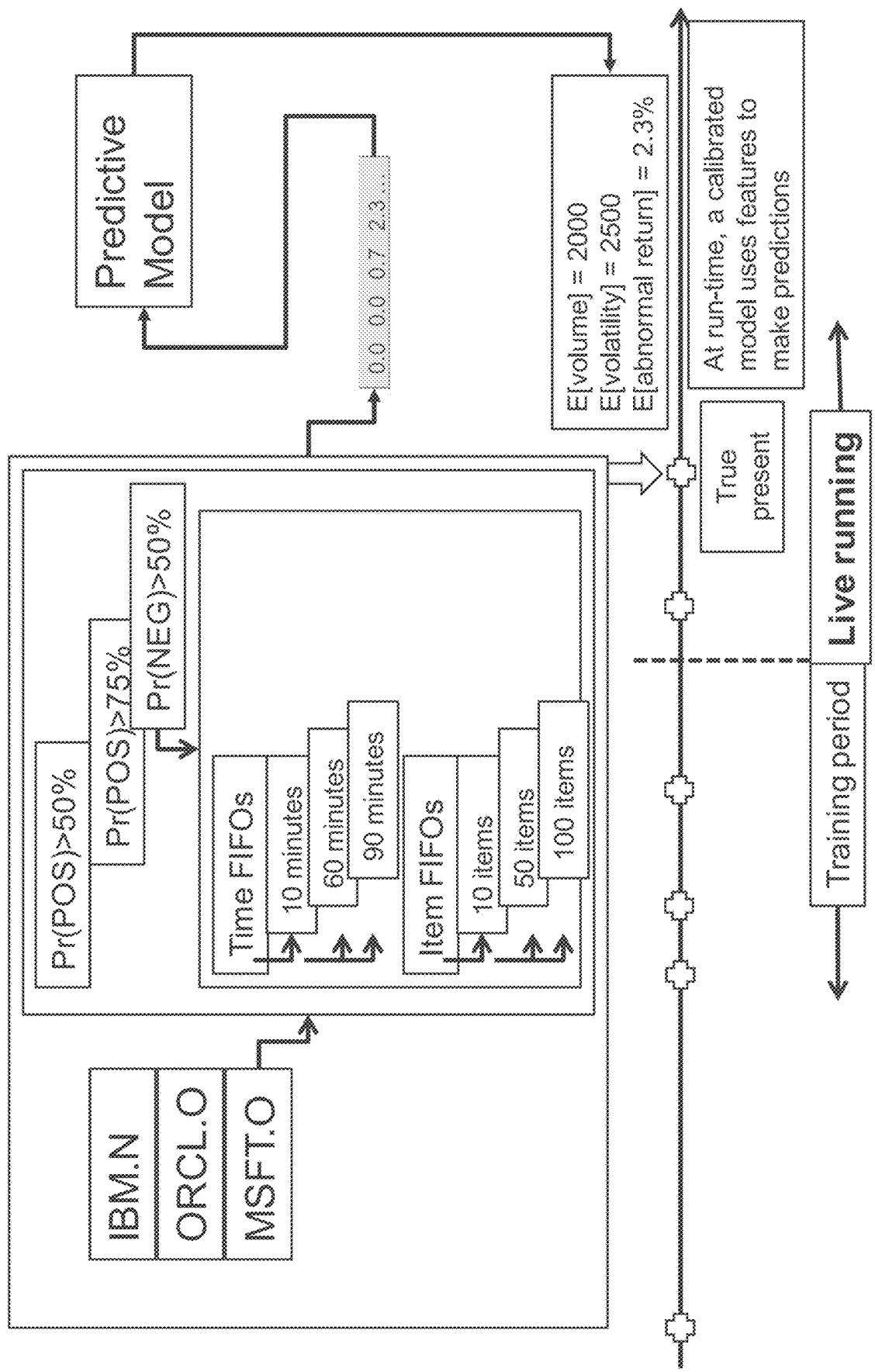
FIG. 46 is a schematic diagram representing a feature engine calibration process building on the feature construction and implementation of FIG. 43.

With reference to FIGS. 44-46, feature construction and implementation in the NAS may involve the following considerations: consume news meta-data in a stream; filter per security, accumulate based on timed FIFOs of filtered news events for RICs that have much news and item FIFOs of filtered news events for RICs that have little news. Every time there is a news item, for each FIFO relative to those "larger" than it, emit: the ratio of the number of items in the FIFO in a small window in time to a larger; and the % for the number of items for the given RIC that exhibit this feature.

With reference to FIG. 44, "shocks" to sentiment drive mispricing and volatility more than the overall level (cognitive dissonance and framing). Rather than focus on the slow moving changes to sentiment or the average movement of sentiment over time (or even a rolling average), the present invention more powerfully considers and factors into a predictive model the response correlation of shock events. In this manner, the invention analyzes the derivative or ratio of events (news and sentiment) to drive predictions in a more responsive manner. In one manner of achieving this goal, the NAS considers derivatives or ratios of kinds of news meta-data within a small window in the past relative to a larger window of news items in the past. One strategy is a layered approach wherein: For each new news item, for each feature type, for each pair of windows in the recent past: form the ratio of number of items in the small over big window. In the example of FIG. 44, the small window includes one old news item and one new news item, which may be represented by a value of 2 and the large window includes the small window items plus three additional old news items for a value of 5. In this example the feature is represented by the ratio of 2/5, i.e., the small window value in the numerator with the large window value in the denominator.

In another example, the present invention uses a sentiment engine and then applies the derivative of sentiment to predict volatility and/or trend direction of price of a security as follows. Assuming a sentiment engine that ingests (reads) news stories, identifies the news stories as relating to Company A and then scores the news stories as follows: +1 for positive story; 0 for neutral (e.g., mere mention) news story; and −1 for negative news story. Types of news stories or content may include: credit related; merger and acquisition; transaction; dividends; forecast; research and development; and FDA activity. The NAS will consider the sentiment values of the last 100 news items associated with a company. For instance, 75 favorable items (value of 75) with 25 neutral items (value of 0) with the most recent ten stories all being neutral. The NAS may assign a sentiment score of 0.75 (75 points/100 news stories). For a set of subsequent (now most recent) ten stories, assume that they are all negative having a score of negative ten points. The NAS then assigns a sentiment score of 0.65 (65 points (75 positive, ten neutral and ten negative) divided by 100 news stories). Although the sentiment score remains positive (+0.65), the fact that the most recent stories are all negative is likely to indicate a more powerful move away from a positive sentiment and are, potentially, more relevant to predictive movement (downward) of the stock price. The NAS may use the derivative of sentiment or other consistent process, e.g., ratio, by looking at the most recent 10 stories and weighing them more heavily, as more relevant, for predicting stock price behavior (short-term or longer term).

In this manner the invention focuses on or gives heightened importance to events occurring in a much shorter timeframe than prior systems to the advantage of traders, including algorithmic traders, day traders, any investor.

Rather than looking to a fixed number of most recent stories, the NAS may be configured to look to the most recent stories within a certain time period, e.g., the last hour. The NAS may also look to the content and context of the news stories and weigh them in accordance with a predetermined taxonomy. The weighting may factor in recency, criticality, repeatedness, trustworthiness, etc. For example, the NAS may be tuned to quickly identify and process stories, such as an FDA approval of a ground-breaking drug, and compare that against a database of expected response (short-term, long term, etc.) given prior such events, and then predict a price and suggest a course of action to traders/investors subscribed to the service or possessing the NAS system. Also, the NAS may be configured to forecast such an event given stock price, and news leading up to the announcement, to predict an impending news story or release of significance.

FIG. 45 is a schematic diagram representing a feature engine calibration process building on the feature construction and implementation techniques described above in reference to FIG. 43. In this example, the feature engine is calibrated using data associated with three publicly traded companies/stocks—IBM, Microsoft, and Oracle. In this "training" period, the feature engine makes data (historical present data) to calibrate the financial stock behavior predictive model and observations are made concerning volatility, volume, and abnormal return or Cumulative Abnormal Returns (CAR).

FIG. 46 is a schematic diagram representing a feature engine in live running mode following the calibration process of FIG. 45 and after feature construction and implementation process of FIG. 43. In this example, the calibrated feature engine model is running using features and using live data to make predictions concerning anticipated price movement of three publicly traded companies/stocks—IBM, Microsoft, and Oracle. In this "training" period, the feature engine makes data (historical present data) to calibrate the financial stock behavior predictive model and observations are made concerning volatility, volume, and abnormal return or Cumulative Abnormal Returns (CAR).

With respect to modeling predictive behavior, there are about 400 independent variables. Can use one or more of Ordinary Least Squares (OLS), Generalized Least Squares (GLS), Robust regression, least absolute deviation regression, quantile regression, Support Vector Machines (SVMs), ensemble methods, and other available options. In one embodiment, Principal Components analysis was used to reduce the approximately 400 features to about 30, capturing about 25% of the variance. Also OLS was used to forecast from the approximately 30 transformed variables. These design choices are not limiting to the invention and many methods may be used to validate features and to show that news metadata can inform short-term future price movements and volatility.

Figure 47:
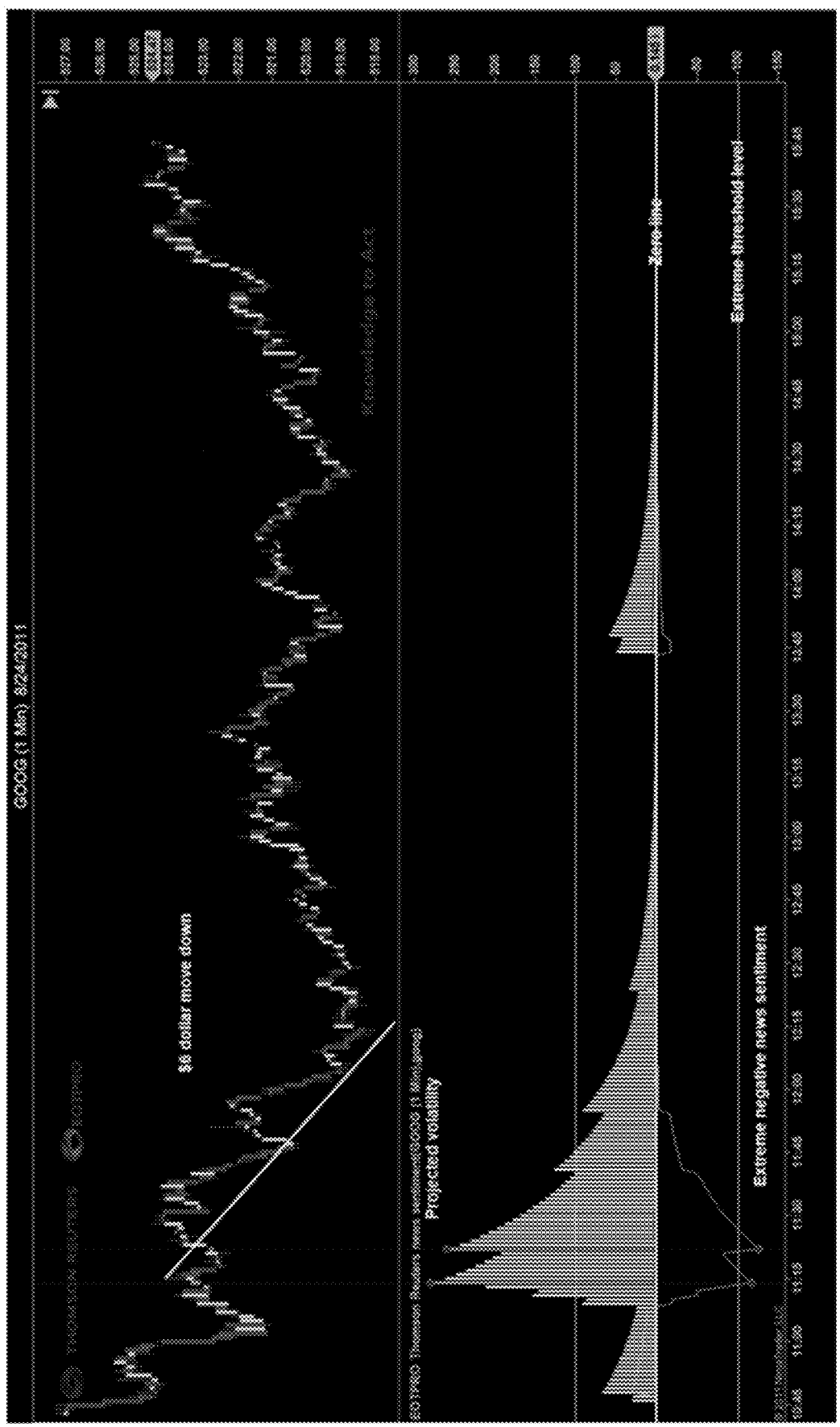
FIGS. 47 through 49 represent visualizations of predictive modeling and forecasting in conjunction with the present invention.
Figure 48:
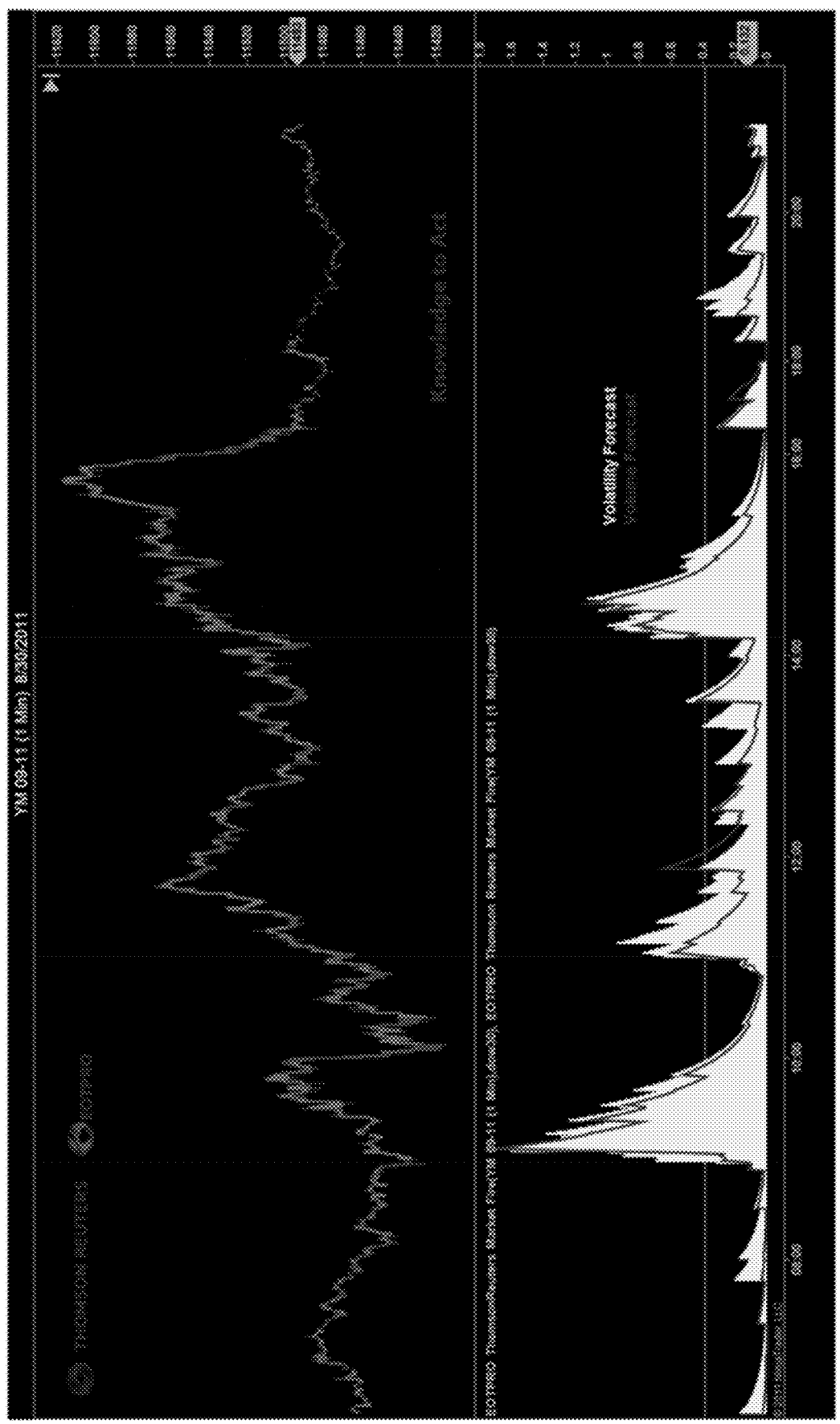
Figure 49:
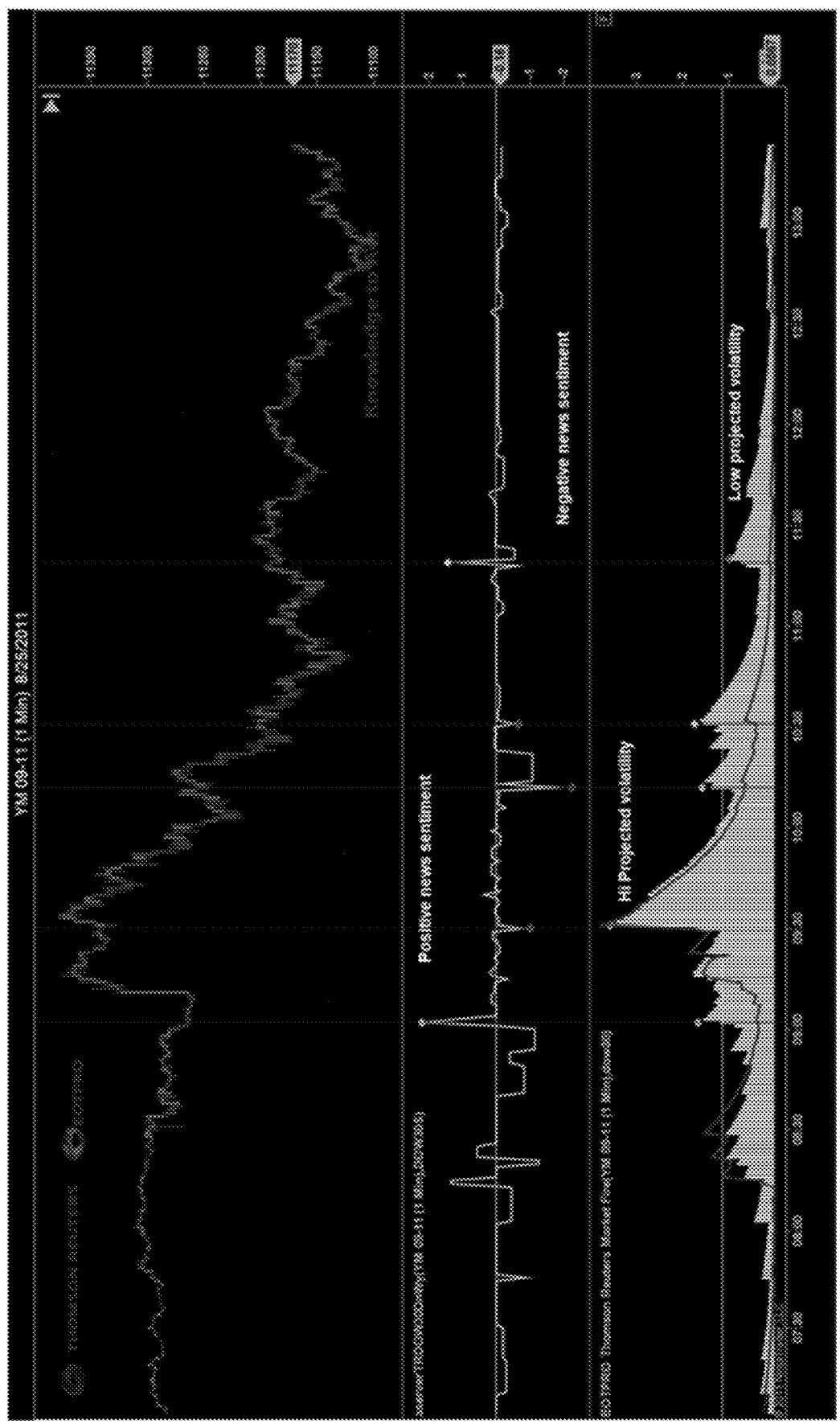

One consideration is signal decay and aggregation, i.e., how quickly does news get imputed into price. The NAS may be used to show that in certain situations an exponential decay occurs over a predictable amount of time, e.g., about 90 minutes. The NAS can apply historical data to determine how signal decay occurs differently for off-hours and during trading times. The end of the predictive window of opportunity is when the price has "moved" fully to account for the new information. The NAS may be used to "roll up" signals for individual securities into a signal(s) for a basket of securities. For instance a weighted average may be used, "Front Page" effects may be factored in and the NAS may apply the forecasting engine directly to the basket of securities. The NAS used a US equity engine trained, for example, on US (S&P 1500) equity RICs during market hours with a training period of between Jan. 1, 2009 through Jul. 30, 2010, with 122,578 samples taken over 1663 unique RICs FIGS. 47 through 49 represent visualizations of forecasting. For example, FIG. 47 indicates a downwardly extending "forecast" with a $6 downward move in stock price along with a projected volatility expression below. An extreme negative news sentiment is indicated on the figure as data that cross the "Extreme threshold level" shown on the chart. FIG. 48 shows a "Market Fire" visualization of volume and volatility. "Machine learned forecast" on DOW30 is shown with volume and volatility components. FIG. 49 represents a visualization of the present invention with "positive news sentiment," "negative news sentiment," "Hi projected volatility," and "Low projected volatility."

In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

We claim:

1. A non-transitory computer useable medium having a set of executable code executable on a computer and comprising:
   a first set of computer program code executed on the computer to receive by an input associated with the computer at least one electronic data feed received from a set of databases and comprising electronic data representing news content, the news content electronic data comprising a first news story from the set of databases;
   a second set of computer program code executed on the computer to process by a document processing module executed on the computer the first news story and identify information pertaining to a first company, the identified information pertaining to the first company comprising embedded metadata derived from the at least one electronic data feed;
   a third set of computer program code executed on the computer to apply by a sentiment scoring module of the computer sentiment analysis and determine a first sentiment score associated with the first news story as it relates to the first company, the first sentiment score determined by applying a sentiment analysis on news content electronic data associated with the first news story;
   a fourth set of computer program code executed on the computer to determine by the sentiment scoring module of the computer a derivative sentiment value related to the first company in close to real-time, wherein the derivative sentiment value represents as a function a change in value over time of the first sentiment score as compared to a previous sentiment score, the first sentiment score being determined temporally proximate to the publication of the first news story and weighted more heavily than the previous sentiment score, the previous sentiment score representing a set of prior sentiment scores related to the first company and determined prior to the first sentiment score over a temporal period extending back in time from the publication of the first news story;
   a fifth set of computer program code executed on the computer to determine a set of features by a feature engine, the feature engine applying machine learning to train a predictive module, the feature engine having automatically generated a set of features based on historical sentiment data, wherein the set of features are calibrated by the feature engine by analyzing a set of historical present data, and wherein in a rolling window retraining period the historical present data is compared to and used to supplement a set of training data in a simulated training period to improve accuracy of the feature engine in a live running period and to train a set of predictive models accessible and executable by the predictive module;
   a sixth set of computer program code executed on the computer to automatically enter by operation of the predictive module the derivative sentiment value and the first sentiment score into a predictive model from the set of predictive models, and execute the predictive model to generate an expression in electronic form representing a predicted behavior associated with the first company, the predictive module having been trained using machine learning by the feature engine, and wherein the set of features are used to more accurately arrive at the generated expression; and
   a seventh set of computer program code executed on the computer to generate by the predictive module of the computer a visual indicator related to and based at least in part on the generated expression in a graphical user interface integrated with the document processing module, the sentiment scoring module, and the predictive module by an integration framework module.

2. The computer useable medium of claim 1, wherein the first sentiment score is based at least in part on type of news story, wherein the type is one from the group consisting of alert, article, update, correction, and headline.

3. The computer useable medium of claim 1, wherein the second set of computer program code is adapted to process the first news story to identify embedded metadata or other descriptors, process text, words, phrases and attribute relevance to the first company.

4. The computer useable medium of claim 1, wherein the second set of computer program code is adapted to process the first news story to identify information pertaining to a second company distinguishable from the first company;
   the third set of computer program code is adapted to apply sentiment analysis and arrive at a second sentiment score associated with the first news story as it relates to the second company; and the fourth set of computer program code is adapted to determine a second derivative sentiment value related to the second company.

5. The computer useable medium of claim 1 further comprising an eighth set of computer program code adapted to generate an expression of the predicted behavior, including at least one of trade volume, price direction and price volatility.

6. The computer useable medium of claim 1 further comprising a ninth set of computer program code adapted to generate a suggested action to take in light of the predicted behavior.

7. The computer readable medium of claim 6, wherein the suggested action relates to a trade decision concerning an investment and is one of a group consisting of buy, sell or hold.

8. The computer readable medium of claim 1 wherein the fourth set of computer program code is adapted to determine a derivative sentiment value related to the first company by comparing a sentiment value associated with a first set of news stories concerning the first company with a sentiment value associated with a second set of new stories concerning the first company.

9. The computer readable medium of claim 8, wherein the second set of news stories comprises fewer news stories as included in the first set of news stories and the second set of news stories are selected based on a temporal value.

10. A computer-implemented method for determining derivative sentiment features predictive of market behavior, the method comprising:
    receiving by an input associated with a computer at least one electronic data feed received from a set of databases and comprising electronic data representing news content, the news content electronic data comprising a first news story from the set of databases;
    automatically processing by a document processing module of executed on the computer the first news story and identifying information pertaining to a first company, the identified information pertaining to the first company comprising embedded metadata derived from the at least one electronic data feed;
    automatically determining by a sentiment scoring module of the computer a first sentiment score associated with the first news story as it relates to the first company, the first sentiment score determined by applying a sentiment analysis on news content electronic data associated with the first news story;
    automatically determining by the sentiment scoring module of the computer a derivative sentiment value related to the first company in close to real-time, wherein the derivative sentiment value represents as a function a change in value over time of the first sentiment score as compared to a previous sentiment score, the first sentiment score being determined temporally proximate to the publication of the first news story and weighted more heavily than the previous sentiment score, the previous sentiment score representing a set of prior sentiment scores related to the first company and determined prior to the first sentiment score over a temporal period extending back in time from the publication of the first news story;
    automatically determining by a feature engine a set of features, the feature engine applying machine learning to train a predictive module, the feature engine having automatically generated a set of features based on historical sentiment data, wherein the set of features are calibrated by the feature engine by analyzing a set of historical present data, and wherein in a rolling window retraining period the historical present data is compared to and used to supplement a set of training data in a simulated training period to improve accuracy of the feature engine in a live running period and to train a set of predictive models accessible and executable by the predictive module;
    the predictive module of the computer automatically entering the derivative sentiment value and the first sentiment score into a predictive model from the set of predictive models, and executing the predictive model to generate an expression in electronic form representing a predicted behavior associated with the first company, the predictive module having been trained using machine learning by the feature engine, and wherein the set of features are used to more accurately arrive at the generated expression; and
    generating by the predictive module of the computer a visual indicator related to and based at least in part on the generated expression in a graphical user interface integrated with the document processing module, the sentiment scoring module, and the predictive module by an integration framework module.

11. The method of claim 10, wherein the first sentiment score is based at least in part on type of news story, wherein the type is one from the group consisting of alert, article, update, correction, and headline.

12. The method of claim 11 further comprising processing the first news story to identify embedded metadata or other descriptors, process text, words, phrases and attribute relevance to the first company.

13. The method of claim 10 further comprising processing the first news story to identify information pertaining to a second company distinguishable from the first company;
    using sentiment analysis to determine a second sentiment score associated with the first news story as it relates to the second company; and
    determining a second derivative sentiment value related to the second company.

14. The method of claim 10 further comprising generating an expression of the predicted behavior, including at least one of trade volume, price direction and price volatility.

15. The method of claim 10 further comprising generating a suggested action to take in light of the predicted behavior.

16. The method of claim 15, wherein the suggested action relates to a trade decision concerning an investment and is one of a group consisting of buy, sell or hold.

17. The method of claim 10 further comprising determining a derivative sentiment value related to the first company by comparing a sentiment value associated with a first set of news stories concerning the first company with a sentiment value associated with a second set of new stories concerning the first company.

18. The method of claim 17, wherein the second set of news stories comprises fewer news stories as included in the first set of news stories and the second set of news stories are selected based on a temporal value.

19. A computer-based system for determining derivative sentiment features predictive of market behavior, the system comprising:
    a processor adapted to execute code;
    a memory for storing executable code;
    an input adapted to receive by at least one electronic data feed received from a set of databases and comprising electronic data representing news content, the news content electronic data comprising a first news story from the set of databases; and a set of code stored in the memory and executable by the processor to:

process by a document processing module the first news story to identify information pertaining to a first company, the identified information pertaining to the first company comprising embedded metadata derived from the at least one electronic data feed;

apply sentiment analysis to determine a first sentiment score associated with the first news story as it relates to the first company;

determine by the sentiment scoring module a derivative sentiment value related to the first company in close to real-time, wherein the derivative sentiment value represents as a function a change in value over time of the first sentiment score as compared to a previous sentiment score, the first sentiment score being determined temporally proximate to the publication of the first news story and weighted more heavily than the previous sentiment score, the previous sentiment score representing a set of prior sentiment scores related to the first company and determined prior to the first sentiment score over a temporal period extending back in time from the publication of the first news story;

determining by a feature engine a set of features, the feature engine applying machine learning to train a predictive module, the feature engine having automatically generated a set of features based on historical sentiment data, wherein the set of features are calibrated by the feature engine by analyzing a set of historical present data, and wherein in a rolling window retraining period the historical present data is compared to and used to supplement a set of training data in a simulated training period to improve accuracy of the feature engine in a live running period and to train a set of predictive models accessible and executable by the predictive module;

enter the derivative sentiment value and the first sentiment score into a predictive model from the set of predictive models, and executing the predictive model to generate an expression in electronic form representing a predictive behavior associated with the first company, the predictive behavior based at least in part on the derivative sentiment value and the sentiment score, the predictive module having been trained using machine learning by the feature engine, and wherein the set of features are used to more accurately determine the generated expression; and generate by the predictive module a visual indicator related to and based at least in part on the predicted behavior in a graphical user interface integrated with the document processing module, the sentiment scoring module, and the predictive module by an integration framework module.

20. The system of claim 19 further comprising a feature engine executed by the processor to train the predictive module using historical news data and historical stock price data.

21. The system of claim 20, wherein the predictive module includes code adapted to process the first news story to identify embedded metadata or other descriptors, process text, words, phrases and attribute relevance to the first company.

22. The system of claim 19, wherein the predictive module includes code adapted to: process the first news story to identify information pertaining to a second company distinguishable from the first company; apply sentiment analysis to determine a second sentiment score associated with the first news story as it relates to the second company; and determine a second derivative sentiment value related to the second company.

23. The system of claim 19, wherein the predictive module includes code adapted to: generate an expression of the predicted behavior, including at least one of trade volume, price direction and price volatility.

24. The system of claim 19, wherein a weighting is applied to the first sentiment score such that the first sentiment score has a proportionally greater effect on the derivative sentiment value than the previous sentiment score.

25. The method of claim 10, wherein a weighting is applied to the first sentiment score such that the first sentiment score has a proportionally greater effect on the derivative sentiment value than the previous sentiment score.

26. The system of claim 19, wherein a weighting is applied to the first sentiment score such that the first sentiment score has a proportionally greater effect on the derivative sentiment value than the previous sentiment score.

\* \* \* \* \*